US012361873B2

(12) United States Patent
Ren et al.

(10) Patent No.: US 12,361,873 B2
(45) Date of Patent: Jul. 15, 2025

(54) DRIVE CONTROL CIRCUIT, GATE DRIVE CIRCUIT, DISPLAY SUBSTRATE AND DISPLAY APPARATUS

(71) Applicants: Chengdu BOE Optoelectronics Technology Co., Ltd., Sichuan (CN); BOE Technology Group Co., Ltd., Beijing (CN)

(72) Inventors: Yanping Ren, Beijing (CN); Hongting Lu, Beijing (CN); Lian Xiang, Beijing (CN); Xingyu Chen, Beijing (CN); Chao Yang, Beijing (CN); Yan Yang, Beijing (CN)

(73) Assignees: Chengdu BOE Optoelectronics Technology Co., Ltd., Sichuan (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/022,753

(22) PCT Filed: Feb. 28, 2022

(86) PCT No.: PCT/CN2022/078427
§ 371 (c)(1),
(2) Date: Feb. 23, 2023

(87) PCT Pub. No.: WO2023/159609
PCT Pub. Date: Aug. 31, 2023

(65) Prior Publication Data
US 2024/0274074 A1 Aug. 15, 2024

(51) Int. Cl.
*G09G 3/3233* (2016.01)

(52) U.S. Cl.
CPC ... *G09G 3/3233* (2013.01); *G09G 2300/0426* (2013.01); *G09G 2300/0852* (2013.01); *G09G 2310/08* (2013.01); *G09G 2330/02* (2013.01)

(58) Field of Classification Search
CPC ......... G09G 3/3233; G09G 2300/0426; G09G 2300/0852; G09G 2310/08; G09G 2330/02; G09G 3/20; G09G 3/3225; G09G 3/3266
See application file for complete search history.

(56) References Cited

U.S. PATENT DOCUMENTS

| | | | | |
|---|---|---|---|---|
| 11,074,842 | B2 * | 7/2021 | Park | G11C 19/287 |
| 2008/0116944 | A1 | 5/2008 | Tobita et al. | |

(Continued)

FOREIGN PATENT DOCUMENTS

| | | | |
|---|---|---|---|
| CN | 105427806 | A | 3/2016 |
| CN | 109215583 | A | 1/2019 |

(Continued)

*Primary Examiner* — Grant Sitta
(74) *Attorney, Agent, or Firm* — Ling Wu; Stephen Yang; Ling and Yang Intellectual Property

(57) ABSTRACT

Provided is a drive control circuit, which includes an input circuit (10), a first output circuit (11) and a second output circuit (12). An input circuit (10) is configured to control the potentials of a first node (N1) and a second node (N2) under the control of a signal input terminal (INT) and a clock signal terminal. The first output circuit (11) is configured to output a first power supply signal supplied by a first power supply line (VGH1) to a first output terminal (OUT1) under the control of a first node (N1), or to output a second power supply signal supplied by a second power supply line (VGL1) to the first output terminal (OUT1) under the control of a second node (N2).

17 Claims, 17 Drawing Sheets

(56) References Cited

U.S. PATENT DOCUMENTS

| | | | | |
|---|---|---|---|---|
| 2015/0035733 | A1 | 2/2015 | Woo et al. | |
| 2017/0193901 | A1 | 7/2017 | Wang et al. | |
| 2018/0174553 | A1 | 6/2018 | Bong et al. | |
| 2018/0322820 | A1 | 11/2018 | Yang et al. | |
| 2019/0005888 | A1 | 1/2019 | Kim et al. | |
| 2020/0044092 | A1* | 2/2020 | Feng | H01L 29/7869 |
| 2021/0104196 | A1 | 4/2021 | Yuan | |
| 2021/0166630 | A1 | 6/2021 | Kim et al. | |
| 2021/0174743 | A1 | 6/2021 | Chang | |
| 2021/0366354 | A1* | 11/2021 | Li | G09G 3/007 |
| 2022/0028323 | A1 | 1/2022 | In | |
| 2022/0068212 | A1* | 3/2022 | Yao | H10K 59/126 |

FOREIGN PATENT DOCUMENTS

| | | | | | |
|---|---|---|---|---|---|
| CN | 110782838 | A | | 2/2020 | |
| CN | 111696486 | A | * | 9/2020 | G09G 3/3233 |
| CN | 111816691 | A | | 10/2020 | |
| CN | 111816691 | B | * | 12/2020 | G09G 3/3225 |
| CN | 112071269 | A | | 12/2020 | |
| CN | 112102785 | A | | 12/2020 | |
| CN | 110808012 | B | | 2/2021 | |
| CN | 113053281 | A | | 6/2021 | |
| JP | 2019-504335 | A | | 2/2019 | |
| KR | 10-2012-0061146 | A | | 6/2012 | |
| KR | 10-2014-0116702 | A | | 10/2014 | |
| KR | 10-2018-0071642 | A | | 6/2018 | |

* cited by examiner

DRIVE CONTROL CIRCUIT, GATE DRIVE CIRCUIT, DISPLAY SUBSTRATE AND DISPLAY APPARATUS

CROSS-REFERENCE TO RELATED APPLICATION

The present application is a U.S. National Phase Entry of International Application No. PCT/CN2022/078427 having an international filing date of Feb. 28, 2022. The above-identified application is hereby incorporated by reference.

TECHNICAL FIELD

The present disclosure relates to, but is not limited to, the field of display technology, in particular to a drive control circuit, a gate drive circuit, a display substrate and a display apparatus.

BACKGROUND

An Organic Light Emitting Diode (OLED) and a Quantum dot Light Emitting Diode (QLED) are active light emitting display devices and have advantages of self-illumination, a wide viewing angle, a high contrast ratio, low power consumption, an extremely high reaction speed, lightness and thinness, bendability, and a low cost, etc.

SUMMARY

The following is a summary of subject matters described herein in detail. The summary is not intended to limit the protection scope of claims.

Embodiments of the present disclosure provide a drive control circuit, a gate drive circuit, a display substrate and a display apparatus.

In one aspect, an embodiment of the present disclosure provides a drive control circuit, including: an input circuit, a first output circuit, and a second output circuit. the input circuit is electrically connected with a signal input terminal, a clock signal terminal, a first node and a second node, and is configured to control the potentials of the first node and the second node under the control of the signal input terminal and the clock signal terminal. The first output circuit is electrically connected with the first node, the second node, the first output terminal, the first power supply line, and the second power supply line, and is configured to output a first power supply signal supplied by the first power supply line to the first output terminal under the control of the first node, or to output a second power supply signal supplied by the second power supply line to the first output terminal under the control of the second node. The second output circuit is electrically connected with the first node, the second node, the second output terminal, the third power supply line and the fourth power supply line, and is configured to output a fourth power supply signal supplied by the fourth power supply line to the second output terminal under the control of the first node, or to output a third power supply signal supplied by the third power supply line to the second output terminal under the control of the second node.

In some exemplary embodiments, the second output circuit includes a third output transistor and a fourth output transistor. A control electrode of the third output transistor is electrically connected to the first node, a first electrode of the third output transistor is electrically connected to the fourth power supply line, and a second electrode of the third output transistor is electrically connected to the second output terminal. A control electrode of the fourth output transistor is electrically connected to the second node, a first electrode of the fourth output transistor is electrically connected to the third power supply line, and a second electrode of the fourth output transistor is electrically connected to the second output terminal.

In some exemplary embodiments, the second output circuit further includes: a fourth capacitor; a first electrode plate of the fourth capacitor is electrically connected to the first node, and a second electrode plate of the fourth capacitor is electrically connected to the fourth power supply line.

In some exemplary embodiments, the first output circuit includes: a first output transistor and a second output transistor. A control electrode of the first output transistor is electrically connected to the first node, a first electrode of the first output transistor is electrically connected to the first power supply line, and a second electrode of the first output transistor is electrically connected to the first output terminal. A control electrode of the second output transistor is electrically connected to the second node, a first electrode of the second output transistor is electrically connected to the second power supply line, and a second electrode of the second output transistor is electrically connected to the first output terminal.

In some exemplary embodiments, the input circuit includes: an input sub-circuit, a first control sub-circuit, a second control sub-circuit, and a third control sub-circuit. The input sub-circuit is electrically connected with the signal input terminal, the first clock terminal, the second power supply line, the second node, and the third node, and is configured to control the potentials of the second node and the third node under the control of the first clock terminal and the signal input terminal. The first control sub-circuit is electrically connected with the second node, the third node, the first power supply line, and the second clock terminal, and is configured to control the potential of the second node under the control of the third node and the second clock terminal, or to store the signal supplied by the first power supply line or the second clock terminal under the control of the second node and the third node. The second control sub-circuit is electrically connected with the third node, the first node and the second clock terminal, and is configured to control the potential of the first node under the control of the third node and the second clock terminal. The third control sub-circuit is electrically connected to the first node, the second node and the first power supply line, and is configured to control the potential of the first node under the control of the second node.

In some exemplary embodiments, the input sub-circuit includes: a third transistor, a fourth transistor and a fifth transistor. A control electrode of the third transistor is electrically connected to the second node, a first electrode of the third transistor is electrically connected to the first clock terminal, and a second electrode of the third transistor is electrically connected to the third node. A control electrode of the fourth transistor is electrically connected with the first clock terminal, a first electrode of the fourth transistor is electrically connected with the signal input terminal, and a second electrode of the fourth transistor is electrically connected with the second node. A control electrode of the fifth transistor is electrically connected to the first clock terminal, a first electrode of the fifth transistor is electrically connected to the second power supply line, and a second electrode of the fifth transistor is electrically connected to the third node.

In some exemplary embodiments, the first control sub-circuit includes: a first transistor, a second transistor and a third capacitor. The control electrode of the first transistor is electrically connected to the third node, the first electrode of the first transistor is electrically connected to the first power supply line, and the second electrode of the first transistor is electrically connected to the first electrode of the second transistor. The control electrode of the second transistor is electrically connected with the second clock terminal, and the second electrode of the second transistor is electrically connected with the second node. A first electrode plate of the third capacitor is electrically connected to the second node, and a second electrode plate of the third capacitor is electrically connected to the second clock terminal.

In some exemplary embodiments, the first control sub-circuit includes: a first transistor, a second transistor and a third capacitor. The control electrode of the first transistor is electrically connected to the third node, the first electrode of the first transistor is electrically connected to the first power supply line, and the second electrode of the first transistor is electrically connected to the second electrode of the second transistor. The control electrode of the second transistor is electrically connected with the second node, and the first electrode of the second transistor is electrically connected with the second clock terminal. The first electrode plate of the third capacitor is electrically connected to the second node, and the second electrode plate of the third capacitor is electrically connected to the second electrode of the second transistor.

In some exemplary embodiments, the second control sub-circuit includes: a sixth transistor, a seventh transistor and a second capacitor. A control electrode of the sixth transistor is electrically connected to the third node, a first electrode of the sixth transistor is electrically connected to the second clock terminal, and a second electrode of the sixth transistor is electrically connected to a first electrode of the seventh transistor. A control electrode of the seventh transistor is electrically connected with the second clock terminal, and a second electrode of the seventh transistor is electrically connected with the first node. A first electrode plate of the second capacitor is electrically connected to the third node, and a second electrode plate of the second capacitor is electrically connected to the first electrode of the seventh transistor.

In some exemplary embodiments, the third control sub-circuit includes: an eighth transistor and a first capacitor. A control electrode of the eighth transistor is electrically connected to the second node, a first electrode of the eighth transistor is electrically connected to the first power supply line, and a second electrode of the eighth transistor is electrically connected to the first node. A first electrode plate of the first capacitor is electrically connected to the first node, and a second electrode plate of the first capacitor is electrically connected to the first power supply line.

In another aspect, an embodiment of the present disclosure provides a gate drive circuit including a plurality of cascaded drive control circuits described above; wherein, a signal input terminal of a first stage drive control circuit is electrically connected with a start signal line, and a signal input terminal of an i+1 stage drive control circuit is electrically connected with a first output terminal of an i stage drive control circuit, wherein, i is an integer greater than 0.

In another aspect, embodiments of the present disclosure provide a display substrate including a display region and a non-display region located on the periphery the display region; the display region is provided with a plurality of sub-pixels, at least one sub-pixel includes a pixel circuit and a light emitting element, wherein the pixel circuit is electrically connected with the light emitting element; the non-display region is provided with a gate drive circuit including a plurality of cascaded drive control circuits. The pixel circuit at least includes a drive sub-circuit, a light emitting control sub-circuit and a second reset sub-circuit; the light emitting control sub-circuit is configured to supply a fifth power supply signal to the drive sub-circuit under the control of the light emitting control signal; the drive sub-circuit is configured to drive the light emitting element to emit light by using the fifth power supply signal; the second reset sub-circuit is configured to reset an anode of the light emitting element under the control of the second reset control signal. The drive control circuit is electrically connected to a signal input terminal, a first output terminal and a second output terminal, and is configured to provide the light emitting control signal to the pixel circuit through the first output terminal and provide a second reset control signal to the pixel circuit through the second output terminal.

In some exemplary embodiments, the pixel circuit further includes: a data writing sub-circuit configured to provide a data signal under control of a scan signal. Within the duration of one frame, the overlapping duration between the reset duration of the anode of the light emitting element under the control of the second reset control signal and the duration during which the light emitting element is not driven by the light emitting control signal is longer than twice the effective level duration of the scan signal.

In some exemplary embodiments, the drive control circuit includes: an input circuit, a first output circuit, and a second output circuit; the input circuit is configured to control the potentials of the first node and the second node under the control of the signal input terminal and the clock signal terminal. The first output circuit is configured to provide a light emitting control signal to the pixel circuit through a first output terminal under the control of the first node and the second node. The second output circuit is configured to provide a second reset control signal to the pixel circuit through a second output terminal under the control of the first node and the second node.

In some exemplary embodiments, the drive control circuit is electrically connected to a clock signal line, a first power supply line, and a second power supply line. The first power supply line and the clock signal line are arranged in a first direction along a direction in which the input circuit is away from the first output circuit, and the second power supply line is located on a side of the second output circuit away from the first output circuit in the first direction. Alternatively, the second power supply line and the clock signal line are arranged in the first direction along a direction in which the input circuit is away from the first output circuit, and the first power supply line is located on a side of the second output circuit away from the first output circuit in the first direction.

In some exemplary embodiments, the signal input terminal, the first output terminal and the second output terminal are of the same layer structure.

In some exemplary embodiments, the input circuit includes: an input sub-circuit, a first control sub-circuit, a second control sub-circuit, and a third control sub-circuit. The input sub-circuit is electrically connected with the signal input terminal, the first clock terminal, the second power supply line, the second node, and the third node, and is configured to control the potentials of the second node and the third node under the control of the first clock terminal and the signal input terminal. The first control sub-circuit is electrically connected with the second node, the third node, the first power supply line and the second clock terminal, and is configured to control the potential of the second node under the control of the third node and the second clock terminal. The second control sub-circuit is electrically connected with the third node, the first node and the second clock terminal, and is configured to control the potential of the first node under the control of the third node and the second clock terminal. The third control sub-circuit is electrically connected to the first node, the second node and the first power supply line, and is configured to control the potential of the first node under the control of the second node. The third control sub-circuit is located between the first output circuit and the second output circuit in a first direction, and the input sub-circuit, the first control sub-circuit and the second control sub-circuit are located on a side of the first output circuit away from the second output circuit in the first direction.

In some exemplary embodiments, the input sub-circuit at least includes a third transistor; the first control sub-circuit at least includes a third capacitor; the third control sub-circuit at least includes an eighth transistor; the first output circuit at least includes a second output transistor; the second output circuit at least includes a fourth output transistor. The control electrode of the third transistor, the control electrode of the second output transistor, the control electrode of the eighth transistor, the control electrode of the fourth output transistor and the first electrode plate of the third capacitor are in an integrated structure.

In some exemplary embodiments, the third control sub-circuit further includes a first capacitor; the first output circuit further includes a first output transistor; the second output circuit further includes a third output transistor and a fourth capacitor. The control electrode of the first output transistor, the control electrode of the third output transistor, the first electrode plate of the first capacitor and the first electrode plate of the fourth capacitor are in an integrated structure.

In some exemplary embodiments, the input sub-circuit further includes a fourth transistor and a fifth transistor; the control electrode of the fourth transistor and the control electrode of the fifth transistor are in an integrated structure, and are electrically connected with the first clock signal line, and further connected with the first electrode of the third transistor through a tenth connection electrode.

In some exemplary embodiments, the first control sub-circuit further includes a second transistor; the second control sub-circuit at least includes a sixth transistor and a seventh transistor. The control electrode of the second transistor is electrically connected with the second clock signal line, and is electrically connected with the second electrode plate of the third capacitor, the second electrode of the sixth transistor and the control electrode of the seventh transistor through an eleventh connection electrode. An orthographic projection of the eleventh connection electrode on the substrate is L-shaped.

In some exemplary embodiments, the input circuit, the first output circuit, and the second output circuit are sequentially arranged in a first direction.

In some exemplary embodiments, the first output terminal includes a first portion, a second portion, and a third portion connected in sequence; the first portion extends in a second direction and is located between the first output circuit and the second output circuit, the second portion extends in the first direction along a side away from the second output circuit, and the third portion extends in the first direction along a side away from the input circuit. The second output terminal includes a fourth portion and a fifth portion connected in sequence; the fourth portion extends along the second direction and is located on a side of the second output circuit away from the first output circuit, and the fifth portion extends along the first direction and is located on a side of the third portion close to the drive control circuit; wherein the second direction crosses the first direction.

In some exemplary embodiments, the input circuit includes: an input sub-circuit, a first control sub-circuit, a second control sub-circuit, and a third control sub-circuit. The input sub-circuit is electrically connected with the signal input terminal, the first clock terminal, the second power supply line, the second node, and the third node, and is configured to control the potentials of the second node and the third node under the control of the first clock terminal and the signal input terminal. The first control sub-circuit is electrically connected with the second node, the third node, the first power supply line, and the second clock terminal, and is configured to store the signal supplied by the first power supply line or the second clock terminal under the control of the second node and the third node. The second control sub-circuit is electrically connected with the third node, the first node and the second clock terminal, and is configured to control the potential of the first node under the control of the third node and the second clock terminal. The third control sub-circuit is electrically connected to the first node, the second node and the first power supply line, and is configured to control the potential of the first node under the control of the second node. The third control sub-circuit is located between the second control sub-circuit and the first output circuit in the first direction, and the input sub-circuit, the second control sub-circuit and the first output circuit surround three sides of the first control sub-circuit.

In some exemplary embodiments, the first control sub-circuit includes a first transistor, a second transistor, and a third capacitor; the third control sub-circuit includes an eighth transistor and a first capacitor; the first output circuit includes a first output transistor and a second output transistor; the second output circuit includes a third output transistor, a fourth output transistor and a fourth capacitor. The control electrode of the second transistor, the control electrode of the second output transistor, the control electrode of the fourth output transistor and the first electrode plate of the third capacitor are in an integrated structure. The control electrode of the first output transistor and the first electrode plate of the first capacitor are in an integrated structure, and the control electrode of the third output transistor and the first electrode plate of the fourth capacitor are in an integrated structure.

In some exemplary embodiments, the second electrode of the first transistor is electrically connected to the second electrode of the second transistor and the second electrode plate of the third capacitor through a forty-first connection electrode.

In some exemplary embodiments, the input sub-circuit includes: a third transistor, a fourth transistor and a fifth transistor. The control electrode of the third transistor and the control electrode of the eighth transistor are in an integrated structure and are electrically connected with the control electrode of the second transistor through a fortieth connection electrode, a thirty-second connection electrode and a forty-second connection electrode in turn; the fortieth connection electrode and the forty-second connection electrode are located on a side of the thirty-second connection electrode away from the substrate. The control electrode of the fourth transistor and the control electrode of the fifth transistor are in an integrated structure, and are electrically connected with the first clock signal line.

In some exemplary embodiments, the second control sub-circuit includes a sixth transistor, a seventh transistor, and a second capacitor; the control electrode of the sixth transistor and the first electrode plate of the second capacitor are in an integrated structure. The first electrode of the sixth transistor is electrically connected to a forty-fourth connection electrode, the forty-fourth connection electrode is electrically connected to the second clock signal line through a thirty-fifth connection electrode, and the forty-fourth connection electrode is electrically connected to the control electrode of the seventh transistor and the first electrode of the second transistor.

In some exemplary embodiments, an active layer of the first transistor, an active layer of the seventh transistor, and an active layer of the eighth transistor are in an integrated structure, and the orthographic projection on the substrate is G-shaped.

In some exemplary embodiments, the second electrode of the first output transistor, the second electrode of the second output transistor and the first output terminal are electrically connected through a forty-seventh connection electrode, and the second electrode of the third output transistor, the second electrode of the fourth output transistor and the second output terminal are electrically connected through a fifty-first connection electrode; both the orthographic projection of the forty-seventh connection electrode and the orthographic projection of the fifty-first connection electrode on the substrate are a “王” shape.

In another aspect, an embodiment of the present disclosure provides a display apparatus, which includes the aforementioned display substrate.

Other aspects may be understood upon reading and understanding the drawings and the detailed description.

BRIEF DESCRIPTION OF DRAWINGS

Accompanying drawings are used for providing further understanding of technical solutions of the present disclosure, constitute a part of the specification, and together with the embodiments of the present disclosure, are used for explaining the technical solutions of the present disclosure but not to constitute limitations on the technical solutions of the present disclosure. Shapes and sizes of one or more components in the drawings do not reflect true scales, and are only intended to schematically describe contents of the present disclosure.

DETAILED DESCRIPTION

Figure 1:
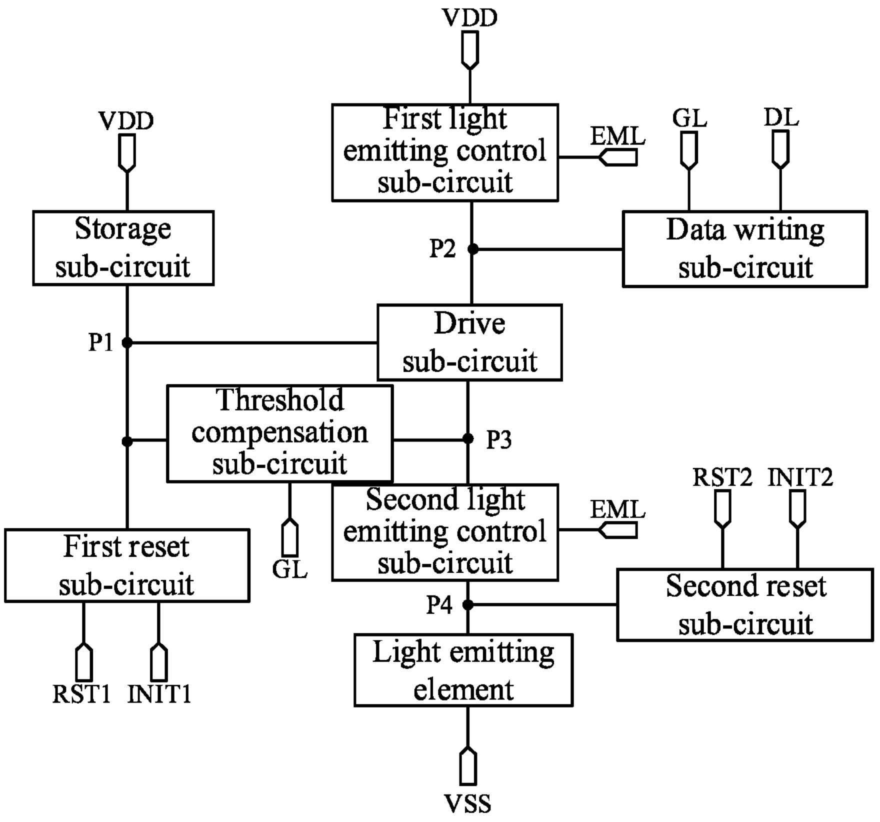
FIG. 1 is a schematic diagram of a pixel circuit according to at least one embodiment of the present disclosure.

The embodiments of the present disclosure will be described below in combination with the drawings in detail. Implementations may be implemented in a plurality of different forms. Those of ordinary skills in the art may easily understand such a fact that implementation modes and contents may be transformed into one or more forms without departing from the purpose and scope of the present disclosure. Therefore, the present disclosure should not be explained as being limited to contents described in following implementation modes only. The embodiments in the present disclosure and features in the embodiments may be combined randomly with each other if there is no conflict.

In the drawings, a size of one or more constituent elements, a thickness of a layer, or a region is sometimes exaggerated for clarity. Therefore, a mode of the present disclosure is not necessarily limited to the size, and a shape and a size of one or more components in the drawings do not reflect a true proportion. In addition, the drawings schematically illustrate ideal examples, and one implementation of the present disclosure is not limited to the shapes, numerical values, or the like shown in the drawings.

Ordinal numerals such as “first”, “second” and “third” in the present disclosure are set to avoid confusion of constituent elements, but not intended for restriction in quantity. In the present disclosure, “a plurality of” represents two or more than two.

In the present disclosure, for convenience, wordings "central", "up", "down", "front", "back", "vertical", "horizontal", "top", "bottom", "inside", "outside" and the like indicating orientation or positional relationships are used to illustrate positional relationships between constituent elements with reference to the drawings. These wordings are not intended to indicate or imply that involved devices or elements must have specific orientations and be structured and operated in the specific orientations, but only to facilitate describing the present specification and simplify the description, and thus should not be understood as limitations on the present disclosure. The positional relationships between the constituent elements are changed as appropriate based on directions which are used for describing the constituent elements. Therefore, appropriate replacements may be made according to situations without being limited to the wordings described in the specification.

In the present disclosure, unless otherwise specified and defined, terms "mounting", "mutual connection" and "connection" should be understood in a broad sense. For example, a connection may be a fixed connection, or a detachable connection, or an integrated connection. It may be a mechanical connection or an electrical connection. It may be a direct mutual connection, or an indirect connection through middleware, or internal communication between two components. Those of ordinary skills in the art may understand meanings of the above-mentioned terms in the present disclosure according to situations. An "electrical connection" includes a case where constituent elements are connected together through an element with some electric action. The "element having some electrical function" is not particularly limited as long as electrical signals between the connected constituent elements may be transmitted. Examples of the "element with the certain electrical effect" not only include electrodes and wirings, but include switching elements (such as transistors), resistors, inductors, capacitors, other elements with one or more functions, etc.

In the present disclosure, a transistor refers to an element at least including three terminals, i.e., a gate electrode (gate), a drain electrode, and a source electrode. The transistor has a channel area between the drain electrode (drain electrode terminal, drain region, or drain) and the source electrode (source electrode terminal, source region, or source), and a current can flow through the drain electrode, the channel area, and the source electrode. In the present disclosure, the channel area refers to a region through which a current mainly flows.

In the present disclosure, to distinguish two electrodes of a transistor except a gate electrode, one of the electrodes is referred to as a first electrode and the other electrode is referred to as a second electrode. The first electrode may be a source electrode or a drain electrode, and the second electrode may be a drain electrode or a source electrode. In addition, the gate electrode of the transistor is referred to as a control electrode. In cases that transistors with opposite polarities are used, a current direction changes during operation of a circuit, or the like, functions of the "source electrode" and the "drain electrode" are sometimes interchangeable. Therefore, the "source electrode" and the "drain electrode" are interchangeable in the present disclosure.

In the present disclosure, "parallel" refers to a state in which an angle formed by two straight lines is above −10 degrees and below 10 degrees, and thus may include a state in which the angle is above −5 degrees and below 5 degrees. In addition, "perpendicular" refers to a state in which an angle formed by two straight lines is above 80 degrees and below 100 degrees, and thus may include a state in which the angle is above 85 degrees and below 95 degrees.

In the present disclosure, "film" and "layer" are interchangeable. For example, a "conductive layer" may be replaced with a "conductive film" sometimes. Similarly, an "insulating film" may be replaced with an "insulating layer" sometimes.

In the present disclosure, "about", "approximate" and "approximately" refer to a case that a boundary is defined not so strictly and a process and measurement error within a range is allowed.

In some exemplary implementations, the display substrate may include: a display region and a non-display region. For example, the non-display region may be located at a periphery of the display region. However, this embodiment is not limited thereto. The display region at least includes: a plurality of sub-pixels, a plurality of gate lines extending along the first direction (for example including: s scan line, s first reset control line, s second reset control line and an light emitting control line), a plurality of data lines and power supply lines extending along the second direction. At least one sub-pixel includes a pixel circuit and a light emitting element. The pixel circuit is electrically connected with the light emitting element, and is configured to drive the light emitting element to emit light. The first direction and the second direction are located in a same plane, and the first direction interacts with the second direction, for example, the first direction may be perpendicular to the second direction. The non-display region may be provided with a plurality of gate drive circuits. Each gate drive circuit may include a plurality of cascaded drive control circuits. The gate drive circuit may be configured to provide a gate drive signal (e.g. a scan signal, a reset control signal, a light emitting control signal and the like) to a pixel circuit of the display region.

In some exemplary embodiments, the pixel circuit of the display region may include at least a drive sub-circuit, a light emitting control sub-circuit, and a second reset sub-circuit. The light emitting control sub-circuit is configured to supply a fifth power supply signal transmitted by the third power supply line to the drive sub-circuit under the control of the light emitting control signal. The drive sub-circuit is configured to drive the light emitting element to emit light using the fifth power supply signal. The second reset sub-circuit is electrically connected to the anode of the light emitting element and is configured to reset the anode of the light emitting element under the control of the second reset control signal. In some examples, the light emitting control sub-circuit may include a first light emitting control sub-circuit and a second light emitting control sub-circuit.

FIG. 1 is a schematic diagram of a pixel circuit according to at least one embodiment of the present disclosure. In some exemplary embodiments, as shown in FIG. 1, the pixel circuit of the present embodiment may include a data writing sub-circuit, a drive sub-circuit, a threshold compensation sub-circuit, a storage sub-circuit, a first light emitting control sub-circuit, a second light emitting control sub-circuit, a first reset sub-circuit, and a second reset sub-circuit. The data writing sub-circuit is electrically connected to the scan line GL, the data line DL, and the second pixel node P2, and is configured to write the data signal supplied by the data line DL to the second pixel node P2 under the control of the first scan line GL. The drive sub-circuit is electrically connected to the first pixel node P1, the second pixel node P2 and the third pixel node P3, and is configured to provide a drive current to the third pixel node P3 under the control of the first pixel node P1. The first light emitting control sub-circuit is electrically connected to the second pixel node P2, the fifth power supply line VDD, and the light emitting control line EML, and is configured to supply a fifth power supply signal transmitted by the fifth power supply line VDD to the second pixel node P2 under the control of the light emitting control line EML. The second light emitting control sub-circuit, together with the third pixel node P3, the fourth pixel node P4 and the light emitting control line EML, is configured to turn on the third pixel node P3 and the fourth pixel node P4 under the control of the light emitting control line EML. The first reset sub-circuit is configured to reset the first pixel node P1. The first reset sub-circuit is electrically connected to the first pixel node P1, the first reset control line RST1, and the first initial signal line INIT1, and is configured to supply a first initial signal transmitted by the first initial signal line INIT1 to the first pixel node P1 under the control of the first reset control line RST1. The second reset sub-circuit is configured to reset the fourth pixel node P4. The second reset sub-circuit is electrically connected to the fourth pixel node P4, the second reset control line RST2, and the second initial signal line INIT2, and is configured to supply a second initial signal transmitted by the second initial signal line INIT2 to the fourth pixel node P4 under the control of the second reset control line RST2. The threshold compensation sub-circuit is electrically connected to the first pixel node P1, the third pixel node P3 and the scan line GL, and is configured to turn on the first pixel node P1 and the third pixel node P3 under the control of the scan line GL. The storage sub-circuit is electrically connected to the first pixel node P1 and the fifth power supply line VDD, and is configured to maintain the potential of the first pixel node P1.

Figure 2:
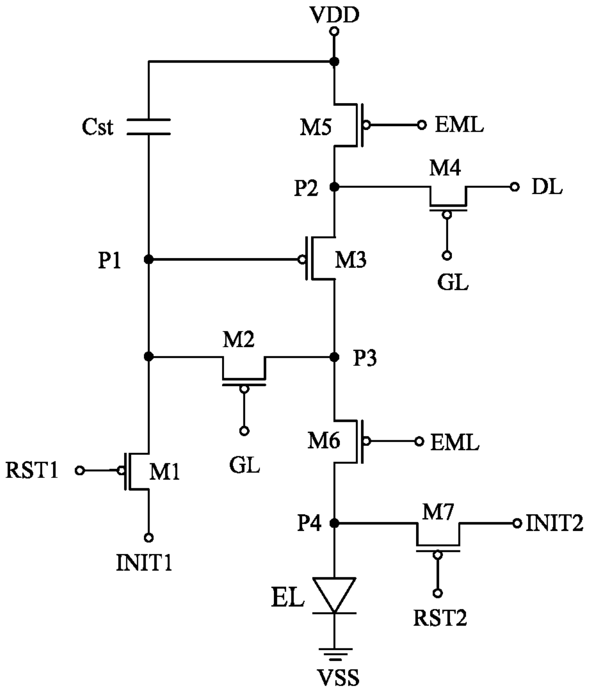
FIG. 2 is an equivalent circuit diagram of a pixel circuit according to at least one embodiment of the present disclosure.
Figure 3:
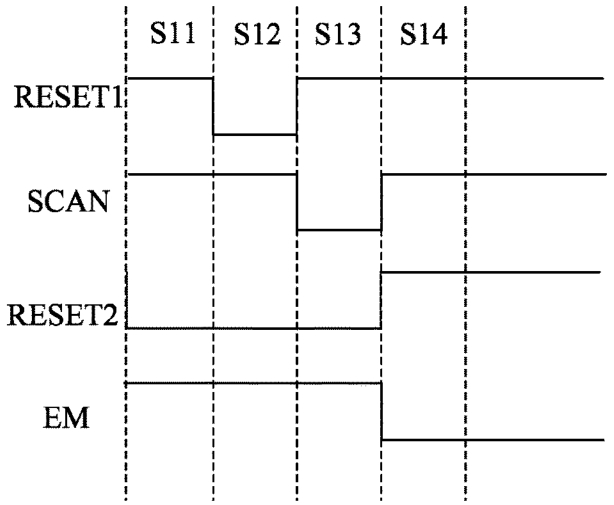
FIG. 3 is a working timing diagram of the pixel circuit provided in FIG. 2.

FIG. 2 is an equivalent circuit diagram of a pixel circuit according to at least one embodiment of the present disclosure. FIG. 3 is a working timing diagram of the pixel circuit provided in FIG. 2. The pixel circuit of the present exemplary embodiment is described by taking a 7T1C structure as an example. However, this embodiment is not limited thereto.

In some exemplary embodiments, as shown in FIG. 2, the drive sub-circuit may include a drive transistor M3; the data writing sub-circuit may include a data writing transistor M4; the threshold compensation sub-circuit may include a threshold compensation transistor M2; the first light emitting control sub-circuit may include a first light emitting control transistor M5; the second light emitting control sub-circuit may include a second light emitting control transistor M6; the first reset sub-circuit may include a first reset transistor M1; the second reset sub-circuit may include a second reset transistor M7; and the storage sub-circuit may include a storage capacitor Cst. The light emitting element E1 may include an anode, a cathode and an organic light emitting layer disposed between the anode and the cathode. In some examples, the organic light-emitting layer may include a multi-layer structure formed by one or more film layers selected from an Emitting Layer (EML), a Hole Injection Layer (HIL), a Hole Transport Layer (HTL), a Hole Block Layer (HBL), an Electron Block Layer (EBL), an Electron Injection Layer (EIL), and an Electron Transport Layer (ETL). For example, under the driving of voltages of the anode and the cathode, the organic light-emitting layer may emit light according to the required gray scale using light emitting properties of the organic materials.

In some exemplary embodiments, the seven transistors of the pixel circuit may be P-type transistors, or may be N-type transistors. Adopting a same type of transistors in a pixel circuit may simplify a process flow, reduce a process difficulty of a display substrate, and improve a yield of products. In some possible embodiments, the seven transistors in the pixel circuit may include P-type transistors and N-type transistors.

In some exemplary embodiments, the seven transistors in the pixel circuit may be low temperature poly-silicon thin film transistors, or may be oxide thin film transistors, or may be low temperature poly-silicon thin film transistors and oxide thin film transistors. An active layer of a Low Temperature Poly-Silicon thin film transistor is made of Low Temperature Poly-Silicon (LTPS), and an active layer of an oxide thin film transistor is made of an oxide semiconductor (Oxide). A Low-temperature Poly-Silicon thin film transistor has advantages such as a high mobility and fast charging, while an oxide thin film transistor has an advantage such as a low leakage current. The Low Temperature Poly-Silicon thin film transistor and the oxide thin film transistor are integrated on one display substrate to form a Low Temperature Polycrystalline Oxide (LTPO) display substrate, and advantages of both the Low Temperature Poly-Silicon thin film transistor and the oxide thin film transistor may be utilized, which may achieve low frequency drive, reduce power consumption, and improve display quality.

In some exemplary embodiments, as shown in FIG. 2, the fifth power supply line VDD is configured to provide a fifth power supply signal of a constant high potential, and the sixth power supply line VSS is configured to provide a sixth power supply signal of a constant low potential. The scan line GL is configured to provide a scan signal SCAN to the pixel circuit, the data line DL is configured to provide a data signal DATA to the pixel circuit, the light emitting control line EML is configured to provide a light emitting control signal EM to the pixel circuit, the first reset control line RST1 is configured to provide a first reset control signal RESET1 to the pixel circuit, and the second reset control line RST2 is configured to provide a second reset control signal RESET2 to the pixel circuit. In some examples, in a pixel circuit of an n-th row, a first reset control line RST1 may be electrically connected with a scan line GL of a pixel circuit of an (n−1)-th row to be inputted with a scan signal SCAN(n−1), that is, a first reset control signal RESET1(*n*) may be the same as the scan signal SCAN(n−1). Where n is an integer. Thus, signal lines of the display substrate may be reduced, and a narrow bezel of the display substrate may be achieved. However, this embodiment is not limited thereto.

In some exemplary embodiments, the first initial signal line INIT1 is configured to provide a first initial signal to the pixel circuit, and the second initial signal line INIT2 is configured to provide a second initial signal to the pixel circuit. The magnitude of the first initial signal and the second initial signal may be the same or different. For example, the first initial signal and the second initial signal may be constant voltage signals whose magnitude may be between the fifth power supply signal and the sixth power supply signal, for example. In some examples, the voltage value of the second initial signal may be less than the voltage value of the first initial signal. For example, the voltage value of the second initial signal may be 2V lower than the voltage value of the first initial signal. However, this embodiment is not limited thereto.

In some exemplary implementations, as shown in FIG. 2, a gate electrode of the data writing transistor M4 is electrically connected to the scan line GL, a first electrode of the data writing transistor M4 is electrically connected to the data line DL, and a second electrode of the data writing transistor M4 is electrically connected to a first electrode of the drive transistor M3. A gate of a threshold compensation transistor M2 is electrically connected with a scan line GL, a first electrode of the threshold compensation transistor M2 is electrically connected with a gate of the drive transistor M3, and a second electrode of the threshold compensation transistor M2 is electrically connected with a second electrode of the drive transistor M3. A gate of a first light emitting control transistor M5 is electrically connected with an light emitting control line EML, a first electrode of the first light emitting control transistor M5 is electrically connected with a fifth power supply line VDD, and a second electrode of the first light emitting control transistor M5 is electrically connected with the first electrode of the drive transistor M3. A gate of a second light emitting control transistor M6 is electrically connected with the light emitting control line EML, a first electrode of the second light emitting control transistor M6 is electrically connected with the second electrode of the drive transistor M3, and a second electrode of the second light emitting control transistor M6 is electrically connected with an anode of the light emitting element EL. A gate of the first reset transistor M1 is electrically connected with a first reset control line RST1, a first electrode of the first reset transistor M1 is electrically connected with a first initial signal line INIT1, and a second electrode of the first reset transistor M1 is electrically connected with the gate of the drive transistor M3. A gate of the second reset transistor M7 is electrically connected with a second reset control line RST2, a first electrode of the second reset transistor M7 is electrically connected with a second initial signal line INIT2, and a second electrode of the second reset transistor M7 is electrically connected with the anode of the light emitting element EL. The first electrode plate of the storage capacitor Cst is electrically connected to the gate electrode of the drive transistor M3, and the second electrode plate of the storage capacitor Cst is electrically connected to the fifth power supply line VDD. The anode of the light emitting element EL is electrically connected to the fourth pixel node P4, and the cathode of the light emitting element EL is electrically connected to the sixth power supply line VSS.

In this example, a first pixel node P1 is a connection point for the storage capacitor Cst, the first reset transistor M1, the drive transistor M3, and the threshold compensation transistor M2, a second pixel node P2 is a connection point for the first light emitting control transistor M5, the data writing transistor M4, and the drive transistor M3, a third pixel node P3 is a connection point for the drive transistor M3, the threshold compensation transistor M2, and the second light emitting control transistor M6, and a fourth pixel node P4 is a connection point for the second light emitting control transistor M6, the second reset transistor M7, and the light emitting element EL.

A working process of the pixel circuit shown in FIG. 2 will be described below with reference to FIG. 3. The description is given by taking a case in which a plurality of transistors included in the pixel circuit shown in FIG. 2 are all P-type transistors as an example.

In some exemplary implementation modes, as shown in FIG. 3, during one frame display period, the working process of the pixel circuit may include a first stage S11, a second stage S12, a third stage S13, and a fourth stage S14.

The first stage S11 is referred to as a first reset stage. The second reset control signal RESET2 provided by the second reset control line RST2 is a low-level signal, the second reset transistor M7 is turned on, and the second initial signal supplied by the second initial signal line INIT2 is supplied to the fourth pixel node P4 to reset the anode of the light emitting element EL. The first reset control signal RESET1 provided by the first reset control line RST1 is a high-level signal, the scan signal SCAN provided by the scan line GL is a high-level signal, and the light emitting control signal EM provided by the light emitting control line EML is a high-level signal. The first reset transistor M1, the data writing transistor M4, the threshold compensation transistor M2, the first light emitting control transistor M5 and the second light emitting control transistor M6 are all turned off. In this stage, the light emitting element EL does not emit light.

The second stage S12 is referred to as a second reset stage. The first reset control signal RESET1 provided by the first reset control line RST1 is a low-level signal, and the first reset transistor M1 is turned on. The first initial signal provided by the first initial signal line INIT1 is provided to the first pixel node P1 to initialize the first pixel node P1 and clear the original data voltage in the storage capacitor Cst. A scan signal SCAN provided by the scan line GL is a high-level signal, and a light emitting control signal EM provided by the light emitting control line EML is a high-level signal, so that the data writing transistor M4, the threshold compensation transistor M2, the first light emitting control transistor M5, and the second light emitting control transistor M6 are turned off. The second reset control signal RESET2 supplied by the second reset control line RST2 is a low-level signal, and the second reset transistor M7 is turned on to reset the anode of the light emitting element EL. In this stage, the light emitting element EL does not emit light.

The third stage S13 is referred to as a data writing stage or a threshold compensation stage. A scan signal SCAN provided by the scan line GL is a low-level signal, a first reset control signal RESET1 provided by the first reset control line RST1 and an emitting control signal EM provided by the emitting control line EML are both high-level signals, and the data line DL outputs a data signal DATA. In this phase, the first electrode plate of the storage capacitor Cst is at a low-level, such that the drive transistor M3 is turned on. The scan signal SCAN is a low-level signal, so that the threshold compensation transistor M2, and the data writing transistor M4 are turned on. The threshold compensation transistor M2 and the data writing transistor M4 are turned on, so that the data voltage output by the data line DL is provided to the first pixel node P1 through the second pixel node P2, the turned-on drive transistor M3, the third pixel node P3, and the turned-on threshold compensation transistor M2, and charge the difference between the data voltage output by the data line DL and the threshold voltage of the drive transistor M3 into the storage capacitor Cst. The voltage of the first electrode plate of the storage capacitor Cst (that is, the first pixel node P1) is $Vdata-|Vth|$, where Vdata is the data voltage output from the data line DL, and Vth is the threshold voltage of the drive transistor M3. The second reset control signal RESET2 supplied by the second reset control line RST2 is a low-level signal, and the second reset transistor M7 is turned on, so that the second initial signal supplied by the second initial signal line INIT2 is supplied to the anode of the light emitting element EL to ensure that the light emitting element EL does not emit light. The first reset control signal RESET1 provided by the first reset control line RST1 is a high-level signal, so that the first reset transistor M1 is turned off. The light emitting control signal EM provided by the light emitting control signal line EML is a high-level signal, so that the first light emitting control transistor M5 and the second light emitting control transistor M6 are turned off.

The fourth stage S14 is referred to as a light emitting stage. The light emitting control signal EM provided by the light emitting control signal line EML is a low-level signal, so that the first light emitting control transistor M5 and the second light emitting control transistor M6 are turned on, and a fifth power supply signal of the high-level output by the fifth power supply line VDD provides a drive voltage to the anode of the light emitting element EL through the turned-on first light emitting control transistor M5, the drive transistor M3, and the second light emitting control transistor M6 to drive the light emitting element EL to emit light. The scan signal SCAN supplied by the scan line GL, the first reset control signal RESET1 supplied by the first reset control line RST1, and the second reset control signal RESET2 supplied by the second reset control line RST2 are all high-level signals, and the threshold compensation transistor M2, the data writing transistor M4, the first reset transistor M1, and the second reset transistor M7 are all turned off.

In a drive process of the pixel circuit, a drive current flowing through the drive transistor M3 is determined by a voltage difference between the gate and the first electrode of the drive transistor T3. Because the voltage of the first pixel node P1 is Vdata−|Vth|, the drive current of the drive transistor M3 is as follows.

$$I=K\times(Vgs-Vth)^2=K\times[(Vdd-Vdata+|Vth|)-Vth]^2=K\times[Vdd-Vdata]^2.$$

Among them, I is the drive current flowing through the drive transistor M3, that is, the drive current for driving the light emitting element EL; K is a constant; Vgs is the voltage difference between the gate and the first electrode of the drive transistor M3; Vth is the threshold voltage of the drive transistor M3; Vdata is the data voltage output by the data line DL, and Vdd is the fifth power supply signal output from the fifth power supply line VDD.

It may be seen from the above formula that a current flowing through the light emitting element EL has nothing to do with the threshold voltage of the drive transistor M3. Therefore, the pixel circuit of this embodiment may better compensate the threshold voltage of the drive transistor M3.

In some exemplary embodiments, within the duration of one frame, the overlapping duration between the reset duration of the anode of the light emitting element under the control of the second reset control signal and the duration during which the light emitting element is not driven by the light emitting control signal may be longer than twice the effective level duration of the scan signal supplied by the scan line. For example, the overlapping duration may be approximately three times the effective level duration of the scan signal. The effective level of the scan signal supplied by the scan line may be a low-level.

The present embodiment provides a drive control circuit, which can simultaneously provide a light emitting control signal and a second reset control signal to a pixel circuit in a display region, so that the pixel circuit can control the anode of a light emitting element to be reset by using the second reset control signal, and then control the light emitting element to emit light by using the light emitting control signal. In this example, the reset time of the fourth pixel node under the control of the second reset control signal is longer than the reset time of the first pixel node under the control of the first reset control signal.

In some implementations, the mobility of the hole transport material of the organic small molecule used in the organic light emitting layer of the light emitting element is generally two orders of magnitude higher than that of the electron transport material. Therefore, with the increase of the luminescent duration of the light emitting element, redundant holes will remain, resulting in leakage current and affecting the service life of the light emitting element. The second reset control signal supplied by the embodiment can increase the anode reset time of the light emitting element, so as to maintain the anode reset voltage of the light emitting element for a long time and avoid the formation of leakage current, thereby prolonging the service life of the light emitting element. Moreover, the number of gate drive circuits in the non-display region of the display substrate can be reduced to reduce the area of the circuit of the non-display region, which is beneficial to achieving the narrow bezel design of the display substrate.

Figure 4:
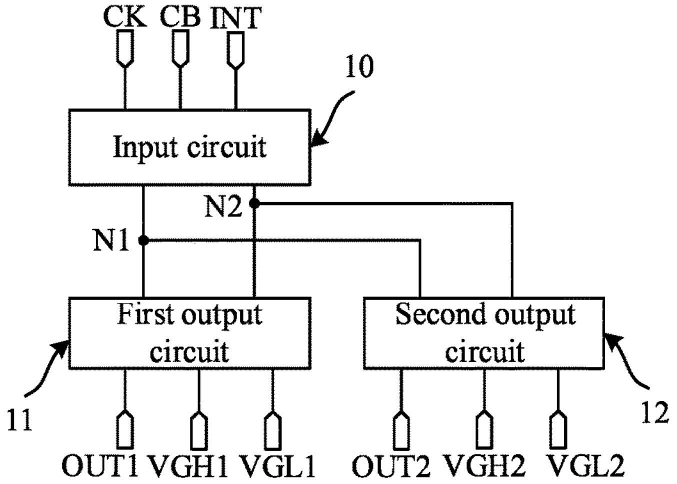
FIG. 4 is a schematic diagram of a drive control circuit according to at least one embodiment of the present disclosure.

FIG. 4 is a schematic diagram of a drive control circuit according to at least one embodiment of the present disclosure. In some exemplary implementations, as shown in FIG. 4, the drive control circuit of this embodiment may include: an input circuit 10, a first output circuit 11 and a second output circuit 12. The input circuit 10 is electrically connected to a signal input terminal INT, a clock signal terminal (including, for example, a first clock terminal CK and a second clock terminal CB), a first node N1 and a second node N2, and is configured to control the potentials of the first node N1 and the second node N2 under the control of the signal input terminal INT and the clock signal terminal. The first output circuit 11 is electrically connected to the first node N1, the second node N2, the first output terminal OUT1, the first power supply line VGH1 and the second power supply line VGL1, and is configured to output a first power supply signal supplied by a first power supply line VGH1 to a first output terminal OUT1 under the control of a first node N1, or to output a second power supply signal supplied by a second power supply line VGL1 to a second output terminal OUT2 under the control of a second node N2. The second output circuit 12 is electrically connected to the first node N1, the second node N2, the second output terminal OUT2, the third power supply line VGH2 and the fourth power supply line VGL2, and is configured to output a fourth power supply signal supplied by the fourth power supply line VGL2 to the second output terminal OUT2 under the control of the first node N1, or to output a third power supply signal supplied by the third power supply line VGH2 to the second output terminal OUT2 under the control of the second node N2.

In some examples, the first power supply line VGH1 and the third power supply line VGH2 may be the same power supply line and the first power supply signal and the third power supply signal may be the same. Alternatively, the first power supply line VGH1 and the third power supply line VGH2 may be two different power supply lines, and the first power supply signal supplied by the first power supply line VGH1 and the third power supply signal supplied by the third power supply line VGH2 may be the same. Alternatively, the first power supply line VGH1 and the third power supply line VGH2 may be two different power supply lines, and the first power supply signal and the third power supply signal may be different. However, this embodiment is not limited thereto.

In some examples, the second power supply line VGL1 and the fourth power supply line VGL2 may be the same power supply line, and the second power supply signal and the fourth power supply signal may be the same. Alternatively, the second power supply line VGL1 and the fourth power supply line VGL2 may be two different power supply lines, and the second power supply signal supplied by the second power supply line VGL1 and the fourth power supply signal supplied by the fourth power supply line VGL2 may be the same. Alternatively, the second power supply line VGL1 and the fourth power supply line VGL2 may be two different power supply lines, and the second power supply signal and the fourth power supply signal may be different. However, this embodiment is not limited thereto.

In some examples, the phases of the output signal of the first output terminal OUT1 and the output signal of the second output terminal OUT2 may be opposite. However, this embodiment is not limited thereto. For example, the absolute values of the voltages of the effective level of the output signal of the first output terminal OUT1 and the output signal of the second output terminal OUT2 may be different.

The drive control circuit provided in this embodiment can provide two kinds of signals (i.e., a light emitting control signal and a second reset control signal) to the pixel circuit. Moreover, the second reset control signal generated by the drive control circuit can maintain the anode reset voltage of the light emitting element for a long time, thus avoiding the formation of leakage current, thereby prolonging the service life of the light emitting element.

Figure 5:
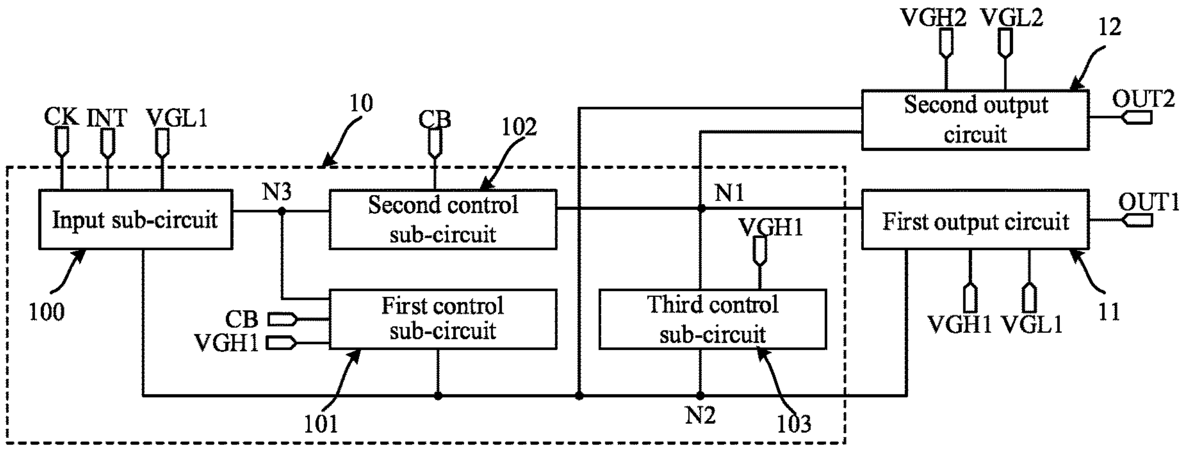
FIG. 5 is another schematic diagram of a drive control circuit according to at least one embodiment of the present disclosure.

FIG. 5 is another schematic diagram of a drive control circuit according to at least one embodiment of the present disclosure. In some exemplary embodiments, as shown in FIG. 5, the input circuit 10 may include: an input sub-circuit 100, a first control sub-circuit 101, a second control sub-circuit 102 and a third control sub-circuit 103. The input sub-circuit 100 is electrically connected to the signal input terminal INT, the first clock terminal CK, the second power supply line VGL1, the second node N2, and the third node N3, and is configured to control the potentials of the second node N2 and the third node N3 under the control of the first clock terminal CK and the signal input terminal INT. The first control sub-circuit 101 is electrically connected with the second node N2, the third node N3, the first power supply line VGH1, and the second clock terminal CB, and is configured to control the potential of the second node N2 under the control of the third node N3 and the second clock terminal CB, or to store the signal supplied by the first power supply line VGH1 or the second clock terminal CB under the control of the second node N2 and the third node N3. The second control sub-circuit 102 is electrically connected to the first node N1, the third node N3 and the second clock terminal CB, and is configured to control the potential of the first node N1 under the control of the third node N3 and the second clock terminal CB. The third control sub-circuit 103 is electrically connected to the first node N1, the second node N2 and the first power supply line VGH1, and is configured to control the potential of the first node N1 under the control of the second node N2.

Figure 6:
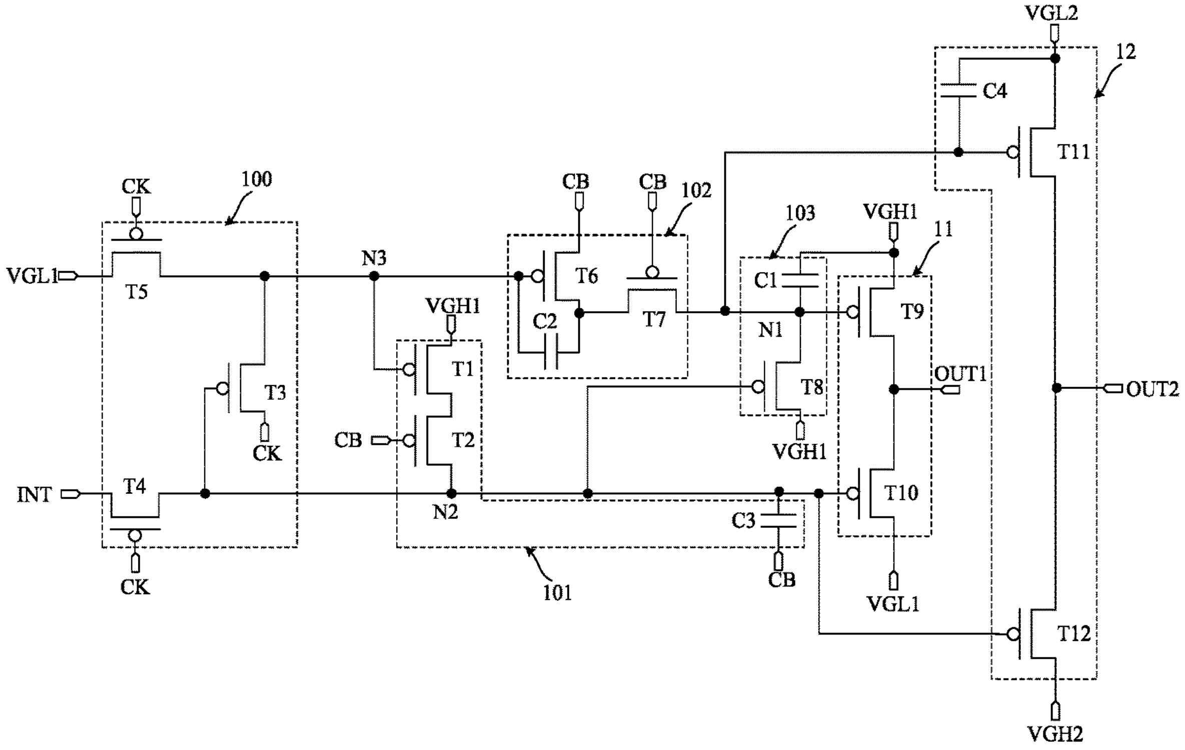
FIG. 6 is an equivalent circuit diagram of a drive control circuit according to at least one embodiment of the present disclosure.

FIG. 6 is an equivalent circuit diagram of a drive control circuit according to at least one embodiment of the present disclosure. In some exemplary embodiments, as shown in FIG. 6, the input sub-circuit 100 may include: a third transistor T3, a fourth transistor T4 and a fifth transistor T5. The first control sub-circuit 101 may include a first transistor T1, a second transistor T2, and a third capacitor C3. The second control sub-circuit 102 may include: a sixth transistor T6, a seventh transistor T7 and a second capacitor C2. The third control sub-circuit 103 may include an eighth transistor T8 and a first capacitor C1. The first output circuit 11 may include a first output transistor T9 and a second output transistor T10. The second output circuit 12 may include a third output transistor T11, a fourth output transistor T12, and a fourth capacitor C4.

In some examples, as shown in FIG. 6, a control electrode of the first transistor T1 is electrically connected to the third node N3, a first electrode of the first transistor T1 is electrically connected to the first power supply line VGH1, and a second electrode of the first transistor T1 is electrically connected to the first electrode of the second transistor T2. A control electrode of the second transistor T2 is electrically connected to the second clock terminal CB, and a second electrode of the second transistor T2 is electrically connected to the second node N2. A control electrode of the third transistor T3 is electrically connected to the second node N2, a first electrode of the third transistor T3 is electrically connected to the first clock terminal CK, and a second electrode of the third transistor T3 is electrically connected to the third node N3. A control electrode of the fourth transistor T4 is electrically connected to the first clock terminal CK, a first electrode of the fourth transistor T4 is electrically connected to the signal input terminal INT, and a second electrode of the fourth transistor T4 is electrically connected to the second node N2. A control electrode of the fifth transistor T5 is electrically connected to the first clock terminal CK, a first electrode of the fifth transistor T5 is electrically connected to the second power supply line VGL1, and a second electrode of the fifth transistor T5 is electrically connected to the third node N3. A control electrode of the sixth transistor T6 is electrically connected to the third node N3, a first electrode of the sixth transistor T6 is electrically connected to the second clock terminal CB, and a second electrode of the sixth transistor T6 is electrically connected to a first electrode of the seventh transistor T7. A control electrode of the seventh transistor T7 is electrically connected with the second clock terminal CB, and a second electrode of the seventh transistor T7 is electrically connected with the first node N1. A control electrode of the eighth transistor T8 is electrically connected to the second node N2, a first electrode of the eighth transistor T8 is electrically connected to the first power supply line VGH1, and a second electrode of the eighth transistor T8 is electrically connected to the first node N1. A control electrode of the first output transistor T9 is electrically connected to the first node N1, a first electrode is electrically connected to the first power supply line VGH1, and a second electrode is electrically connected to the first output terminal OUT1. A control electrode of the second output transistor T10 is electrically connected to the second node N2, a first electrode is electrically connected to the second power supply line VGL1, and a second electrode is electrically connected to the first output terminal OUT1. A control electrode of the third output transistor T11 is electrically connected to the first node N1, a first electrode is electrically connected to the fourth power supply line VGL2, and a second electrode is electrically connected to the second output terminal OUT2. A control electrode of the fourth output transistor T12 is electrically connected to the second node N2, a first electrode is electrically connected to the third power supply line VGH2, and a second electrode is electrically connected to the second output terminal OUT2. A first electrode plate of the first capacitor C1 is electrically connected to the first node N1, and a second electrode plate of the first capacitor C1 is electrically connected to the first power supply line VGH1. A first electrode plate of the second capacitor C2 is electrically connected to the third node N3, and a second electrode plate of the second capacitor C2 is electrically connected to the first electrode of the seventh transistor T7. A first electrode plate of the third capacitor C3 is electrically connected to the second node N2, and a second electrode plate of the third capacitor C3 is electrically connected to the second clock terminal CB. A first electrode plate of the fourth capacitor C4 is electrically connected to the first node N1, and a second electrode plate of the fourth capacitor C4 is electrically connected to the fourth power supply line VGL2.

In this example, the first node N1 is a connection point of the seventh transistor T7, the eighth transistor T8, the first output transistor T9, the third output transistor T11, the first capacitor C1, and the fourth capacitor C4. The second node N2 is a connection point of the second transistor T2, the third transistor T3, the fourth transistor T4, the eighth transistor T8, the tenth transistor T10, the twelfth transistor T12 and the third capacitor C3. The third node N3 is a connection point of the first transistor T1, the third transistor T3, the fifth transistor T5, the sixth transistor T6 and the second capacitor C2.

In some examples, transistors T1 to T12 are of the same type, for example, they are all P-type transistors. However, this embodiment is not limited thereto. For example, a plurality of transistors may all be N-type transistors. In some examples, the P-type transistor may be an LTPS thin film transistor and the N-type transistor may be an oxide thin film transistor such as an IGZO thin film transistor. However, this embodiment is not limited thereto.

In other exemplary embodiments, in FIG. 6, a first voltage stabilizing transistor may be added between the third Node N3 and the second control sub-circuit 102, and a second voltage stabilizing transistor may be added between the second node N2 and the first output circuit 11 and the second output circuit 12. For example, a control electrode of the first voltage stabilizing transistor may be electrically connected to the second power supply line, a first electrode is electrically connected to the third node, and a second electrode is electrically connected to the gate electrode of the sixth transistor and the first electrode plate of the second capacitor. A control electrode of the second voltage stabilizing transistor may be electrically connected to the second power supply line, a first electrode is electrically connected to the second node, and a second electrode is electrically connected to the first electrode plate of the third capacitor, the control electrode of the second output transistor, and the control electrode of the fourth output transistor. However, this embodiment is not limited thereto. In this example, by adding a voltage stabilizing transistor, the potential of the second node and the third node can be guaranteed to be stable.

Figure 7:
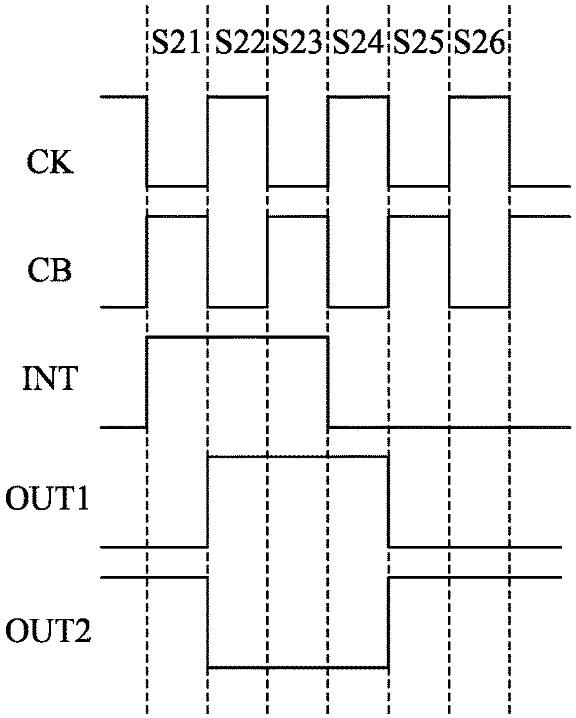
FIG. 7 is a working sequence diagram of a drive control circuit according to at least one embodiment of the present disclosure.

FIG. 7 is a working sequence diagram of a drive control circuit according to at least one embodiment of the present disclosure. The operation process of the drive control circuit shown in FIG. 6 will be described with reference to FIG. 7 by taking the operation process of the first-stage drive control circuit as an example. A signal input terminal of the first stage drive control circuit may be electrically connected with the start signal line. The drive control circuit of the present embodiment may include: twelve transistor cells (i.e. transistors T1 to T12), four capacitor cells (i.e. first capacitor C1 to fourth capacitor C4), three input terminals (i.e. A first clock terminal CK, a second clock terminal CB and a signal input terminal INT), two output terminals (i.e. a first output terminal OUT1 and a second output terminal OUT2), and four power supply terminals (i.e. a first power supply line VGH1, a second power supply line VGL1, a third power supply line VGH2 and a fourth power supply line VGL2). The first power supply line VGH1 can continuously provide a high-level first power supply signal, the second power supply line VGL1 can continuously provide a low-level second power supply signal, the third power supply line VGH2 can continuously provide a high-level third power supply signal, and the fourth power supply line VGL2 can continuously provide a low-level fourth power supply signal. For example, the absolute values of the voltages of the effective levels of the first power supply signal, the second power supply signal, the third power supply signal, and the fourth power supply signal may be substantially the same. However, this embodiment is not limited thereto.

As shown in FIG. 7, the working process of the drive control circuit of this example may include the following stages.

The first stage S21 is referred to as a first shift stage. The signal input terminal INT provides a high-level signal, the first clock terminal CK provides a low-level signal, and the second clock terminal CB provides a high-level signal.

The first clock terminal CK provides a low-level signal, and the fourth transistor T4 and the fifth transistor T5 are turned on. The fourth transistor T4 is turned on, the second node N2 is at a high potential, and the third transistor T3, the eighth transistor T8, the second output transistor T10 and the fourth output transistor T12 are turned off. The fifth transistor T5 is turned on, the third node N3 is at a low potential, and the first transistor T1 and the sixth transistor T6 are turned on.

The second clock terminal CB provides a high-level signal, and the second transistor T2 and the seventh transistor T7 are turned off. The first node N1 maintains the high potential of the previous stage, and the first output transistor T9 and the third output transistor T11 are turned off. Because both the first output transistor T9 and the second output transistor T10 are turned off, the first output terminal OUT1 maintains the low-level signal before output. Because both the third output transistor T11 and the fourth output transistor T12 are turned off, the second output terminal OUT2 maintains the high-level signal before output.

In the second stage S22, it is referred to as an output stage. The signal input terminal INT provides a high-level signal, the first clock terminal CK provides a high-level signal, and the second clock terminal CB provides a low-level signal.

The second clock terminal CB provides a low-level signal, and the second transistor T2 and the seventh transistor T7 are turned on. The first clock terminal CK provides a high-level signal, the fourth transistor T4 and the fifth transistor T5 are turned off, and the third node N3 maintains the low potential of the previous stage under the storage function of the second capacitor C2. The first transistor T1 and the sixth transistor T6 are turned on. The high-level signal supplied by the first power supply line VGH1 is transmitted to the second node N2 through the first transistor T1 and the second transistor T2 which are turned on, so that the second node N2 is held at a high potential, so that the third transistor T3, the eighth transistor T8, the second output transistor T10 and the fourth output transistor T12 are all turned off.

A low-level signal supplied by the second clock terminal CB is transmitted to the first node N1 through a sixth transistor T6 and a seventh transistor T7 which are turned on, so that the first node N1 is at a low potential, and the first output transistor T9 and the third output transistor T11 are turned on. The first output terminal OUT1 outputs a high-level signal supplied by the first power supply line VGH1, and the second output terminal OUT2 outputs a low-level signal supplied by the fourth power supply line VGL2.

The third stage S23 is referred to as a continuous output stage. The signal input terminal INT provides a high-level signal, the first clock terminal CK provides a low-level signal, and the second clock terminal CB provides a high-level signal.

The first clock terminal CK provides a low-level signal, and the fourth transistor T4 and the fifth transistor T5 are turned on. The fourth transistor T4 is turned on, so that the second node N2 is at a high potential, and the third transistor T3, the eighth transistor T8, the second output transistor T10 and the fourth output transistor T12 are turned off. The fifth transistor T5 is turned on, so that the third node T3 is at a low potential, and the first transistor T1 and the sixth transistor T6 are turned on. The second clock terminal CB provides a high-level signal, and the second transistor T2 and the seventh transistor T7 are turned off. The first node N1 maintains the low potential of the previous stage, and the first output transistor T9 and the third output transistor T11 are turned on. The first output terminal OUT1 outputs a high-level signal supplied by the first power supply line VGH1, and the second output terminal OUT2 outputs a low-level signal supplied by the fourth power supply line VGL2.

The fourth stage S24 is referred to as a second shift stage. The signal input terminal INT provides a low-level signal, the first clock terminal CK provides a high-level signal, and the second clock terminal CB provides a low-level signal.

The second clock terminal CB provides a low-level signal, and the second transistor T2 and the seventh transistor T7 are turned on. The first clock terminal CK provides a high-level signal, and the fourth transistor T4 and the fifth transistor T5 are turned off. Under the storage function of the third capacitor C3, the second node N2 maintains the high potential of the previous stage, and the third transistor T3, the eighth transistor T8, the second output transistor T10 and the fourth output transistor T12 are all turned off. Under the storage function of the second capacitor C2, the third node N3 maintains a low potential, and the first transistor T1 and the sixth transistor T6 are turned on. A low-level signal supplied by the second clock terminal CB is transmitted to the first node N1 through a sixth transistor T6 and a seventh transistor T7 which are turned on, so that the first node N1 is at a low potential, and the first output transistor T9 and the third output transistor T11 are turned on. The first output terminal OUT1 outputs a high-level signal supplied by the first power supply line VGH1, and the second output terminal OUT2 outputs a low-level signal supplied by the fourth power supply line VGL2.

The fifth stage S25 is referred to as a pull-down stage. The signal input terminal INT provides a low-level signal, the first clock terminal CK provides a low-level signal, and the second clock terminal CB provides a high-level signal.

The first clock terminal CK provides a low-level signal, and the fourth transistor T4 and the fifth transistor T5 are turned on. The second node N2 is at a low potential, and the third transistor T3, the eighth transistor T8, the second output transistor T10 and the fourth output transistor T12 are all turned on. The third node N3 is at a low potential, and the first transistor T1 and the sixth transistor T6 are turned on. The second clock terminal CB provides a high-level signal, and the second transistor T2 and the seventh transistor T7 are turned off. The first node N1 is at a high potential, and the first output transistor T9 and the third output transistor T11 are turned off. The first output terminal OUT1 outputs a low-level signal supplied by the second power supply line VGL1, and the second output terminal OUT2 outputs a high-level signal supplied by the third power supply line VGH1.

The sixth stage S26 is referred to as a stable stage. The signal input terminal INT provides a low-level signal, the first clock terminal CK provides a high-level signal, and the second clock terminal CB provides a low-level signal.

The first clock terminal CK provides a high-level signal, and the fourth transistor T4 and the fifth transistor T5 are turned off. The second node N2 remain a low potential, and the third transistor T3, the eighth transistor T8, the second output transistor T10 and the fourth output transistor T12 are all turned on. The third node N3 is at a high potential, and the first transistor T1 and the sixth transistor T6 are turned off. The second clock terminal CB provides a low-level signal, and the second transistor T2 and the seventh transistor T7 are turned on. The first node N1 is at a high potential, and the first output transistor T9 and the third output transistor T11 are turned off. The first output terminal OUT1 outputs a low-level signal supplied by the second power supply line VGL1, and the second output terminal OUT2 outputs a high-level signal supplied by the third power supply line VGH2.

After the sixth stage S26, the fifth stage S25 and the sixth stage S26 can be repeated until the signal input terminal INT inputs a high-level signal, and then restart from the first stage S21.

According to the working process of the drive control circuit, from the second stage S22 to the fourth stage S24, the first output terminal OUT1 may output a high-level signal supplied by the first power supply line VGH1, and the second output terminal OUT2 outputs a low-level signal supplied by the fourth power supply line VGL2. In other stages, the first output terminal OUT1 outputs a low-level signal supplied by the second power supply line VGL1, and the second output terminal OUT2 outputs a high-level signal supplied by the third power supply line VGH2. For example, the phases of the first output signal supplied by the first output terminal OUT1 and the second output signal supplied by the second output terminal OUT2 may be opposite. Taking the example where the effective level of the first output signal is high, and the effective level of the second output signal is low, within a frame duration, the effective level duration of the first output signal and the effective level duration of the second output signal may be approximately the same, and the absolute voltage value of the effective level of the first output signal and the absolute voltage value of the effective level of the second output signal may be approximately the same. Within a frame duration, the overlapping duration of the effective level (for example, high-level) of the first output signal and the effective level (for example, low-level) of the second output signal may be longer than one pulse period of the clock signal. The duty ratio of the first clock signal supplied by the first clock terminal and the second clock signal supplied by the second clock terminal may be the same, and the first clock signal and the second clock signal may be high voltage not at the same time. A duty ratio refers to a proportion of a high-level time length to a whole pulse period within a pulse period (including a high-level time length and a low-level time length). However, this embodiment is not limited thereto. In some examples, due to the presence of the rising edge and the falling edge of the signal, the first output signal may be gradually raised when the second output signal is not completely lowered. However, due to the very small time of the duration, it exceeds the recognition ability of the human eye and will not affect the luminescence of the light emitting element.

In some exemplary embodiments, a first output signal supplied by the first output terminal OUT1 may be provided to the pixel circuit as a light emitting control signal, and a second output signal supplied by the second output terminal OUT2 may be provided to the pixel circuit as a second reset control signal. In some examples, the first output signal supplied by the first output terminal of the drive control circuit of the current stage can be transmitted to the signal input terminal of the drive control circuit of the next stage to be as an input signal of the drive control circuit of the next stage. However, this embodiment is not limited thereto.

Figure 8:
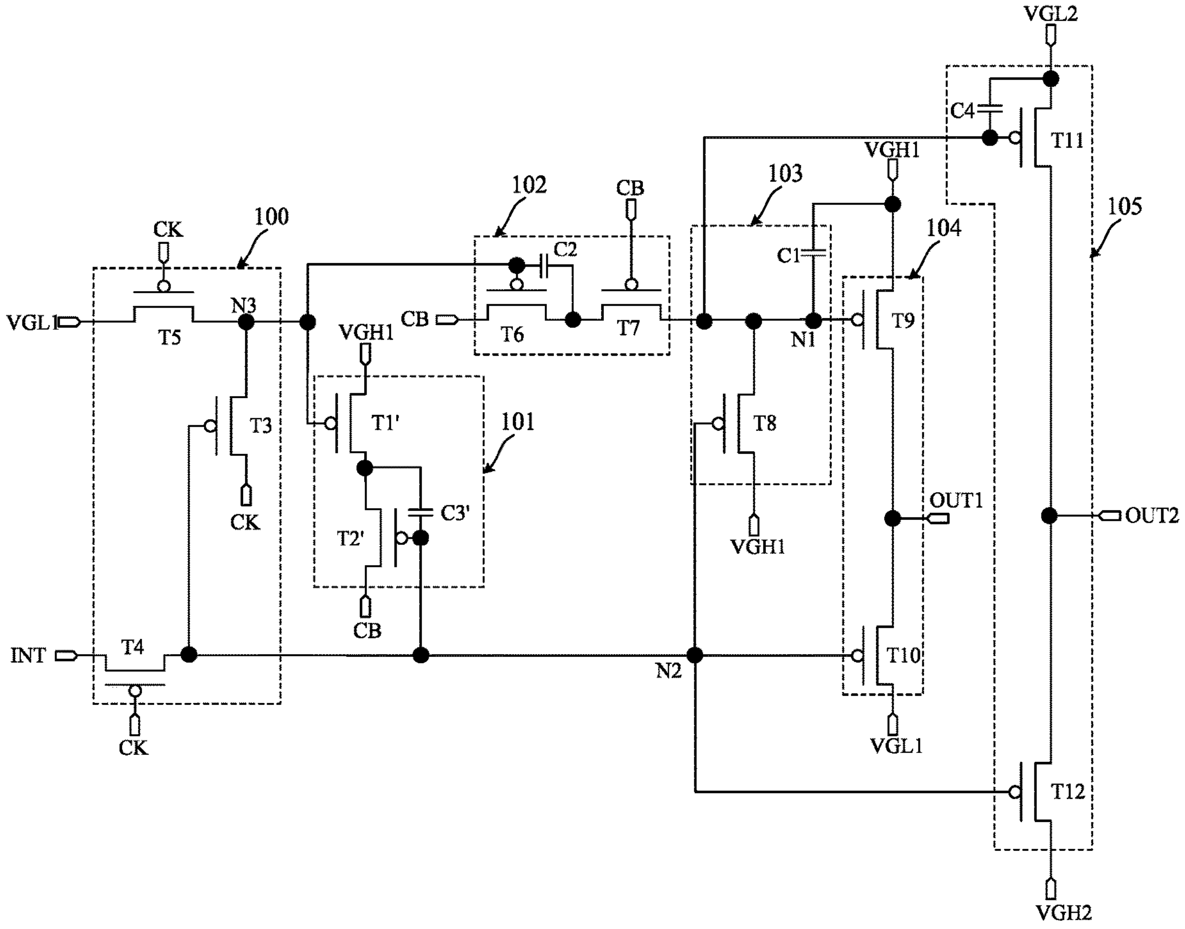
FIG. 8 is another equivalent circuit diagram of a drive control circuit according to at least one embodiment of the present disclosure.

FIG. 8 is another equivalent circuit diagram of a drive control circuit according to at least one embodiment of the present disclosure. In some exemplary embodiments, as shown in FIG. 8, the input sub-circuit 100 may include: a third transistor T3, a fourth transistor T4 and a fifth transistor T5. The first control sub-circuit 101 may include a first transistor T1', a second transistor T2', and a third capacitor C3'. The second control sub-circuit 102 may include: a sixth transistor T6, a seventh transistor T7 and a second capacitor C2. The third control sub-circuit 103 may include an eighth transistor T8 and a first capacitor C1. The first output circuit 11 may include a first output transistor T9 and a second output transistor T10. The second output circuit 12 may include a third output transistor T11, a fourth output transistor T12, and a fourth capacitor C4.

In some examples, as shown in FIG. 8, a control electrode of the first transistor T1' is electrically connected to the third node N3, a first electrode of the first transistor T1' is electrically connected to the first power supply line VGH1, and a second electrode of the first transistor T1' is electrically connected to the second electrode of the second transistor T2'. A control electrode of the second transistor T2' is electrically connected with the second node N2, and a first electrode of the second transistor T2' is electrically connected with the second clock terminal CB. A first electrode plate of the third capacitor C3' is electrically connected to the second node N2, and a second electrode plate of the third capacitor C3' is electrically connected to the second electrode of the second transistor T2'.

The connection relationship between the rest of the transistors and the capacitors of the drive control circuit of the present embodiment can be described as in the previous embodiment and is therefore not described here.

In this example, the first node N1 is a connection point of the seventh transistor T7, the eighth transistor T8, the first output transistor T9, the third output transistor T11, the first capacitor C1, and the fourth capacitor C4. The second node N2 is a connection point of the second transistor T2', the third transistor T3, the fourth transistor T4, the eighth transistor T8, the tenth transistor T10, the twelfth transistor T12 and the third capacitor C3'. The third node N3 is a connection point of the first transistor T1', the third transistor T3, the fifth transistor T5, the sixth transistor T6 and the second capacitor C2.

In other exemplary embodiments, in FIG. 8, a first voltage stabilizing transistor may be disposed between the third Node N3 and the second control sub-circuit 102, and a second voltage stabilizing transistor may be disposed between the input sub-circuit 100 and the second node N2. For example, a control electrode of the first voltage stabilizing transistor may be electrically connected to the second power supply line, a first electrode is electrically connected to the third node, and a second electrode is electrically connected to the gate electrode of the sixth transistor and the first electrode plate of the second capacitor. A control electrode of the second voltage stabilizing transistor may be electrically connected to the second power supply line, a first electrode is electrically connected to the second electrode of the fourth transistor and the control electrode of the third transistor, and a second electrode is electrically connected to the second node. However, this embodiment is not limited thereto. In this example, by adding a voltage stabilizing transistor, the potential of the second node and the third node can be guaranteed to be stable.

The operation process of the drive control circuit shown in FIG. 8 will be described with reference to FIG. 7 by taking the operation process of the first-stage drive control circuit as an example. A signal input terminal of the first stage drive control circuit may be electrically connected with the start signal line. The drive control circuit of the present embodiment may include: twelve transistor cells (i.e. transistors T1' and T2', and transistors T3 to T12), four capacitor cells (i.e. first capacitor C1, second capacitor C2, third capacitor C3' and fourth capacitor C4), three input terminals (i.e. A first clock terminal CK, a second clock terminal CB and a signal input terminal INT), two output terminals (i.e. a first output terminal OUT1 and a second output terminal OUT2), and four power supply terminals (i.e. a first power supply line VGH1, a second power supply line VGL1, a third power supply line VGH2 and a fourth power supply line VGL2). The first power supply line VGH1 can continuously provide a high-level first power supply signal, the second power supply line VGL1 can continuously provide a low-level second power supply signal, the third power supply line VGH2 can continuously provide a high-level third power supply signal, and the fourth power supply line VGL2 can continuously provide a low-level fourth power supply signal.

As shown in FIG. 7, the working process of the drive control circuit of this example may include the following stages.

In the first stage S21, the first clock terminal CK inputs a low-level signal, the second clock terminal CB inputs a high-level signal, and the signal input terminal INT inputs a high-level signal.

The fourth transistor T4 and the fifth transistor T5 are turned on, the second node N2 is at a high potential, and the third transistor T3, the second transistor T2', the eighth transistor T8, the second output transistor T10 and the fourth output transistor T12 are turned off. The third node N3 is at a low potential, and the first transistor T1' and the sixth transistor T6 are turned on. The second clock terminal CB inputs a high-level, and the seventh transistor T7 is turned off. The first node N1 maintains the high potential of the previous stage, and the first output transistor T9 and the third output transistor T11 are turned off. The first output terminal OUT1 maintains the low-level signal before output, and the second output terminal OUT2 maintains the high-level signal before output.

In the second stage S22, the first clock terminal CK inputs a high-level signal, the second clock terminal CB inputs a low-level signal, and the signal INPUT terminal INPUT inputs a high-level signal.

The fourth transistor T4 and the fifth transistor T5 are turned off, the second node N2 remains at a high potential, and the third transistor T3, the second transistor T2', the eighth transistor T8, the second output transistor T10 and the fourth output transistor T12 are turned off. The third node N3 remains at a low potential, and the first transistor T1' and the sixth transistor T6 are turned on. The second clock terminal CB inputs a low-level signal, and the seventh transistor T7 is turned on. The first node N1 is at a low potential, and the first output transistor T9 and the third output transistor T11 are turned on. The first output terminal OUT1 outputs a high-level signal supplied by the first power supply line VGH1, and the second output terminal OUT2 outputs a low-level signal supplied by the fourth power supply line VGL2.

In the third stage S23, the first clock terminal CK inputs a low-level signal, the second clock terminal CB inputs a high-level signal, and the signal input terminal INPUT inputs a high-level signal.

The fourth transistor T4 and the fifth transistor T5 are turned on, the second node N2 is at a high potential, and the third transistor T3, the second transistor T2', the eighth transistor T8, the second output transistor T10 and the fourth output transistor T12 are turned off. The third node N3 is at a low potential, and the first transistor T1' and the sixth transistor T6 are turned on. The second clock terminal CB inputs a high-level signal, and the seventh transistor T7 is turned off. The first node N1 remains at a low potential, and the first output transistor T9 and the third output transistor T11 are turned on. The first output terminal OUT1 outputs a high-level signal supplied by the first power supply line VGH1, and the second output terminal OUT2 outputs a low-level signal supplied by the fourth power supply line VGL2.

In the fourth stage S24, the first clock terminal CK inputs a high-level signal, the second clock terminal CB inputs a low-level signal, and the signal INPUT terminal INPUT inputs a low-level signal.

The fourth transistor T4 and the fifth transistor T5 are turned off, the second node N2 is at a high potential, and the third transistor T3, the second transistor T2', the eighth transistor T8, the second output transistor T10 and the fourth transistor T12 are turned off. The third node N3 remains at a low potential, and the first transistor T1' and the sixth transistor T6 are turned on. The second clock terminal CB supplies a low-level signal, and the seventh transistor T7 is turned on. The first node N1 is at a low potential, and the first output transistor T9 and the third output transistor T11 are turned on. The first output terminal OUT1 outputs a high-level signal supplied by the first power supply line VGH1, and the second output terminal OUT2 outputs a low-level signal supplied by the fourth power supply line VGL2.

In the fifth stage S25, the first clock terminal CK inputs a low-level signal, the second clock terminal CB inputs a high-level signal, and the signal input terminal INPUT inputs a low-level signal.

The fourth transistor T4 and the fifth transistor T5 are turned on, the second node N2 is at a low potential, and the third transistor T3, the second transistor T2', the eighth transistor T8, the second output transistor T10 and the fourth output transistor T12 are turned on. The third node N3 is at a low potential, and the first transistor T1' and the sixth transistor T6 are turned on. The second clock terminal CB inputs a high-level signal, and the seventh transistor T7 is turned off. The first node N1 is at a high potential, and the first output transistor T9 and the third output transistor T11 are turned off. The first output terminal OUT1 outputs a low-level signal supplied by the second power supply line VGL1, and the second output terminal OUT2 outputs a high-level signal supplied by the third power supply line VGH2.

In the sixth stage S26, the first clock terminal CK inputs a high-level signal, the second clock terminal CB inputs a low-level signal, and the signal INPUT terminal INPUT inputs a low-level signal.

The fourth transistor T4 and the fifth transistor T5 are turned off, the second node N2 remains at a low potential, and the third transistor T3, the second transistor T2', the eighth transistor T8, the second output transistor T10 and the fourth output transistor T12 are turned on. The third node N3 is at a high potential, and the first transistor T1' and the sixth transistor T6 are turned off. The second clock terminal CB inputs a low-level signal, and the seventh transistor T7 is turned on. The first node N1 is at a high potential, and the first output transistor T9 and the third output transistor T11 are turned off. The first output terminal OUT1 outputs a low-level signal supplied by the second power supply line VGL1, and the second output terminal OUT2 outputs a high-level signal supplied by the third power supply line VGH2.

For the rest of the description about the working sequence of the drive control circuit of this embodiment, reference may be made to the description of the foregoing embodiment, so details are not repeated here.

In a drive control circuit provided by the present exemplary embodiment, the first output transistor T9 and the second output transistor T10 may be used to control the output of the light emitting control signal, and the third output transistor T11 and the fourth output transistor T12 may be used to control the output of the second reset control signal, thereby avoiding the risk of causing excessive output burden of the light emitting control signal or the second reset control signal.

The drive control circuit provided by the present exemplary embodiment supplies a second reset control signal to the pixel circuit. The pixel circuit may use the second reset control signal to write a second initial signal lower than the first initial signal to the anode of the light emitting element, so as to improve the anode reset effect. The second reset control signal of the embodiment can prolong the reset time of the anode of the light emitting element, avoid the formation of leakage current, and prolong the service life of the light emitting element.

Figure 9:
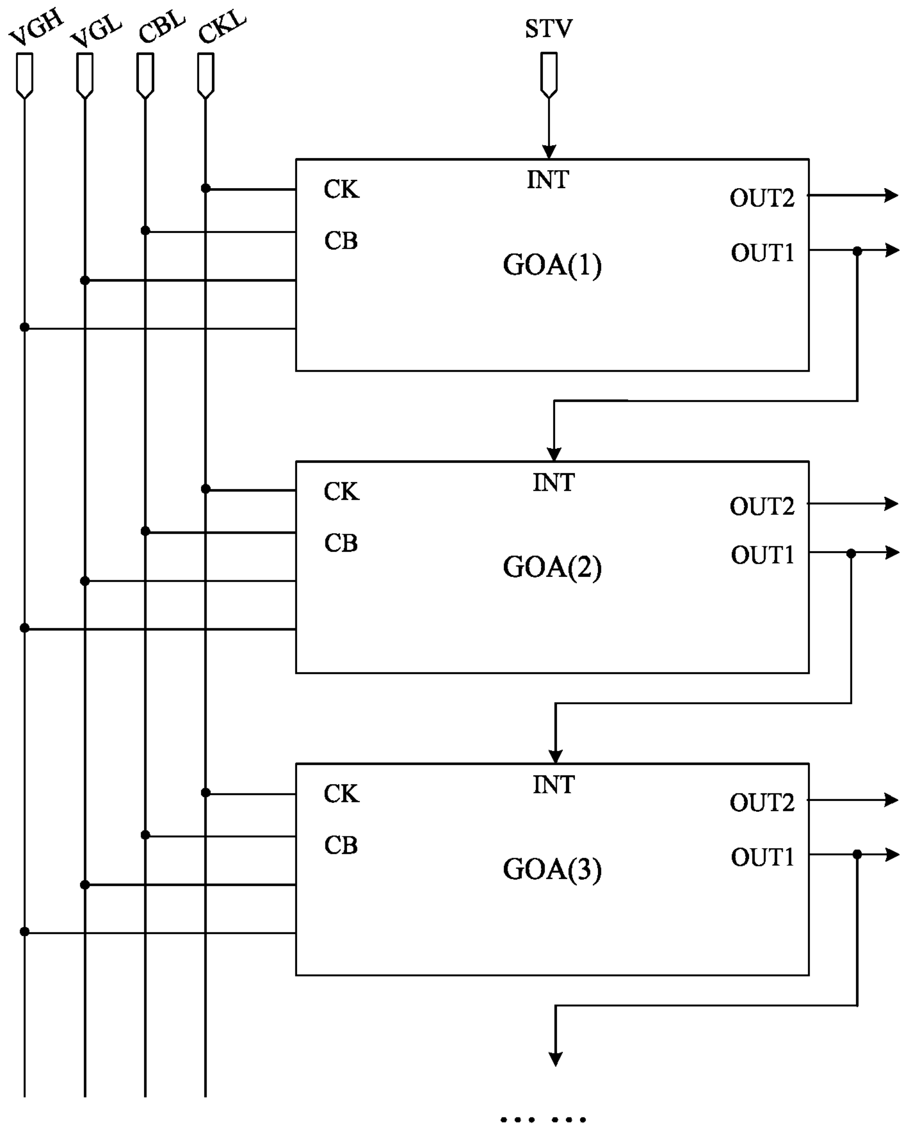
FIG. 9 is a schematic diagram of a gate drive circuit according to at least one embodiment of the present disclosure.

FIG. 9 is a schematic diagram of a gate drive circuit according to at least one embodiment of the present disclosure. As shown in FIG. 9, the gate drive circuit provided by the present exemplary embodiment may include a plurality of cascaded drive control circuits GOA. A single drive control circuit GOA includes a signal input INT. The structure of the drive control circuit may be as described in the foregoing embodiment, and its realization principle and realization effect are similar, so it will not be described here.

In the present exemplary embodiment, as shown in FIG. 9, a signal input terminal INT of a first stage drive control circuit GOA(1) is connected with a start signal line STV, and a signal input terminal of an i+1 stage drive control circuit GOA(i+1) is electrically connected with a first output terminal of an i stage drive control circuit GOA(i), wherein, i is an integer greater than 0. The first clock terminal CK of the drive control circuit may be electrically connected to the first clock signal line CKL, and the second clock terminal CB may be electrically connected to the second clock signal line CBL.

In the present exemplary embodiment, as shown in FIG. 9, the high-potential power supply line VGH to which each stage drive control circuit is connected may include the first power supply line VGH1 and the third power supply line VGH2, and the low-potential power supply line VGL to which each stage drive control circuit is connected may include the second power supply line VGL1 and the fourth power supply line VGL2. The first power supply line VGH1 and the third power supply line VGH2 may be the same line or may be two different lines. The second power supply line VGL1 and the fourth power supply line VGL2 may be the same line or may be two different lines. This embodiment is not limited thereto.

Figure 10:
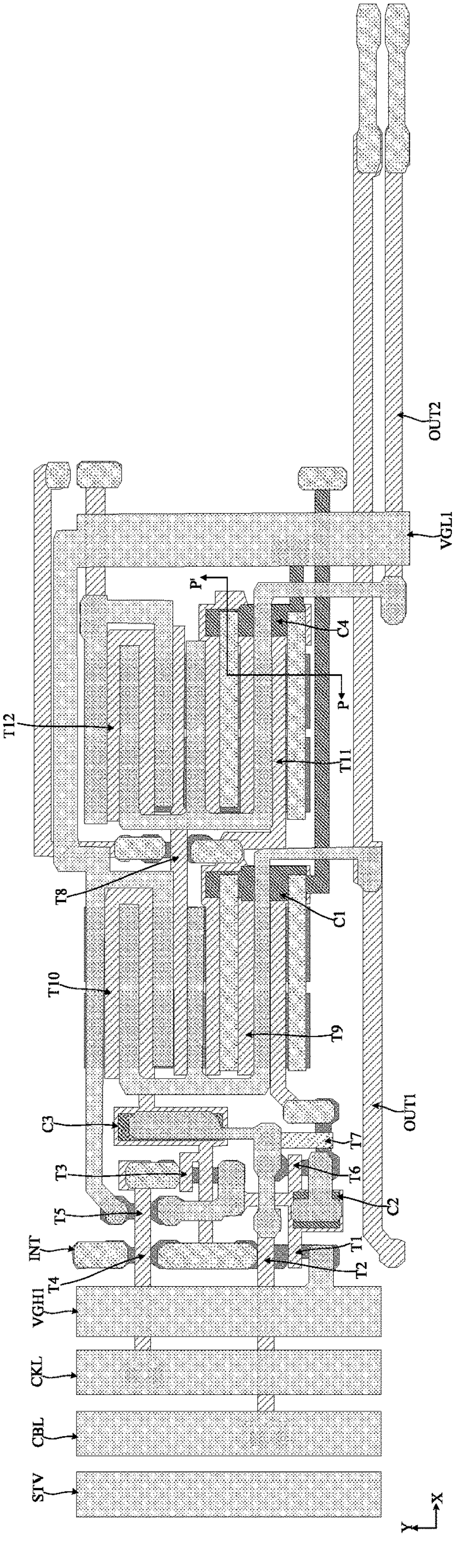
FIG. 10 is a top view of a drive control circuit according to at least one embodiment of the present disclosure.
Figure 11:
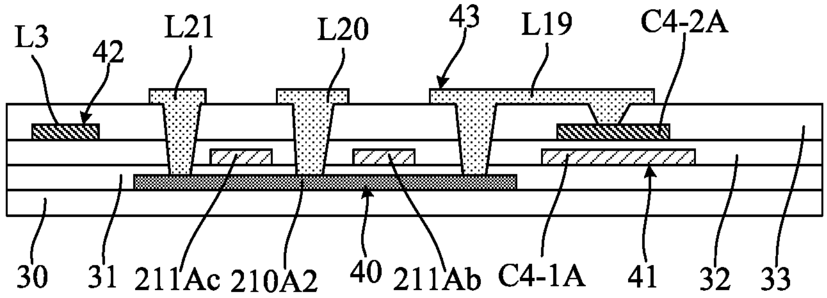
FIG. 11 is a partial cross-sectional schematic diagram taken along a direction P-P' in FIG. 10.

FIG. 10 is a top view of a drive control circuit according to at least one embodiment of the present disclosure. FIG. 11 is a partial cross-sectional schematic diagram taken along a direction P-P' in FIG. 11. The equivalent circuit of the drive control circuit of this example may be shown in FIG. 6. In the present exemplary embodiment, the first transistor T1 to the eighth transistor T8 and the first output transistor T9 to the fourth output transistor T12 in the drive control circuit are all P-type transistors and are low-temperature polysilicon thin film transistors. However, this embodiment is not limited thereto. In this example, the first power supply line VGH1 and the third power supply line VGH2 supply the same high-level signal, and the second power supply line VGL1 and the fourth power supply line VGL2 supply the same low-level signal.

In some exemplary embodiments, as shown in FIG. 10, in a plane parallel to the display substrate, the start signal line STV, the clock signal line, the first power supply line VGH1, the drive control circuit, and the second power supply line VGL1 are arranged in sequence along the first direction X. The start signal line STV, the clock signal line, the first power supply line VGH1, and the second power supply line VGL1 all extend in the second direction Y. The clock signal line may include a first clock signal line CKL and a second clock signal line CBL. The first clock signal line CKL is located on a side of the second clock signal line CBL close to the first power supply line VGH1. However, this embodiment is not limited thereto. For example, the first clock signal line may be located on a side of the second clock signal line away from the first power supply line.

In some exemplary embodiments, as shown in FIG. 10, in a plane parallel to the display substrate, the input sub-circuit is adjacent to the first power supply line VGH1 in the first direction X. The first transistor T1 and the second transistor T2 of the first control sub-circuit are adjacent to the first power supply line VGH1 in the first direction X, and the third capacitor C3 is located between the input sub-circuit and the first output circuit in the first direction X. The second control sub-circuit is located in the first direction X between the transistor of the first control sub-circuit and the first output circuit. The third control sub-circuit is located between the first output circuit and the second output circuit in the first direction. The second output circuit is adjacent to the second power supply line VGL1 in the first direction X.

In some exemplary embodiments, as shown in FIG. 10, the fourth transistor T4, the fifth transistor T5, and the third transistor T3 of the input sub-circuit are sequentially arranged in a direction away from the first power supply line VGH1 in the first direction X. The fourth transistor T4, the first transistor T1 and the second transistor T2 of the first control sub-circuit are sequentially arranged along the second direction Y. The third capacitor C3 is located between the third transistor T3 and the second output transistor T10 in the first direction X. The second capacitor C2 of the second control sub-circuit is located between the first transistor T1 and the sixth transistor T6 in the first direction X. The seventh transistor T7 is located between the sixth transistor T6 and the first output transistor T9 in the first direction X. The eighth transistor T8 and the first capacitor C1 of the third control sub-circuit are sequentially arranged along the second direction Y. The second output transistor T10 and the first output transistor T9 of the first output circuit are sequentially arranged in the second direction Y. The fourth output transistor T12 and the third output transistor T11 of the second output circuit are sequentially arranged in the second direction Y.

In some exemplary embodiments, as shown in FIG. 11, in the direction perpendicular to the display substrate, the non-display region of the display substrate may include: a substrate 30, and a semiconductor layer 40, a first conductive layer 41, a second conductive layer 42 and a third conductive layer 43 disposed on the substrate 30 in sequence. The first insulating layer 31 is disposed between the semiconductor layer 40 and the first conductive layer 41, the second insulating layer 32 is disposed between the first conductive layer 41 and the second conductive layer 42, and the third insulating layer 33 is disposed between the second conductive layer 42 and the third conductive layer 43. In some examples, the first insulating layer 31 to the third insulating layer 33 may be inorganic insulating layers. However, this embodiment is not limited thereto.

Figure 12A:
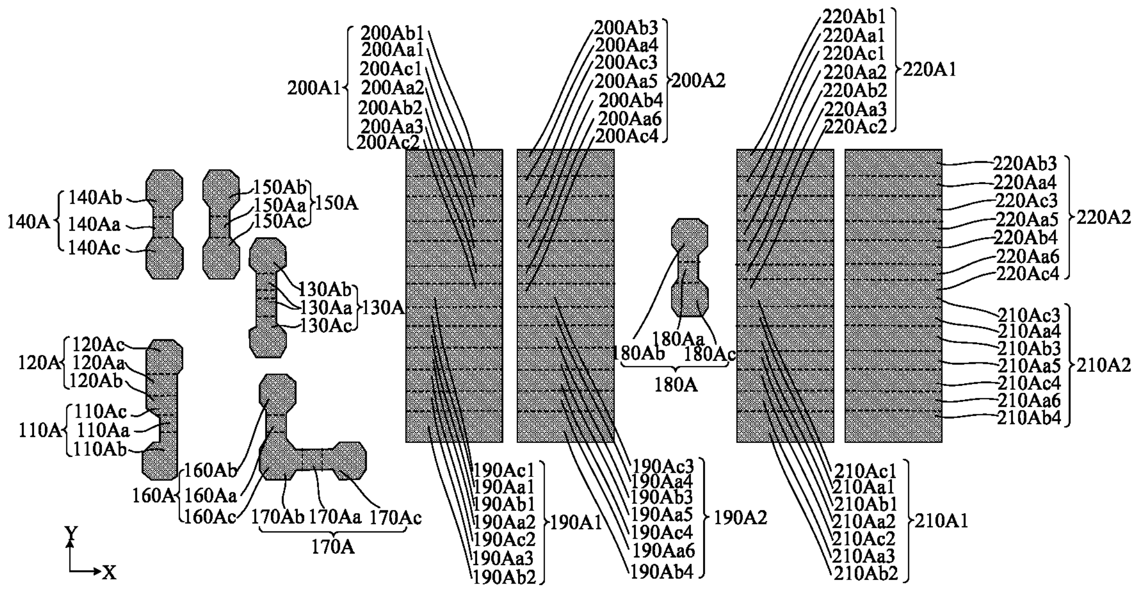
FIG. 12A is a top view of the drive control circuit after a semiconductor layer is formed in FIG. 10.

FIG. 12A is a top view of the drive control circuit after a semiconductor layer is formed in FIG. 10. As shown in FIGS. 10 to 12A, the semiconductor layer 40 in the non-display region at least includes: active layers of a plurality of transistors of the drive control circuit. For example, the semiconductor layer 40 may include an active layer 110A of the first transistor T1 to an active layer 180A of the eighth transistor T8, and an active layer of the first output transistor T9 to an active layer of the fourth output transistor T12.

In some examples, a material of the semiconductor layer 40, for example, may include poly-silicon. An active layer may include at least one channel region and a plurality of doped regions. The channel region may not be doped with an impurity, and has characteristics of a semiconductor. The plurality of doped regions may be on two sides of the channel region and doped with impurities, and thus have conductivity. The impurities may be changed according to the type of the transistor. A doped region of the active layer may be interpreted as a source or a drain of a transistor. For example, a first electrode of the transistor may correspond to the first doped region at a periphery of the channel region of the active layer and doped with impurities, and a second electrode of the transistor may correspond to the second doped region at the periphery of the channel region of the active layer and doped with impurities. In addition, portions of the active layers between the transistors may be interpreted as wirings doped with impurities, and may be used for electrically connecting the transistors.

In some examples, as shown in FIG. 12A, the active layer 110A of the first transistor T1, the active layer 120A of the second transistor T2, the active layer 130A of the third transistor T3, the active layer 140A of the fourth transistor T4, the active layer 150A of the fifth transistor T5, the active layer 160A of the sixth transistor T6, and the active layer 180A of the eighth transistor T8 all extend along the second direction Y. The active layer 170A of the seventh transistor T7 extends along the first direction X. The active layer 110A of the first transistor T1 and the active layer 120A of the second transistor T2 may be in an integrated structure such as a strip structure extending in the second direction Y. The active layer 160A of the sixth transistor T6 and the active layer 170A of the seventh transistor T7 may be in an integrated structure, for example, may be L-shaped.

In some examples, as shown in FIG. 12A, the active layer 110A of the first transistor T1 includes: a channel region 110Aa, and a first doped region 110Ab and a second doped region 110Ac located on two sides of the channel region 110Aa along the second direction Y. The active layer 120A of the second transistor T2 includes: a channel region 120Aa, and a first doped region 120Ab and a second doped region 120Ac located on two sides of the channel region 120Aa along the second direction Y. The first doped region

120Ab of the active layer 120A of the second transistor T2 is connected to the second doped region 110Ac of the active layer 110A of the first transistor T1. The active layer 130A of the third transistor T3 includes: a channel region 130Aa, and a first doped region 130Ab and a second doped region 130Ac located on two sides of the channel region 130Aa along the second direction Y. The active layer 140A of the fourth transistor T4 includes: a channel region 140Aa, and a first doped region 140Ab and a second doped region 140Ac located on two sides of the channel region 140Aa along the second direction Y. The active layer 150A of the fifth transistor T5 includes: a channel region 150Aa, and a first doped region 150Ab and a second doped region 150Ac located on two sides of the channel region 150Aa along the second direction Y. The active layer 160A of the sixth transistor T6 includes: a channel region 160Aa, and a first doped region 160Ab and a second doped region 160Ac located on two sides of the channel region 160Aa along the second direction Y. The active layer 170A of the seventh transistor T7 includes: a channel region 170Aa, and a first doped region 170Ab and a second doped region 170Ac located on two sides of the channel region 170Aa along the first direction X. The second doped region 160Ac of the active layer 160A of the sixth transistor T6 is connected to the first doped region 170Ab of the active layer 170A of the seventh transistor T7. The active layer 180A of the eighth transistor T8 includes: a channel region 180Aa, and a first doped region 180Ab and a second doped region 180Ac located on two sides of the channel region 180Aa along the second direction Y.

In some examples, as shown in FIG. 12A, the active layer of the first output transistor T9 includes a first partition 190A1 and a second partition 190A2 that are sequentially arranged in the first direction X. The first partition 190A1 and the second partition 190A2 of the active layer of the first output transistor T9 each extend in the second direction Y. The first partition 190A1 includes channel regions 190Aa1, 190Aa2, and 190Aa3 arranged in turn along the second direction Y, a first doped region 190Ab1 and a second doped region 190Ac1 located on both sides of the channel region 190Aa1 along the second direction Y, and a third doped region 190Ab2 and a fourth doped region 190Ac2 located on both sides of the channel region 190Aa3 along the second direction Y. The first doped region 190Ab1 and the fourth doped region 190Ac2 are located on both sides of the channel region 190Aa2 along the second direction Y. The second partition 190A2 includes channel regions 190Aa4, 190Aa5, and 190Aa6 arranged in turn along the second direction Y, a fifth doped region 190Ab3 and a sixth doped region 190Ac3 located on both sides of the channel region 190Aa4 along the second direction Y, and a seventh doped region 190Ab4 and a eighth doped region 190Ac4 located on both sides of the channel region 190Aa6 along the second direction Y. The fifth doped region 190Ab3 and the eighth doped region 190Ac4 are located on both sides of the channel region 190Aa5 along the second direction Y.

In some examples, as shown in FIG. 12A, the active layer of the second output transistor T10 includes a first partition 200A1 and a second partition 200A2 that are sequentially arranged in the first direction X. The first partition 200A1 and the second partition 200A2 of the active layer of the second output transistor T10 each extend in the second direction Y. The first partition 200A1 includes channel regions 200Aa1, 200Aa2, and 200Aa3 arranged in turn along the second direction Y, a first doped region 200Ab1 and a second doped region 200Ac1 located on both sides of the channel region 200Aa1 along the second direction Y, and a third doped region 200Ab2 and a fourth doped region 200Ac2 located on both sides of the channel region 200Aa3 along the second direction Y. The second doped region 200Ac1 and the third doped region 200Ab2 are located on both sides of the channel region 200Aa2 along the second direction Y. The second partition 200A2 includes channel regions 200Aa4, 200Aa5, and 200Aa6 arranged in turn along the second direction Y, a fifth doped region 200Ab3 and a sixth doped region 200Ac3 located on both sides of the channel region 200Aa4 along the second direction Y, and a seventh doped region 200Ab4 and a eighth doped region 200Ac4 located on both sides of the channel region 200Aa6 along the second direction Y. The sixth doped region 200Ac3 and the seventh doped region 200Ab4 are located on both sides of the channel region 200Aa5 along the second direction Y.

In some examples, as shown in FIG. 12A, the active layer of the third output transistor T11 includes a first partition 210A1 and a second partition 210A2 that are sequentially arranged in the first direction X. The first partition 210A1 and the second partition 210A2 of the active layer of the third output transistor T11 each extend in the second direction Y. The first partition 210A1 includes channel regions 210Aa1, 210Aa2, and 210Aa3 arranged in turn along the second direction Y, a first doped region 210Ab1 and a second doped region 210Ac1 located on both sides of the channel region 210Aa1 along the second direction Y, and a third doped region 210Ab2 and a fourth doped region 210Ac2 located on both sides of the channel region 210Aa3 along the second direction Y. The first doped region 210Ab1 and the fourth doped region 210Ac2 are located on both sides of the channel region 210Aa2 along the second direction Y. The second partition 210A2 includes channel regions 210Aa4, 210Aa5, and 210Aa6 arranged in turn along the second direction Y, a fifth doped region 210Ab3 and a sixth doped region 210Ac3 located on both sides of the channel region 210Aa4 along the second direction Y, and a seventh doped region 210Ab4 and a eighth doped region 210Ac4 located on both sides of the channel region 210Aa6 along the second direction Y. The fifth doped region 210Ab3 and the eighth doped region 210Ac4 are located on both sides of the channel region 210Aa5 along the second direction Y.

In some examples, as shown in FIG. 12A, the active layer of the fourth output transistor T12 includes a first partition 220A1 and a second partition 220A2 that are sequentially arranged in the first direction X. The first partition 220A1 and the second partition 220A2 of the active layer of the fourth output transistor T12 each extend in the second direction Y. The first partition 220A1 includes channel regions 220Aa1, 220Aa2, and 220Aa3 arranged in turn along the second direction Y, a first doped region 220Ab1 and a second doped region 220Ac1 located on both sides of the channel region 220Aa1 along the second direction Y, and a third doped region 220Ab2 and a fourth doped region 220Ac2 located on both sides of the channel region 220Aa3 along the second direction Y. The second doped region 220Ac1 and the third doped region 220Ab2 are located on both sides of the channel region 220Aa2 along the second direction Y. The second partition 220A2 includes channel regions 220Aa4, 220Aa5, and 220Aa6 arranged in turn along the second direction Y, a fifth doped region 220Ab3 and a sixth doped region 220Ac3 located on both sides of the channel region 220Aa4 along the second direction Y, and a seventh doped region 220Ab4 and a eighth doped region 220Ac4 located on both sides of the channel region 220Aa6 along the second direction Y. The sixth doped region 220Ac3 and the seventh doped region 220Ab4 are located on both sides of the channel region 220Aa5 along the second direction Y.

In some examples, as shown in FIG. 12A, the first partition 190A1 of the active layer of the first output transistor T9 and the first partition 200A1 of the active layer of the second output transistor T10 may be in an integrated structure, such as a rectangle. The second partition 190A2 of the active layer of the first output transistor T9 and the second partition 200A2 of the active layer of the second output transistor T10 may are in an integrated structure such as a rectangle. The first partition 210A1 of the active layer of the third output transistor T11 and the first partition 220A1 of the active layer of the fourth output transistor T12 may are in an integrated structure such as a rectangle. The second partition 210A2 of the active layer of the third output transistor T11 and the second partition 220A2 of the active layer of the fourth output transistor T12 may are in an integrated structure such as a rectangle. However, this embodiment is not limited thereto.

Figure 12B:
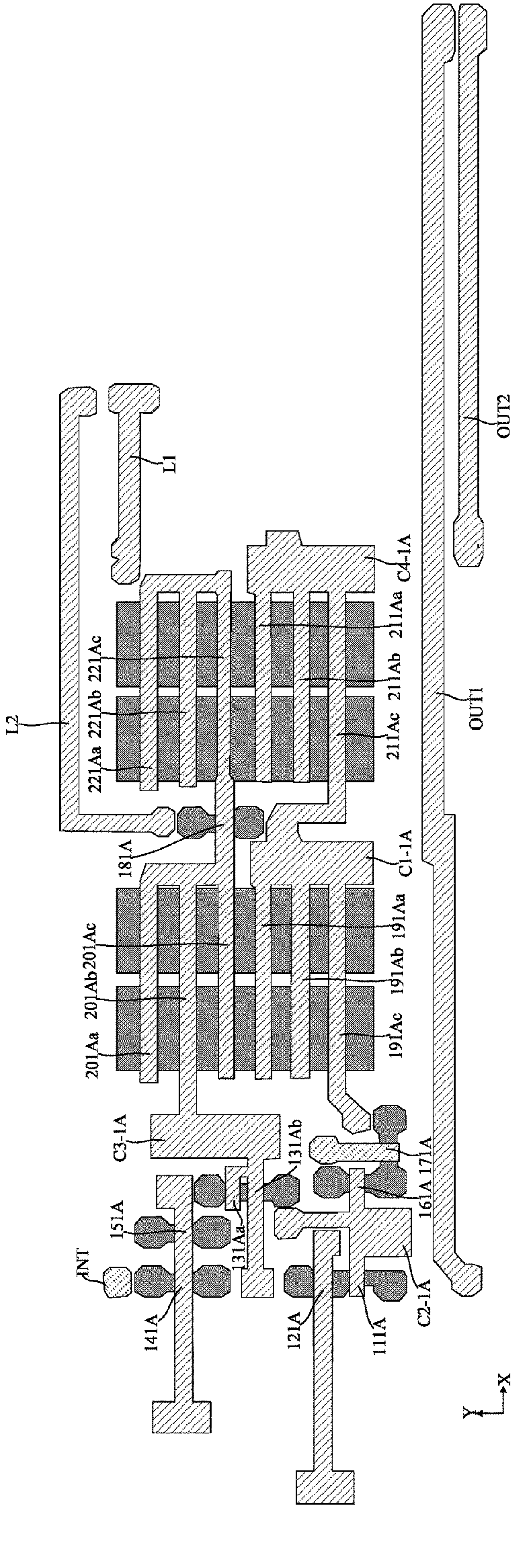
FIG. 12B is a top view of the drive control circuit after a first conductive layer is formed in FIG. 10.

FIG. 12B is a top view of the drive control circuit after a first conductive layer is formed in FIG. 10. As shown in FIG. 10 to FIG. 12B, the first conductive layer 41 in the non-display region at least includes: control electrodes of a plurality of transistors of the drive control circuit and first electrode plates of a plurality of capacitors. For example, the first conductive layer 41 may include: a control electrode 111A of the first transistor T1, a control electrode 121A of the second transistor T2, control electrodes 131Aa and 131Ab of the third transistor T3, a control electrode 141A of the fourth transistor T4, a control electrode 151A of the fifth transistor T5, a control electrode 161A of the sixth transistor T6, a control electrode 171A of the seventh transistor T7, a control electrode 181A of the eighth transistor T8, control electrodes 191Aa, 191Ab and 191Ac of the first output transistor T9, control electrodes 201Aa, 201Ab and 201Ac of the second output transistor T10, control electrodes 211Aa, 211Ab and 211Ac of the third output transistor T11, control electrodes 221Aa, 221Ab and 221Ac of the fourth output transistor T12, a first electrode plate C1-1A of the first capacitor C1, a first electrode plate C2-1A of the second capacitor C2, a first electrode plate C3-1A of the third capacitor C3, a first electrode plate C4-1A of the fourth capacitor C4, a signal input terminal INT, a first output terminal OUT1, a second output terminal OUT2, a first connection electrode L1 and a second connection electrode L2. The second output terminal OUT2 is located in the second direction Y on a side of the first output terminal OUT1 away from the first output circuit and the second output circuit. The first output terminal OUT1 and the second output terminal OUT2 may both extend in the first direction X. The first output terminal OUT1 of the drive control circuit of this stage can be integrated with the signal input terminal of the drive control circuit of the next stage. However, this embodiment is not limited thereto.

In some examples, as shown in FIG. 12B, the third transistor T3 may be a double-gate transistor, and the first output transistor T9, the second output transistor T10, the third output transistor T11, and the fourth output transistor T12 may be a triple-gate transistor to prevent and reduce generation of a leakage current. However, this embodiment is not limited thereto.

In some examples, as shown in FIG. 12B, the control electrode 111A of the first transistor T1, the control electrode 161A of the sixth transistor T6, and the first electrode plate C2-1A of the second capacitor C2 may be of an integrated structure. The control electrode 141A of the fourth transistor T4 and the control electrode 151A of the fifth transistor T5 may be of an integrated structure. The control electrodes 131Aa and 131Ab of the third transistor T3, the first electrode plate C3-1A of the third capacitor C3, the control electrode 181A of the eighth transistor T8, the control electrodes 201Aa, 201Ab and 201Ac of the second output transistor T10, and the control electrodes 221Aa, 221Ab and 221Ac of the fourth output transistor T12 may be of an integrated structure. The first electrode plate C1-1A of the first capacitor C1, the first electrode plate C4-1A of the fourth capacitor C4, the control electrodes 191Aa, 191Ab, and 191Ac of the first output transistor T9, and the control electrodes 211Aa, 211Ab, and 211Ac of the third output transistor T11 may be of an integrated structure. However, this embodiment is not limited thereto.

Figure 12C:
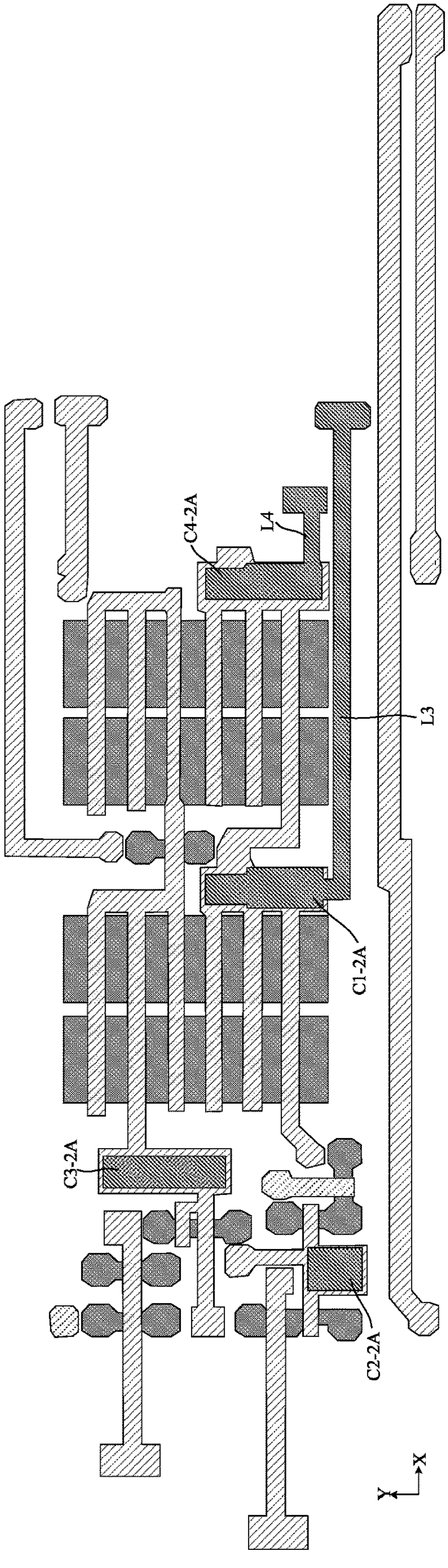
FIG. 12C is a top view of the drive control circuit after a second conductive layer is formed in FIG. 10.

FIG. 12C is a top view of the drive control circuit after a second conductive layer is formed in FIG. 10. As shown in FIGS. 10 to 12C, the second conductive layer 42 of the non-display region at least includes a second electrode plate that drives a plurality of capacitors of the control circuit. For example, the second conductive layer 42 may include a second electrode plate C1-2A of the first capacitor C1, a second electrode plate C2-2A of the second capacitor C2, a second electrode plate C3-2A of the third capacitor C3, a second electrode plate C4-2A of the fourth capacitor C4, a third connection electrode L3, and a fourth connection electrode L4. An orthographic projection of the first electrode plate C1-1A of the first capacitor C1 on the substrate 30 covers an orthographic projection of the second electrode plate C1-2A on the substrate 30. An orthographic projection of the first electrode plate C2-1A of the second capacitor C2 on the substrate 30 covers an orthographic projection of the second electrode plate C2-2A on the substrate 30. An orthographic projection of the first electrode plate C3-1A of the third capacitor C3 on the substrate 30 covers an orthographic projection of the second electrode plate C3-2A on the substrate 30. An orthographic projection of the first electrode plate C4-1A of the fourth capacitor C4 on the substrate 30 covers an orthographic projection of the second electrode plate C4-2A on the substrate 30.

In some examples, as shown in FIG. 12C, the second electrode plate C1-2A of the first capacitor C1 and the third connection electrode L3 may be in an integrated structure. The second electrode plate C4-2A of the fourth capacitor C4 and the fourth connection electrode L4 may be in an integrated structure. However, this embodiment is not limited thereto.

Figure 12D:
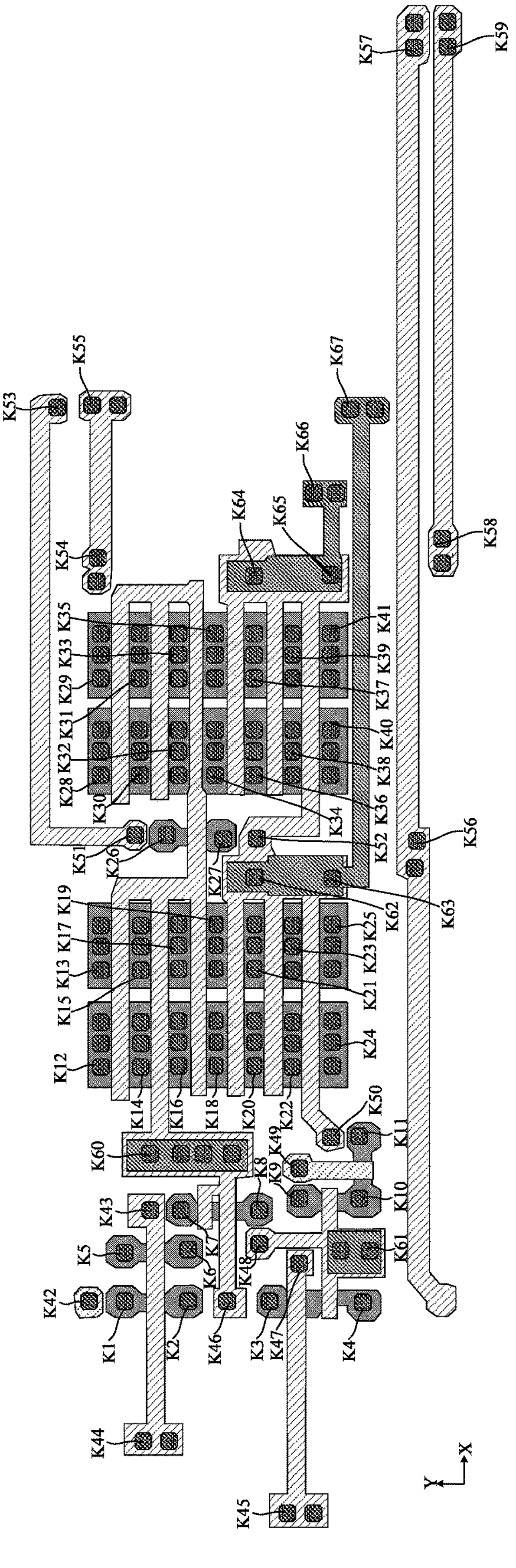
FIG. 12D is a top view of the drive control circuit after a third insulating layer is formed in FIG. 10.

FIG. 12D is a top view of the drive control circuit after a third insulating layer is formed in FIG. 10. As shown in FIG. 10 to FIG. 12D, a plurality of via holes is formed on a third insulating layer 33 of the non-display region. The plurality of via holes may include a plurality of first type via holes, a plurality of second type via holes, and a plurality of third type via holes. The third insulating layer 33, the second insulating layer 32 and the first insulating layer 31 in the first type via holes are removed to expose the surface of the semiconductor layer 40. The third insulating layer 33 and the second insulating layer 32 in the second type of via holes are removed to expose the surface of the first conductive layer 41. The third insulating layer 33 inside the third type via holes is removed to expose the surface of the second conductive layer 42. For example, the first type of via hole may include: a first via hole K1 to a forty-first via hole K41; the second type of via hole may include a forty-second via hole K42 to a fifty-ninth via hole K59; and the third type of via hole may include a sixtieth via hole K60 to a sixty-seventh via hole K67.

Figure 12E:
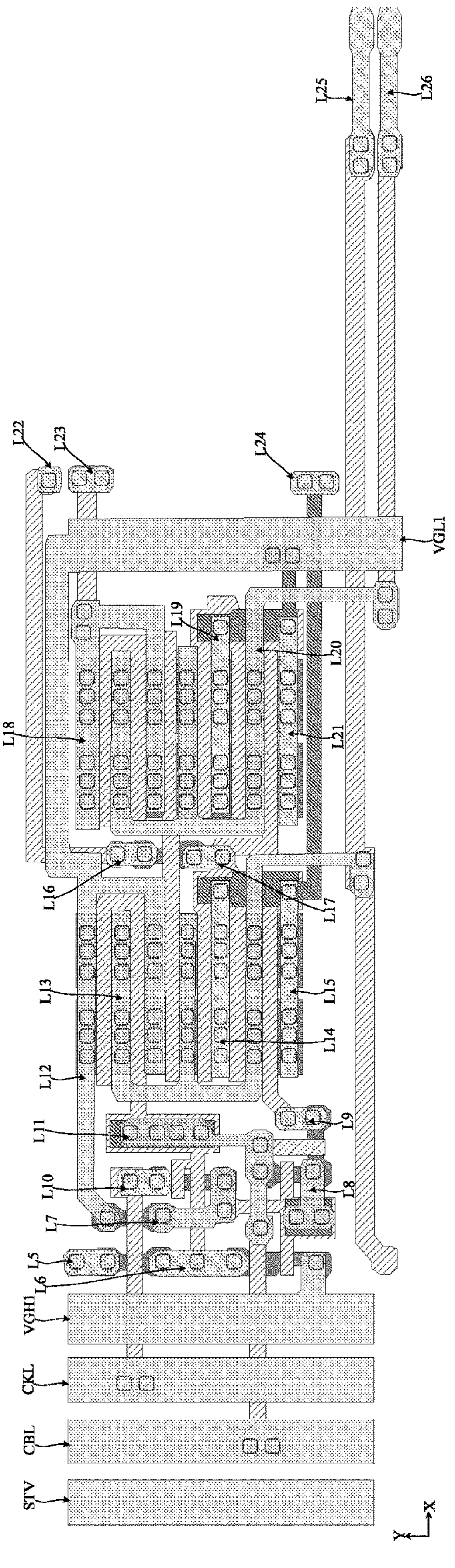
FIG. 12E is a top view of the drive control circuit after a third conductive layer is formed in FIG. 10.

FIG. 12E is a top view of the drive control circuit after a third conductive layer is formed in FIG. 10. As shown in FIGS. 10 to 12E, the third conductive layer 43 of the non-display region may include a plurality of connection electrodes (for example, a fifth connection electrode L5 to a twenty-fourth connection electrode L24), a first clock signal line CKL, a second clock signal line CBL, a first power supply line VGH1, a second power supply line VGL1, and a start signal line STV. The start signal line STV, the second clock signal line CBL, the first clock signal line CKL, the first power supply line VGH1 and the second power supply line VGL1 all extend along the second direction Y and are arranged in sequence along the first direction X.

In some examples, as shown in FIGS. 10 to 12E, the fifth connection electrode L5 may be electrically connected to the first doped region 140Ab of the active layer 140A of the fourth transistor T4 through the first via hole K1, and may be electrically connected to the signal input terminal INT through the forty-second via hole K42. The sixth connection electrode L6 may be electrically connected to the second doped region 140Ac of the active layer 140A of the fourth transistor T4 through the second via hole K2, may be electrically connected to the second doped region 120Ac of the active layer 120A of the second transistor T2 through the third via hole K3, and may be electrically connected to the control electrode 131Aa of the third transistor T3 through the forty-sixth via hole K46. The first power supply line VGH1 may be electrically connected to the first doped region 110Ab of the active layer 110A of the first transistor T1 through the fourth via hole K4. The seventh connection electrode L7 may be electrically connected to the second doped region 150Ac of the active layer 150A of the fifth transistor T5 through the sixth via hole K6, may be electrically connected to the second doped region 130Ac of the active layer 130A of the third transistor T3 through the eighth via hole K8, and may be electrically connected to the control electrode 161A of the sixth transistor T6 through the forty-eighth via hole K48. An orthographic projection of the seventh connection electrode L7 on the substrate may be L-shaped. The eighth connection electrode L8 may be electrically connected to the second doped region 160Ac of the active layer 160A of the sixth transistor T6 through a tenth via hole K10, and may be electrically connected to the second electrode plate C2-2A of the second capacitor C2 through two sixty-first via hole K61 arranged vertically. An orthographic projection of the eighth connection electrode L8 on the substrate may be T-shaped. The ninth connection electrode L9 may be electrically connected to the second doped region 170Ac of the active layer 170A of the seventh transistor T7 through the eleventh via hole K11, and may be electrically connected to the control electrode 191Ac of the first output transistor T9 through the fiftieth via hole K50. The tenth connection electrode L10 may be electrically connected to the first doped region 130Ab of the active layer 130A of the third transistor T3 through a seventh via hole K7, and may be electrically connected to the control electrode 151A of the fifth transistor T5 through a forty-third via hole K43. The first clock signal line CKL may be electrically connected to the control electrode 151A of the fifth transistor T5 through two forty-fourth via holes K44 arranged vertically. The eleventh connection electrode L11 may be electrically connected to the second electrode plate C3-2A of the third capacitor C3 through four sixtieth via holes K60 arranged vertically. It may be electrically connected to the first doped region 160Ab of the active layer 160A of the sixth transistor T6 through the ninth via hole K9, may be electrically connected to the control electrode 171A of the seventh transistor T7 through the forty-ninth via hole K49, and may be electrically connected to the control electrode 121A of the second transistor T2 through the forty-seventh via hole K47. An orthographic projection of the eleventh connection electrode L11 on the substrate may be L-shaped. The second clock signal line CBL may be electrically connected to the control electrode 121A of the second transistor T2 through two forty-fifth via holes K45 arranged vertically.

In some examples, the twelfth connection electrode L12 may be electrically connected to the first doped region 150Ab of the active layer 150A of the fifth transistor T5 through the fifth via hole K5, may be electrically connected to the first doped region 200Ab1 of the first partition 200A1 of the active layer of the second output transistor T10 through a plurality (e.g. three) of the twelfth via hole K12 arranged side by side, may be electrically connected to the fifth doped region 200Ab3 of the second partition 200A2 of the active layer of the second output transistor T10 through a plurality (e.g. three) of the thirteenth via hole K13 arranged side by side, may be electrically connected to the third doped region 200Ab2 of the first partition 200A1 of the active layer of the second output transistor T10 through a plurality (e.g. three) of the sixteenth via holes K16 arranged side by side, and may be electrically connected to the seventh doped region 200Ab4 of the second partition 200A2 of the active layer of the second output transistor T10 through a plurality (e.g. three) of the seventeenth via hole K17 arranged side by side. The twelfth connection electrode L12 and the second power supply line VGL1 may be of an integrated structure.

In some examples, the thirteenth connection electrode L13 may be electrically connected to the second doped region 200Ac1 of the first partition 200A1 of the active layer of the second output transistor T10 through a plurality (e.g. three) of the fourteenth via hole K14 arranged side by side, may be electrically connected to the sixth doped region 200Ac3 of the second partition 200A2 of the active layer of the second output transistor T10 through a plurality (e.g. three) of the fifteenth via hole K15 arranged side by side, may be electrically connected to the fourth doped region 200Ac2 of the first partition 200A1 of the active layer of the second output transistor T10 through a plurality (e.g. three) of the eighteenth via hole K18 arranged side by side, may be electrically connected to the eighth doped region 200Ac4 of the second partition 200A2 of the active layer of the second output transistor T10 through a plurality (e.g. three) of the nineteenth via hole K19 arranged side by side, may be electrically connected to the second doped region 190Ac1 of the first partition 190A1 of the active layer of the first output transistor T9 through a plurality (e.g. three) of the twenty-second via hole K22 arranged side by side, may be electrically connected to the eighth doped region 190Ac4 of the second partition 190A2 of the active layer of the first output transistor T9 through a plurality (e.g. three) of the twenty-third via hole K23 arranged side by side, and may be electrically connected to the first output terminal OUT1 through two fifty-sixth via holes K56 arranged side by side.

In some examples, the fourteenth connection electrode L14 may be electrically connected to the first doped region 190Ab1 of a first partition 190A1 of the active layer of the first output transistor T9 through a plurality (e.g. three) of the twentieth via hole K20 arranged side by side, may be electrically connected to the fifth doped region 190Ab3 of the second partition 190A2 of the active layer of the first output transistor T9 through a plurality (e.g. three) of the twenty-first via hole K21 arranged side by side, and may be electrically connected to the second electrode plate C1-2A of the first capacitor C1 through the sixty-second via hole K62.

In some examples, the fifteenth connection electrode L15 may be electrically connected to the third doped region 190Ab2 of a first partition 190A1 of the active layer of the first output transistor T9 through a plurality (e.g. three) of the twenty-fourth via hole K24 arranged side by side, may be electrically connected to the seventh doped region 190Ab4 of the second partition 190A2 of the active layer of the first output transistor T9 through a plurality (e.g. three) of the twenty-fifth via hole K25 arranged side by side, and may be electrically connected to the second electrode plate C1-2A of the first capacitor C1 through the sixty-third via hole K63.

In some examples, the sixteenth connection electrode L16 may be electrically connected to the first doped region 180Ab of the active layer 180A of the eighth transistor T8 through the twenty-sixth via hole K26, and may be electrically connected to the second connection electrode L2 through the fifty-first via hole K51. The second connection electrode L2 may be electrically connected to the twenty-second connection electrode L22 through the fifty-third via hole K53. The seventeenth connection electrode L17 may be electrically connected to the second doped region 180Ac of the active layer 180A of the eighth transistor T8 through the twenty-seventh via hole K27, and may be electrically connected to the first electrode plate C1-1A of the first capacitor C1 through the fifty-second via hole K52.

In some examples, the eighteenth connection electrode L18 may be electrically connected to the first doped region 220Ab1 of a first partition 220A1 of the active layer of the fourth output transistor T12 through a plurality (e.g. three) of the twenty-eighth via hole K28 arranged side by side, may be electrically connected to the fifth doped region 220Ab3 of the second partition 220A2 of the active layer of the fourth output transistor T12 through a plurality (e.g. three) of the twenty-ninth via hole K29 arranged side by side, may be electrically connected to the third doped region 220Ab2 of the first partition 220A1 of the active layer of the fourth output transistor T12 through a plurality (e.g. three) of the thirty-second via hole K32 arranged side by side, may be electrically connected to the seventh doped region 220Ab4 of the second partition 220A2 of the active layer of the fourth output transistor T12 through a plurality (e.g. three) of the thirty-third via hole K33 arranged side by side, and may be electrically connected to the first connection electrode L1 through two fifty-fourth via holes K54 arranged side by side. The first connection electrode L1 may be electrically connected to the twenty-third connection electrode L23 through two fifty-fifth via holes K55 arranged vertically.

In some examples, the nineteenth connection electrode L19 may be electrically connected to the first doped region 210Ab1 of a first partition 210A1 of the active layer of the third output transistor T11 through a plurality (e.g. three) of the thirty-sixth via hole K36 arranged side by side, may be electrically connected to the fifth doped region 210Ab3 of the second partition 210A2 of the active layer of the third output transistor T11 through a plurality (e.g. three) of the thirty-seventh via hole K37 arranged side by side, and may be electrically connected to the second electrode plate C4-2A of the fourth capacitor C4 through the sixty-fourth via hole K64.

In some examples, the twentieth connection electrode L20 may be electrically connected to the second doped region 220Ac1 of a first partition 220A1 of the active layer of the fourth output transistor T12 through a plurality (e.g. three) of the thirtieth via hole K30 arranged side by side, may be electrically connected to the sixth doped region 220Ac3 of the second partition 220A2 of the active layer of the fourth output transistor T12 through a plurality (e.g. three) of the thirty-first via hole K31 arranged side by side, may be electrically connected to the fourth doped region 220Ac2 of the first partition 220A1 of the active layer of the fourth output transistor T12 through a plurality (e.g. three) of the thirty-fourth via hole K34 arranged side by side, may be electrically connected to the eighth doped region 220Ac4 of the second partition 220A2 of the active layer of the fourth output transistor T12 through a plurality (e.g. three) of the thirty-fifth via hole K35 arranged side by side, may be electrically connected to the fourth doped region 210Ac2 of the first partition 210A1 of the active layer of the third output transistor T11 through a plurality (e.g. three) of the thirty-eighth via hole K38 arranged side by side, may be electrically connected to the eighth doped region 210Ac4 of the second partition 210A2 of the active layer of the third output transistor T11 through a plurality (e.g. three) of the thirty-ninth via hole K39 arranged side by side, and may be electrically connected to the second output terminal OUT2 through two fifty-eighth via holes K58 arranged side by side.

In some examples, the twenty-first connection electrode L21 may be electrically connected to the third doped region 210Ab2 of the first partition 210A1 of the active layer of the third output transistor T11 through a plurality (e.g. three) of the fortieth via hole K40 arranged side by side, may be electrically connected to the seventh doped region 210Ab4 of the second partition 210A2 of the active layer of the third output transistor T11 through a plurality (e.g. three) of the forty-first via hole K41 arranged side by side, and may be electrically connected to the second electrode plate C4-2A of the fourth capacitor C4 through the sixty-fifth via hole K65.

In some examples, the third connection electrode L3 may be electrically connected to the twenty-fourth connection electrode L24 through two sixty-seventh via holes K67 arranged vertically. The twenty-second connection electrode L22, the twenty-third connection electrode L23, and the twenty-fourth connection electrode L24 may be electrically connected to a third power supply line near the display region side, for example, may be integrated with the third power supply line. The third power supply line may be configured to provide a high-level power supply signal to an adjacent gate drive circuit. However, this embodiment is not limited thereto.

In some examples, the twenty-fifth connection electrode L25 may be electrically connected to the first output terminal OUT1 through two fifty-seventh via holes K57 arranged side by side. The twenty-sixth connection electrode L26 may be electrically connected to the second output terminal OUT2 through two fifty-ninth via holes K59 arranged side by side. The twenty-fifth connection electrode L25 and the twenty-sixth connection electrode L26 may extend in the first direction X. For example, the twenty-fifth connection electrode L25 may be electrically connected to the light emitting control line to supply the light emitting control signal to the pixel circuit of the display region, and the twenty-sixth connection electrode L26 may be electrically connected to the second reset control line to supply the second reset control signal to the pixel circuit of the display region. However, this embodiment is not limited thereto.

In some examples, the second power supply line VGL1 may be electrically connected to the fourth connection electrode L4 through two sixty-sixth via holes K66 arranged vertically.

In the embodiments of the present disclosure, "disposed side by side" may mean being disposed in sequence along the first direction X, and "disposed vertically" may mean being disposed in sequence along the second direction Y.

In the present exemplary embodiment, electrical connection with the first clock signal line CKL is achieved through the control electrodes of the fourth transistor and the fifth transistor. The electrical connection to the second clock signal line CBL is achieved through a control electrode of the second transistor and an eleventh connection electrode L11. The electrical connection between the second power supply line VGL1 and the second output circuit is achieved through the fourth connection electrode L4. The transmission of a second power supply signal to the first output circuit is achieved through a third connection electrode L3 and a twenty-fourth connection electrode L24. The electrical connection between the first output circuit, the input circuit, and the first power supply line is achieved through the twelfth connection electrode L12. The transmission of the first power signal to the second output circuit is achieved through the twenty-third connection electrode L23 and the first connection electrode L1.

In the display substrate provided by the exemplary embodiment, a light emitting control signal and a second reset control signal are provided to a pixel circuit by a drive control circuit, thereby saving arrangement space and achieving a display substrate with a narrow bezel design.

Figure 13:
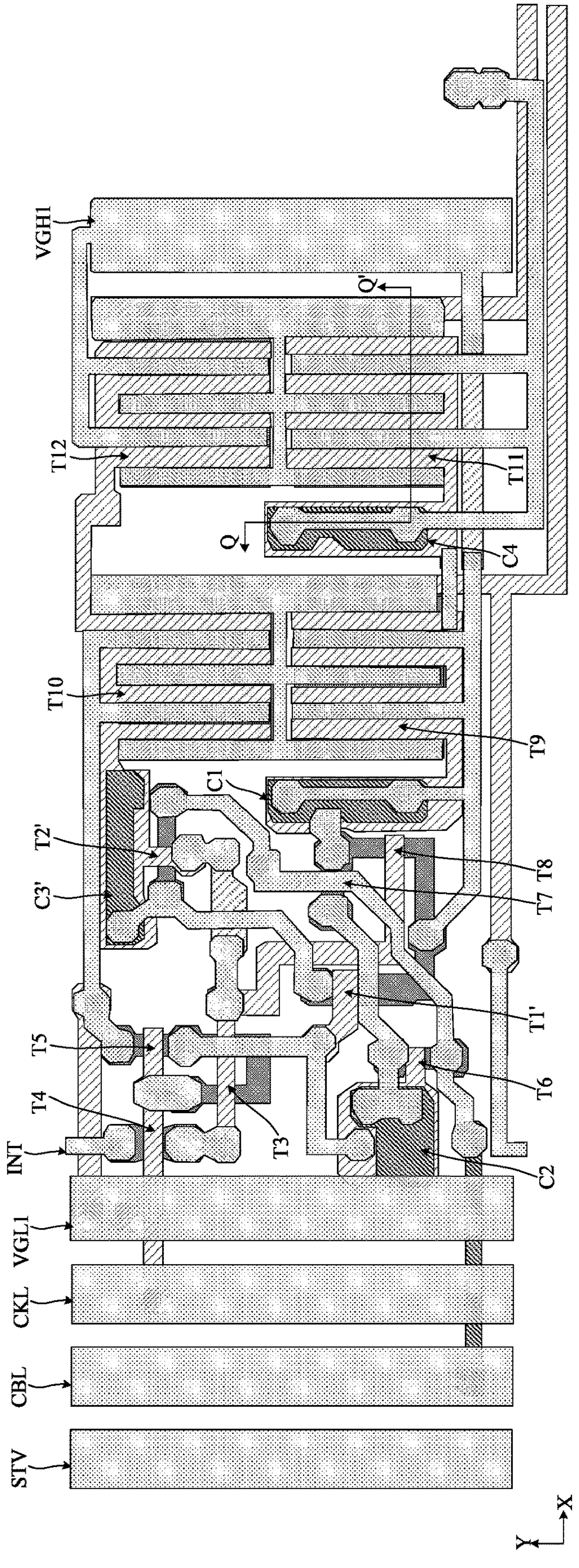
FIG. 13 is another top view of the drive control circuit according to at least one embodiment of the present disclosure.
Figure 14:
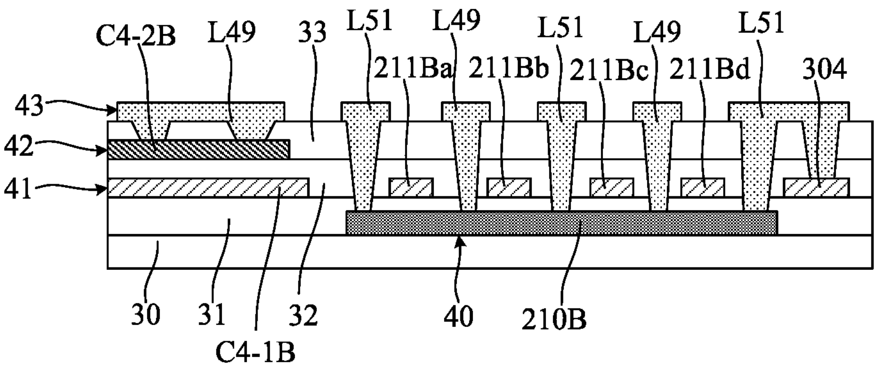
FIG. 14 is a partial cross-sectional schematic diagram along a Q-Q' direction in FIG. 13.

FIG. 13 is another top view of the drive control circuit according to at least one embodiment of the present disclosure. FIG. 14 is a partial cross-sectional schematic diagram along a Q-Q' direction in FIG. 13. The equivalent circuit of the drive control circuit of this example may be shown in FIG. 8. In the present exemplary embodiment, the first transistor T1', the second transistor T2', the third transistor T3 to the eighth transistor T8 and the first output transistor T9 to the fourth output transistor T12 in the drive control circuit are all P-type transistors and are low-temperature polysilicon thin film transistors. However, this embodiment is not limited thereto. In this example, the first power supply line VGH1 and the third power supply line VGH2 supply the same high-level signal, and the second power supply line VGL1 and the fourth power supply line VGL2 supply the same low-level signal.

In some exemplary embodiments, as shown in FIG. 13, in a plane parallel to the display substrate, the start signal line STV, the clock signal line, the second power supply line VGL1, the drive control circuit, and the first power supply line VGH1 are arranged in sequence along the first direction X. The start signal line STV, the clock signal line, the first power supply line VGH1, and the second power supply line VGL1 all extend in the second direction Y. The clock signal line may include a first clock signal line CKL and a second clock signal line CBL. The first clock signal line CKL is located on a side of the second clock signal line CBL close to the second power supply line VGL1. However, this embodiment is not limited thereto. For example, the first clock signal line may be located on a side of the second clock signal line away from the first power supply line.

In some exemplary embodiments, as shown in FIG. 13, in a plane parallel to the display substrate, the input sub-circuit is adjacent to the second power supply line VGL1 in the first direction X. The third capacitor C3', the second transistor T2', and the first transistor T1' of the first control sub-circuit are arranged in the second direction Y. The second transistor T2' and the third capacitor C3' are located between the input sub-circuit and the first output circuit in the first direction X. A second capacitor C2 of the second control sub-circuit is adjacent to the second power supply line VGL1. The first transistor T1' is located between the sixth transistor T6 and the seventh transistor T7 in the first direction X. The third control sub-circuit is located on a side of the first output circuit close to the second control sub-circuit. The second output circuit is located between the first output circuit and the first power supply line VGH1 in the first direction X.

In some exemplary embodiments, as shown in FIG. 13, the fourth transistor T4, the third transistor T3, and the fifth transistor T5 of the input sub-circuit are sequentially arranged in a direction away from the second power supply line VGL1 in the first direction X. The second capacitor C2, the sixth transistor T6, the first transistor T1', the seventh transistor T7, the eighth transistor T8, and the first capacitor C1 are sequentially arranged in a direction away from the second power supply line VGL1 in the first direction X. The third capacitor C3' and the second transistor T2' are sequentially arranged in the second direction Y and are located between the fifth transistor T5 and the second output transistor T10 in the first direction X. The second output transistor T10 and the first output transistor T9 are sequentially arranged in the second direction Y, and the fourth output transistor T12 and the third output transistor T11 are sequentially arranged in the second direction Y. The fourth capacitor C4 is located between the first output transistor T9 and the third output transistor T11 in the first direction X.

In some exemplary embodiments, as shown in FIG. 14, in the direction perpendicular to the display substrate, the non-display region of the display substrate may include: a substrate 30, and a semiconductor layer 40, a first conductive layer 41, a second conductive layer 42 and a third conductive layer 43 disposed on the substrate 30 in sequence. The first insulating layer 31 is disposed between the semiconductor layer 40 and the first conductive layer 41, the second insulating layer 32 is disposed between the first conductive layer 41 and the second conductive layer 42, and the third insulating layer 33 is disposed between the second conductive layer 42 and the third conductive layer 43. In some examples, the first insulating layer 31 to the third insulating layer 33 may be inorganic insulating layers. However, this embodiment is not limited thereto.

Figure 15A:
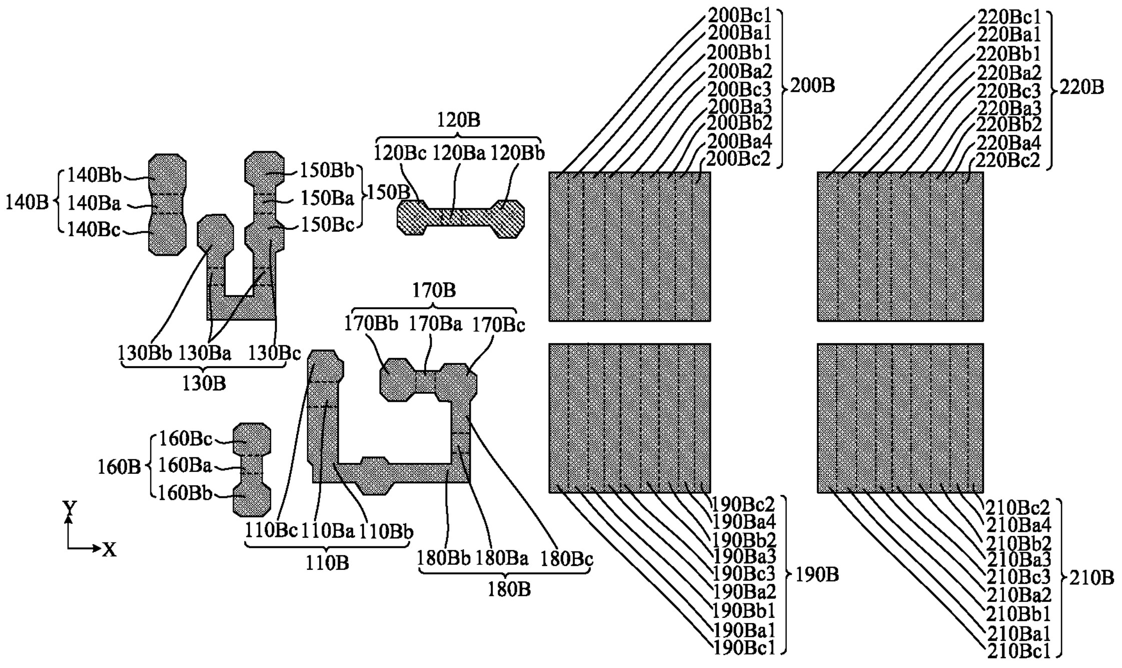
FIG. 15A is a top view of the drive control circuit after a semiconductor layer is formed in FIG. 13.

FIG. 15A is a top view of the drive control circuit after a semiconductor layer is formed in FIG. 13. As shown in FIGS. 13 to 15, the semiconductor layer 40 in the non-display region at least includes: active layers of a plurality of transistors of the drive control circuit. For example, the semiconductor layer 40 may include an active layer 110B of the first transistor T1' to an active layer 180B of the eighth transistor T8, an active layer 190B of the first output transistor T9 to an active layer 220B of the fourth output transistor T12.

In some examples, as shown in FIG. 15A, the active layer 110B of the first transistor T1', the active layer 140B of the fourth transistor T4, the active layer 150B of the fifth transistor T5, the active layer 160B of the sixth transistor T6, and the active layer 180B of the eighth transistor T8 all extend in the second direction Y, the active layer 120B of the second transistor T2' extends in the first direction X, and the active layer 130B of the third transistor T3 is U-shaped. The active layer 190B of the first output transistor T9, the active layer 200B of the second output transistor T10, the active layer 210B of the third output transistor T11, and the active layer 220B of the fourth output transistor T12 are all rectangular.

In some examples, as shown in FIG. 15A, the active layer 110B of the first transistor T1' includes: a channel region 110Ba, and a first doped region 110Bb and a second doped region 110Bc located on both sides of the channel region 110Ba along the second direction Y. The active layer 120B of the second transistor T2' includes: a channel region 120Ba, and a first doped region 120Bb and a second doped region 120Bc located on both sides of the channel region 120Ba along the first direction X. The active layer 130B of the third transistor T3 includes: a channel region 130Ba, and a first doped region 130Bb and a second doped region 130Bc located at two sides of the channel region 130Ba. The active layer 140B of the fourth transistor T4 includes: a channel region 140Ba, and a first doped region 140Bb and a second doped region 140Bc located on two sides of the channel region 140Ba along the second direction Y. The active layer 150B of the fifth transistor T5 includes: a channel region 150Ba, and a first doped region 150Bb and a second doped region 150Bc located on two sides of the channel region 150Ba along the second direction Y. The active layer 160B of the sixth transistor T6 includes: a channel region 160Ba, and a first doped region 160Bb and a second doped region 160Bc located on two sides of the channel region 160Ba along the second direction Y. The active layer 170*b* of the seventh transistor T7 includes: a channel region 170Ba, and a first doped region 170Bb and a second doped region 170Bc located on two sides of the channel region 170Aa along the first direction X. The active layer 180B of the eighth transistor T8 includes: a channel region 180Ba, and a first doped region 180Bb and a second doped region 180Bc located on two sides of the channel region 180Ba along the second direction Y.

In some examples, the active layer 190B of the first output transistor T9 includes channel regions 190Ba1, 190Ba2, 190Ba3, and 190Ba4 arranged in sequence along the first direction X, a first doped region 190Bb1 and a second doped region 190Bc1 on both sides of the channel region 190Ba1 along the first direction X, a third doped region 190Bb2 and a fourth doped region 190Bc2 on both sides of the channel region 190Ba4 along the first direction X, and a fifth doped region 190Bc3 between the channel regions 190Ba2 and 190Ba3. The third doped region 190Bb2 is located between channel regions 190Ba3 and 190Ba4, and the first doped region 190Bb1 is located between channel regions 190Ba1 and 190Ba2.

In some examples, the active layer 200B of the second output transistor T10 includes channel regions 200Ba1, 200Ba2, 200Ba3, and 200Ba4 arranged in sequence along the first direction X, a first doped region 200Bb1 and a second doped region 200Bc1 on both sides of the channel region 200Ba1 along the first direction X, a third doped region 200Bb2 and a fourth doped region 200Bc2 on both sides of the channel region 200Ba4 along the first direction X, and a fifth doped region 200Bc3 between the channel regions 200Ba2 and 200Ba3. The third doped region 200Bb2 is located between channel regions 200Ba3 and 200Ba4, and the first doped region 200Bb1 is located between channel regions 200Ba1 and 200Ba2.

In some examples, the active layer 210B of the third output transistor T11 includes channel regions 210Ba1, 210Ba2, 210Ba3, and 210Ba4 arranged in sequence along the first direction X, a first doped region 210Bb1 and a second doped region 210Bc1 on both sides of the channel region 210Ba1 along the first direction X, a third doped region 210Bb2 and a fourth doped region 210Bc2 on both sides of the channel region 210Ba4 along the first direction X, and a fifth doped region 210Bc3 between the channel regions 210Ba2 and 210Ba3. The third doped region 210Bb2 is located between channel regions 210Ba3 and 210Ba4, and the first doped region 210Bb1 is located between channel regions 210Ba1 and 210Ba2.

In some examples, the active layer 220B of the fourth output transistor T12 includes channel regions 220Ba1, 220Ba2, 220Ba3, and 220Ba4 arranged in sequence along the first direction X, a first doped region 220Bb1 and a second doped region 220Bc1 on both sides of the channel region 220Ba1 along the first direction X, a third doped region 220Bb2 and a fourth doped region 220Bc2 on both sides of the channel region 220Ba4 along the first direction X, and a fifth doped region 220Bc3 between the channel regions 220Ba2 and 220Ba3. The third doped region 220Bb2 is located between channel regions 220Ba3 and 220Ba4, and the first doped region 220Bb1 is located between channel regions 220Ba1 and 220Ba2.

In some examples, as shown in FIG. 15A, the active layer 130B of the third transistor T3 and the active layer 150B of the fifth transistor T5 may be of an integrated structure. The active layer 110B of the first transistor T1', the active layer 180B of the eighth transistor T8, and the active layer 170B of the seventh transistor T7 may be of an integrated structure. However, this embodiment is not limited thereto.

Figure 15B:
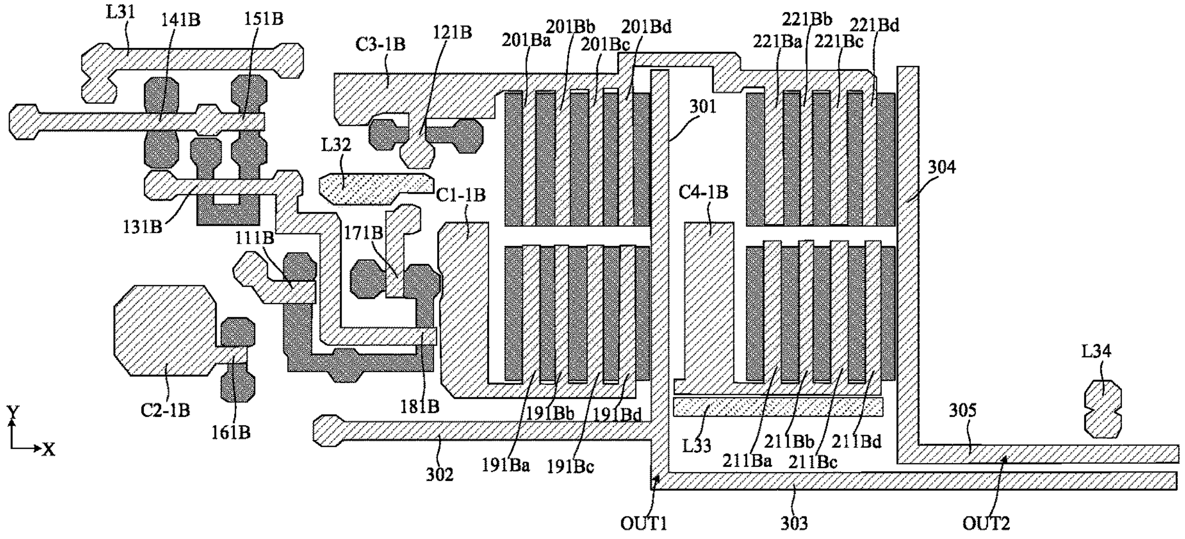
FIG. 15B is a top view of the drive control circuit after a first conductive layer is formed in FIG. 13.

FIG. 15B is a top view of the drive control circuit after a first conductive layer is formed in FIG. 13. As shown in FIG. 13 to FIG. 15B, the first conductive layer 41 in the non-display region at least includes: control electrodes of a plurality of transistors of the drive control circuit and first electrode plates of a plurality of capacitors. For example, the first conductive layer 41 may include: a control electrode 111B of the first transistor T1', a control electrode 121B of the second transistor T2', a control electrode 131B of the third transistor T3, a control electrode 141B of the fourth transistor T4, a control electrode 151B of the fifth transistor T5, a control electrode 161B of the sixth transistor T6, a control electrode 171B of the seventh transistor T7, a control electrode 181B of the eighth transistor T8, control electrodes 191Ba, 191Bb, 191Bc and 191Bd of the first output transistor T9, control electrodes 201 Ba, 201Bb, 201Bc and 201Bd of the second output transistor T10, control electrodes 211Ba, 211Bb, 211Bc and 211Bd of the third output transistor T11, control electrodes 221Ba, 221Bb, 221Bc and 221Bd of the fourth output transistor T12, a first electrode plate C1-1B of the first capacitor C1, a first electrode plate C2-1B of the second capacitor C2, a first electrode plate C3-1B of the third capacitor C3', a first electrode plate C4-1B of the fourth capacitor C4, a first output terminal OUT1, a second output terminal OUT2, and a plurality of connection electrodes (e.g. thirty-first connection electrode L31 to thirty-fourth connection electrode L34).

In some examples, the first output OUT1 includes a first portion 301 extending in a second direction Y, a second portion 302 and a third portion 303 extending in a first direction X. The first portion 301 of the first output OUT1 is located between the first output circuit and the second output circuit. The second portion 302 and the third portion 303 are located on the same side of the first output circuit and the second output circuit in the second direction Y. The second output terminal OUT2 includes a fourth portion 304 extending in the second direction Y and a fifth portion 305 extending in the first direction X. An orthographic projection of the second output terminal OUT2 on the substrate may be L-shaped. The fifth portion 305 is located on a side of the third portion 303 close to the second output circuit.

The first output terminal OUT1 of the current stage drive control circuit can be electrically connected with the signal input terminal of the next stage drive control circuit. However, this embodiment is not limited thereto.

In some examples, as shown in FIG. 15B, the first output transistor T9, the second output transistor T10, the third output transistor T11, and the fourth output transistor T12 may be a quad-gate transistor to prevent and reduce generation of a leakage current. However, this embodiment is not limited thereto.

In some examples, as shown in FIG. 15B, the control electrode 141B of the fourth transistor T4 and the control electrode 151B of the fifth transistor T5 may be in an integrated structure. The control electrode 131B of the third transistor T3 and the control electrode 181B of the eighth transistor T8 may be in an integrated structure. The control electrode 161B of the sixth transistor T6 and the first electrode plate C2-1B of the second capacitor C2 may be in an integrated structure. The first electrode plate C1-1B of the first capacitor C1 and the control electrodes 191Ba, 191Bb, 191Bc and 191Bd of the first output transistor T9 may be in an integrated structure. The control electrode 121B of the second transistor T2', the first electrode plate C3-1B of the third capacitor C3', the control electrodes 201Ba, 201Bb, 201Bc and 201Bd of the second output transistor T10, and the control electrodes 221Ba, 221Bb, 221Bc and 221Bd of the fourth output transistor T12 may be in an integrated structure. The first electrode plate C4-1B of the fourth capacitor C4 and the control electrodes 211Ba, 211Bb, 211Bc and 211Bd of the third output transistor T11 may be in an integrated structure.

Figure 15C:
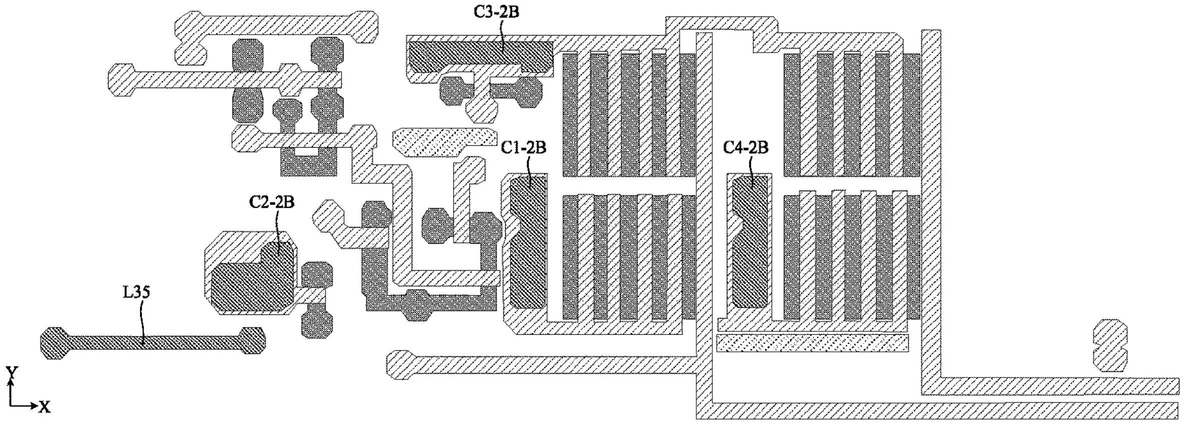
FIG. 15C is a top view of the drive control circuit after a second conductive layer is formed in FIG. 13.

FIG. 15C is a top view of the drive control circuit after a second conductive layer is formed in FIG. 13. As shown in FIGS. 13 to 15C, the second conductive layer 42 of the display region at least includes a second electrode plate of a plurality of capacitors of the drive control circuit. For example, the second conductive layer 42 may include a second electrode plate C1-2B of the first capacitor C1, a second electrode plate C2-2B of the second capacitor C2, a second electrode plate C3-2B of the third capacitor C3', a second electrode plate C4-2B of the fourth capacitor C4, and a thirty-fifth connection electrode L35. An orthographic projection of the first electrode plate C1-1B of the first capacitor C1 on the substrate 30 covers an orthographic projection of the second electrode plate C1-2B on the substrate 30. An orthographic projection of the first electrode plate C2-1B of the second capacitor C2 on the substrate 30 covers an orthographic projection of the second electrode plate C2-2B on the substrate 30. An orthographic projection of the first electrode plate C3-1B of the third capacitor C3' on the substrate 30 covers an orthographic projection of the second electrode plate C3-2B on the substrate 30. An orthographic projection of the first electrode plate C4-1B of the fourth capacitor C4 on the substrate 30 covers an orthographic projection of the second electrode plate C4-2B on the substrate 30.

Figure 15D:
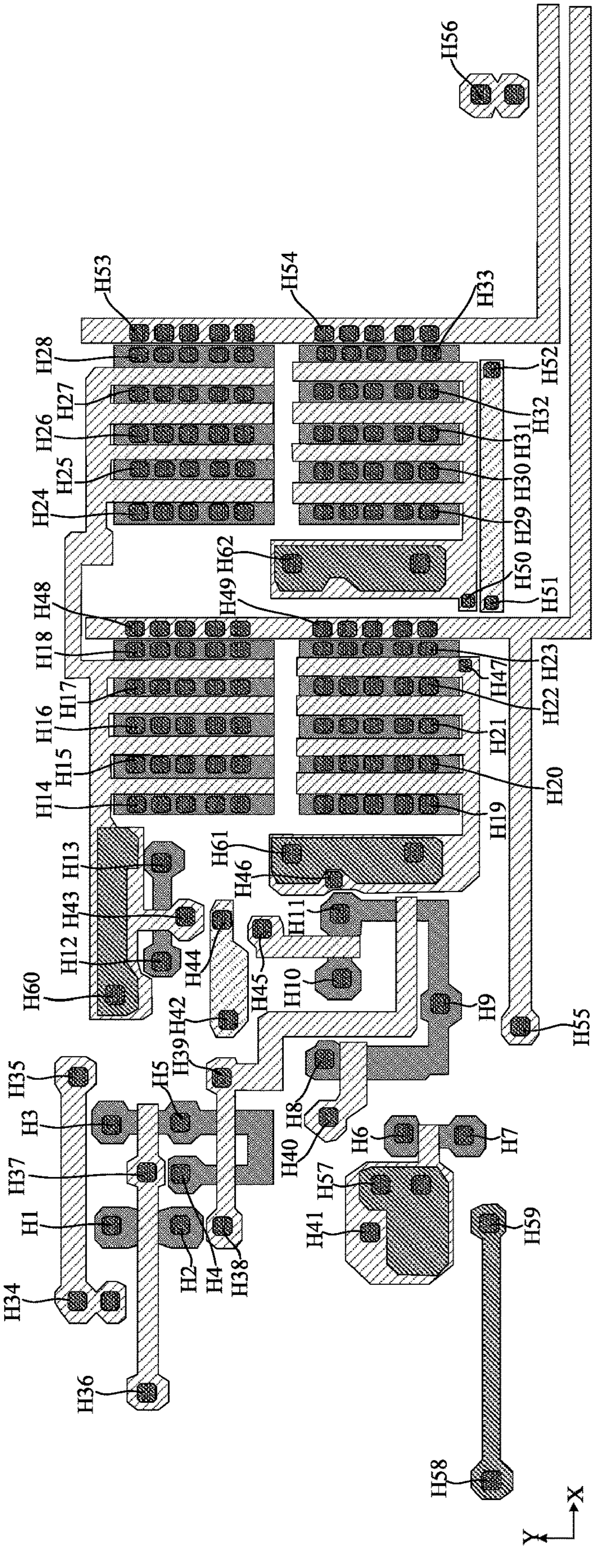
FIG. 15D is a top view of the drive control circuit after a third insulating layer is formed in FIG. 13.

FIG. 15D is a top view of the drive control circuit after a third insulating layer is formed in FIG. 13. As shown in FIG. 13 to FIG. 15D, a plurality of via holes is formed on a third insulating layer 33 of the non-display region. The plurality of via holes may include a plurality of first type via holes, a plurality of second type via holes, and a plurality of third type via holes. The third insulating layer 33, the second insulating layer 32 and the first insulating layer 31 in the first type via hole are removed to expose the surface of the semiconductor layer 40. The third insulating layer 33 and the second insulating layer 32 in the second type of via hole are removed to expose the surface of the first conductive layer 41. The third insulating layer 33 inside the third type via hole is removed to expose the surface of the second conductive layer 42. For example, the first type of via hole may include: 101st via hole H1 to 133rd via hole H33; the second type of via hole may include a 134th via hole H34 to a 156th via hole H56; the third type of via hole may include a 157th via hole H57 to a 162nd via hole H62.

Figure 15E:
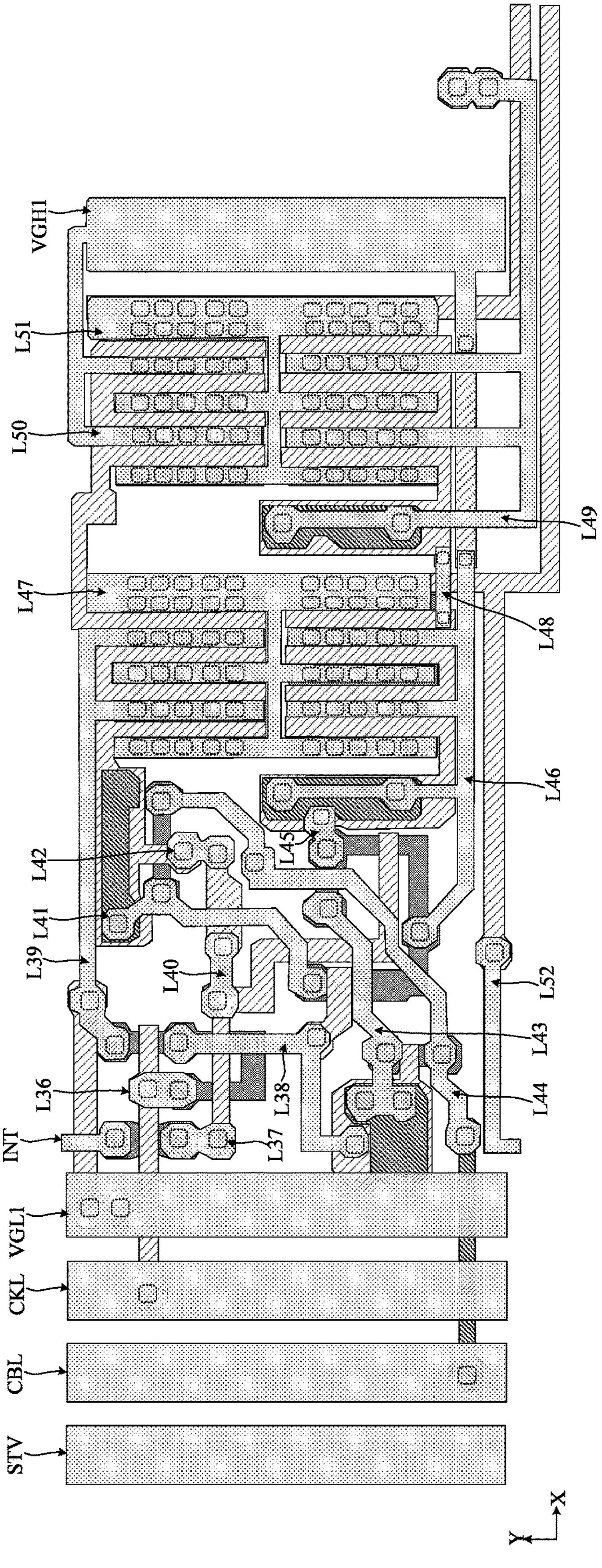
FIG. 15E is a top view of the drive control circuit after a third conductive layer is formed in FIG. 13.

FIG. 15E is a top view of the drive control circuit after a third conductive layer is formed in FIG. 13. As shown in FIGS. 13 to 15E, the third conductive layer 43 of the non-display region may include a plurality of connection electrodes (for example, the thirty-sixth connection electrode L36 to the fifty-second connection electrode L52), a signal input terminal INT, a first clock signal line CKL, a second clock signal line CBL, a first power supply line VGH1, a second power supply line VGL1, and a start signal line STV. The start signal line STV, the second clock signal line CBL, the first clock signal line CKL, the second power supply line VGL1 and the first power supply line VGH1 all extend along the second direction Y and are arranged in sequence along the first direction X.

In some examples, as shown in FIGS. 13 to 15E, the signal input terminal INT may be electrically connected to the first doped region 140Bb of the active layer 140B of the fourth transistor T4 through the 101st via hole H1. The 36th connection electrode L36 may be electrically connected to the first doped region 130Bb of the active layer 130B of the third transistor T3 through the 104th via hole H4, and may be electrically connected to the control electrode 141B of the fourth transistor T4 through the 137th via hole H37. The first clock signal line CKL may be electrically connected to the control electrode 141B of the fourth transistor T4 through the 136th via hole H36. The thirty-seventh connection electrode L37 may be electrically connected to the second doped region 140Bc of the active layer 140B of the fourth transistor T4 through the 102nd via hole H2, and may be electrically connected to the control electrode 131B of the third transistor T3 through the 138th via hole H38. The thirty-eighth connection electrode L38 may be electrically connected to the second doped region 150Bc of the active layer 150B of the fifth transistor T5 through the 105th via hole H5, may be electrically connected to the control electrode 111B of the first transistor T1' through the 140th via hole H40, and may be electrically connected to the control electrode C2-1B of the second capacitor C2 through the 141st via hole H41. The thirty-ninth connection electrode L39 may be electrically connected to the first doped region 150Bb of the active layer 150B of the fifth transistor T5 through the 103rd via hole H3, may be electrically connected to the thirty-first connection electrode L31 through the 135th via hole H35, may be electrically connected to the first doped region 200Bb1 of the active layer 200B of the second output transistor T10 through a plurality of (e.g. five) 115th via holes H15 arranged vertically, and may be electrically connected to the third doped region 200Bb2 of the active layer 200B of the second output transistor T10 through a plurality of (e.g. five) 117th via holes H17 arranged vertically. The thirty-first connection electrode L31 may be electrically connected to the second power supply line VGL1 through two 134th via holes H34 arranged vertically. The fortieth connection electrode L40 may be electrically connected to the control electrode 131B of the third transistor T3 through a 139th via hole H39, and may be electrically connected to the thirty-second connection electrode L32 through a 142nd via hole H42. The forty-second connection electrode L42 may be electrically connected to the thirty-second connection electrode L32 through the 144th via hole H44, and may be electrically connected to the control electrode 121B of the second transistor T2' through the 143rd via hole H43. The forty-first connection electrode L41 may be electrically connected to the second electrode plate C3-2B of the third capacitor C3' through the 160th via hole H60, may be electrically connected to the second doped region 120Bc of the active layer 120B of the second transistor T2' through the 112th via hole H12, and may be electrically connected to the second doped region 110Bc of the active layer 110B of the first transistor T1' through the 108th via hole H8. The forty-third connection electrode L43 may be electrically connected to the second electrode plate C2-2B of the second capacitor C2 through two 157th via holes H57 arranged vertically, may be electrically connected to the second doped region 160Bb of the active layer 160B of the sixth transistor T6 through the 106th via hole H6, and may be electrically connected to the first doped region 170Bb of the active layer 170B of the seventh transistor T7 through the 110th via hole H10. The forty-fourth connection electrode L44 may be electrically connected to the 35th connection electrode L35 through the 159th via hole H59, may be electrically connected to the first doped region 160Bb of the active layer 160B of the sixth transistor T6 through the 107th via hole H7, may be electrically connected to the control electrode 171B of the seventh transistor T7 through the 145th via hole H45, and may be electrically connected to the first doped region 120Bb of the active layer 120B of the second transistor T2' through the 113th via hole H13. The thirty-fifth connection electrode L35 may be electrically connected to the second clock signal line CBL through the 158th via hole H58. The forty-fifth connection electrode L45 may be electrically connected to the second doped region 170Bc of the active layer 170B of the seventh transistor T7 through the 111th via hole H11, and may be electrically connected to the first electrode plates C1-1B of the first capacitor C1 through the one 146th via hole H46. The forty-sixth connection electrode L46 may be electrically connected to the first doped region 180Bb of the active layer 180B of the eighth transistor T8 through the 109th via hole H9, may be electrically connected to the second electrode plate C1-2B of the first capacitor C1 through two 161st via holes H61 arranged vertically, may be electrically connected to the first doped region 190Bb1 of the active layer 190B of the first output transistor T9 through a plurality (e.g. five) 120th via holes H20 arranged vertically, may be electrically connected to the third doped region 190Bb2 of the active layer 190B of the first output transistor T9 through a plurality (e.g. five) of the 122nd via holes H22 arranged vertically, and may be electrically connected to the thirty-third connection electrode L33 through the 151st via hole H51. The thirty-third connection electrode L33 may be electrically connected to the first power supply line VGH1 through the 152th via hole H52.

In some examples, as shown in FIGS. 13 through 15E, the forty-seventh connection electrode L47 may be electrically connected to the second doped region 200Bc1 of the active layer 200B of the second output transistor T10 through a plurality of (e.g. five) 114th via holes H14 arranged vertically, may be electrically connected to the fifth doped region 200Bc3 of the active layer 200B of the second output transistor T10 through a plurality (e.g. five) of the 116th via holes H16 arranged vertically, may be electrically connected to the fourth doped region 200Bc2 of the active layer 200B of the second output transistor T10 through a plurality of (e.g. five) 118th via holes H18 arranged vertically, may be electrically connected to the second doped region 190Bc1 of the active layer 190B of the first output transistor T9 through a plurality of (e.g. five) 119th via holes H19 arranged vertically, may be electrically connected to the fifth doped region 190Bc3 of the active layer 190 of the first output transistor T9 through a plurality (e.g. five) of the 121th via holes H21 arranged vertically, may be electrically connected to the fourth doped region 190Bc2 of the active layer 190B of the first output transistor T9 through a plurality of (e.g. five) 123rd via holes H23 arranged vertically, and may be electrically connected to the first portion 301 of the first output terminal OUT1 through a plurality of (e.g. five) 148th via holes H48 and a plurality of (e.g. five) 149th via holes H49 arranged vertically.

In some examples, as shown in FIGS. 13 to 15E, the forty-eighth connection electrode L48 may be electrically connected to the control electrode 191B of the first output transistor T9 through the 147th via hole H47, and may be electrically connected to the first electrode plate C4-1B of the fourth capacitor C4 through the 150th via hole H50. The forty-ninth connection electrode L49 may be electrically connected to the second electrode plate C4-2B of the fourth capacitor C4 through two 162nd via holes H62 arranged vertically, may be electrically connected to the first doped region 210Bb1 of the active layer 210B of the third output transistor T11 through a plurality of (e.g. five) 130th via holes H30 arranged vertically, and may be electrically connected to the third doped region 210Bb2 of the active layer 210B of the third output transistor T11 through a plurality of (e.g. five) 132th via holes H32 arranged vertically; and may be electrically connected to the thirty-fourth connection electrode L34 through two 156th via holes H56 arranged vertically. The thirty-fourth connection electrode L34 may be electrically connected to a fourth power supply line close to the display region side. The fiftieth connection electrode L50 may be electrically connected to the first doped region 220Bb1 of the active layer 220B of the fourth output transistor T12 through a plurality (e.g. five) of the 125th via holes H25 arranged vertically, and may be electrically connected to the third doped region 220B2 of the active layer 220B of the fourth output transistor T12 through a plurality (e.g. five) of the 127th via holes H27 arranged vertically. The fiftieth connection electrode L50 and the first power supply line VGH1 may be of an integrated structure. The first power supply line VGH1 may be electrically connected to the thirty-third connection electrode L33 through the 152nd via hole H52.

In some examples, as shown in FIGS. 13 through 15E, the fifty-first connection electrode L51 may be electrically connected to the second doped region 220Bc1 of the active layer 220B of the fourth output transistor T12 through a plurality (e.g. five) of the 124th via holes H24 arranged vertically, may be electrically connected to the fifth doped region 220Bc3 of the active layer 220B of the fourth output transistor T12 through a plurality (e.g. five) of the 126th via holes H26 arranged vertically, may be electrically connected to the fourth doped region 220Bc2 of the active layer 220B of the fourth output transistor T12 through a plurality (e.g. five) of the 128th via holes H28 arranged vertically, may be electrically connected to the second doped region 210Bc1 of the active layer 210B of the third output transistor T11 through a plurality of (e.g. five) 129th via holes H29 arranged vertically, may be electrically connected to the fifth doped region 210Bc3 of the active layer 210B of the third output transistor T11 through a plurality of (e.g. five) 131th via holes H31 arranged vertically, may be electrically connected to the fourth doped region 210Bc2 of the active layer 210B of the third output transistor T11 through a plurality of (e.g. five) 133th via holes H33 arranged vertically, and may be electrically connected to the fourth portion 304 of the second output terminal OUT2 through a plurality of (e.g. five) 153th via holes H53 and a plurality of (e.g. five) 154th via holes H54 arranged vertically. The fifty-second connection electrode L52 may be electrically connected to the second portion 302 of the first output terminal OUT1 through the 155th via hole H55. In some examples, the fifty-second connection electrode L52 may be electrically connected to a signal input terminal of the next stage drive control circuit, for example, may be of an integrated structure. However, this embodiment is not limited thereto.

In the display substrate provided by the exemplary embodiment, a light emitting control signal and a second reset control signal are provided to a pixel circuit by a drive control circuit, thereby saving arrangement space and achieving a display substrate with a narrow bezel design.

The structure of the display substrate will be described below through an example of a manufacturing process of the display substrate. A "patterning process" mentioned in the present disclosure includes processes, such as deposition of a film layer, photoresist coating, mask exposure, development, etching, and photoresist stripping. Deposition may be any one or more of sputtering, evaporation, and chemical vapor deposition. Coating may be any one or more of spray coating and spin coating. Etching may be any one or more of dry etching and wet etching. A "thin film" refers to a layer of a thin film prepared from a material on a substrate using a process of deposition or coating. If a patterning process is not needed for the "thin film" during a whole preparation process, the "thin film" may be referred to as a "layer". When a patterning process is needed for the "thin film" during the whole preparation process, the thin film is referred to as a "thin film" before the patterning process and referred to as a "layer" after the patterning process. The "layer" after the patterning process at least includes one "pattern".

"A and B are arranged in the same layer" mentioned in the present disclosure refers to that A and B are simultaneously formed by the same patterning process. The "thickness" of the thin film layer is a size of the film layer in a direction perpendicular to the display substrate. In the exemplary embodiment of the present disclosure, "a projection of A includes a projection of B" refers to that a boundary of a projection of B falls within a range of a boundary of a projection of A or the boundary of a projection of A is overlapped with the boundary of a projection of B.

The preparation process of the display substrate according to the exemplary embodiment may include following acts.

(1) A substrate is provided.

In some exemplary embodiments, a substrate 30 may be a rigid substrate or a flexible substrate. The rigid substrate may include one or more of glass and metal foil sheet. The flexible substrate may include one or more of polyethylene terephthalate, ethylene terephthalate, polyether ether ketone, polystyrene, polycarbonate, polyarylate, polyarylester, polyimide, polyvinyl chloride, polyethylene, and textile fiber.

(2) A pattern of a semiconductor layer is formed.

In some exemplary implementation modes, a semiconductor thin film is deposited on the substrate 30, and the semiconductor thin film is patterned through a patterning process to form a a semiconductor layer 40, as shown in FIG. 12A or FIG. 15A. The semiconductor layer 40 at least includes active layers of a plurality of transistors in the drive control circuit. The active layer may include at least one channel region and a plurality of doped regions. The channel region may not be doped with an impurity, and has characteristics of a semiconductor. A doped region is doped with an impurity and therefore has conductivity. An impurity may be changed according to a type (e.g., an N type or a P type) of a transistor. In some examples, a material of the semiconductor thin film may be polysilicon.

(3) A pattern of a first conductive layer is formed.

In some exemplary embodiments, a first insulating thin film and a first conductive thin film are sequentially deposited on the substrate 30 where the aforementioned pattern is formed, and the first conductive thin film is patterned through a patterning process to form a first insulating layer 31 covering the semiconductor layer 40 and form a first conductive layer 41 arranged on the first insulating layer 31, as shown in FIG. 12B or FIG. 15B. In some examples, the first conductive layer 41 may include control electrodes of a plurality of transistors of the drive control circuit and first electrode plates of a plurality of capacitors of the drive control circuit.

(4) A pattern of a second conductive layer is formed.

In some exemplary implementations, a second insulation thin film and a second conductive thin film are sequentially deposited on the substrate 30 where the aforementioned patterns are formed, and the second conductive thin film is patterned through a patterning process to form a second insulating layer 32 covering the first conductive layer 41 and a second conductive layer 42 disposed on the second insulating layer 32, as shown in FIG. 12C or FIG. 15C. In some examples, the second conductive layer 42 may include second electrode plates of a plurality of capacitors of the drive control circuit.

(5) A pattern of a third insulating layer is formed.

In some exemplary embodiments, a third insulating thin film is deposited on the substrate 30 where the aforementioned patterns are formed, and the third insulating thin film is patterned through a patterning process to form a third insulating layer 33 covering the second conductive layer 42, as shown in FIGS. 12D and 15D. In some examples, a plurality of via holes is opened on the third insulating layer 33. The plurality of via holes at least includes a first type via hole, a second type via hole, a third type via hole and a fourth type via hole. The third insulating layer 33, the second insulating layer 32 and the first insulating layer 31 in the first type via hole are removed to expose the surface of the semiconductor layer 40. The third insulating layer 33 and the second insulating layer 32 in the second type of via hole are removed to expose the surface of the first conductive layer 41. The third insulating layer 33 inside the third type via hole is removed to expose the surface of the second conductive layer 42.

(6) A pattern of a third conductive layer is formed.

In some exemplary implementations, a third conductive thin film is deposited on the substrate 30 where the aforementioned patterns are formed, and the third conductive thin film is patterned through a patterning process to form a third conductive layer 43 on the third insulating layer 33, as shown in FIG. 12E or FIG. 15E. In some examples, the third conductive layer 43 may include a plurality of connection electrodes of the drive control circuit, a first power supply line VGH1, a second power supply line VGL1, a first clock signal line CKL, and a second clock signal line CBL.

In some exemplary embodiments, a pixel circuit may be formed in the display region while a drive control circuit is formed in the non-display region. For example, a semiconductor layer of the display region may include active layers of a plurality of transistors of a pixel circuit, a first conductive layer of the display region may include control electrodes of a plurality of transistors of the pixel circuit and a first electrode of a storage capacitor, a second conductive layer of the display region may at least include a second electrode of the storage capacitor of the pixel circuit, and a third conductive layer of the display region may at least include a first electrode and a second electrode of the transistor of the pixel circuit. However, this embodiment is not limited thereto.

In some exemplary implementations, after the third conductive layer is formed, patterns of a fourth insulating layer, an anode layer, a pixel definition layer, an organic light emitting layer, a cathode layer, and an encapsulation layer may be sequentially formed in the display region. In some examples, on a substrate where the aforementioned patterns are formed, a fourth insulation thin film is coated, and a pattern of a fourth insulating layer is formed through masking, exposing, and developing for the fourth insulation thin film. Then, an anode thin film is deposited on the substrate where the display region of the aforementioned patterns is formed, and the anode thin film is patterned through a patterning process to form a pattern of an anode on the fourth insulating layer. Next, on the substrate where the aforementioned patterns are formed, a pixel definition thin film is coated, and a pattern of a Pixel Definition layer (PDL) is formed through masking, exposure, and development processes. The pixel definition layer is formed in each sub-pixel in the display region. A pixel opening exposing the anode is formed in the pixel definition layer in each sub-pixel. Subsequently, the organic emitting layer connected to the anode is formed in the pixel opening formed before. Subsequently, a cathode thin film is deposited, and the cathode thin film is patterned through a patterning process to form a pattern of a cathode. Then, an encapsulation layer is formed on the cathode. The encapsulation layer may include a stacked structure of an inorganic material/an organic material/an inorganic material.

In some exemplary embodiments, the first conductive layer 41, the second conductive layer 42, and the third conductive layer 43 may be made of metal materials, such as any one or more of silver (Ag), copper (Cu), aluminum (Al) and molybdenum (Mo), or alloy materials of the above metals, such as aluminum neodymium alloy (AlNd) or molybdenum niobium alloy (MoNb), and may be a single-layer structure or a multi-layer composite structure, such as Mo/Cu/Mo. The first conductive layer 41 may also be referred to as a first gate metal layer, the second conductive layer 42 may also be referred to as a second gate metal layer, and the third conductive layer 43 may be referred to as a first source-drain metal layer. The first insulating layer 31 to the third insulating layer 33 may be any one or more of silicon oxide (SiOx), silicon nitride (SiNx), and silicon oxynitride (SiON), and may be in a single layer, a plurality of layers, or a composite layer. The fourth insulating layer and the pixel definition layer may be made of the organic material, such as polyimide, acrylic, or polyethylene terephthalate, etc. The anode may be made of a transparent conductive material, e.g., Indium Tin Oxide (ITO) or Indium Zinc Oxide (IZO). The cathode may be made of any one or more of Magnesium (Mg), Argentum (Ag), Aluminum (Al), Copper (Cu), and Lithium (Li), or an alloy made of any one or more of the aforementioned metals. However, this embodiment is not limited thereto. For example, the anode may be made of a reflective material such as a metal, and the cathode may be made of a transparent conductive material.

The structure shown in the exemplary embodiment and the preparation process thereof are merely illustrative. In some exemplary implementations, corresponding structures may be altered and patterning processes may be increased or decreased according to actual needs.

The manufacturing process of the exemplary embodiment may be implemented using an existing mature manufacturing device, and may be compatible well with the relevant manufacturing process, simple in process implementation, easy to implement, high in a production efficiency, low in a production cost, and high in a yield.

In the exemplary embodiment, a reasonable arrangement of the dual-output drive control circuit can be achieved by a simple arrangement, the arrangement space can be saved, and the display substrate with a narrow bezel can be achieved.

Figure 16:
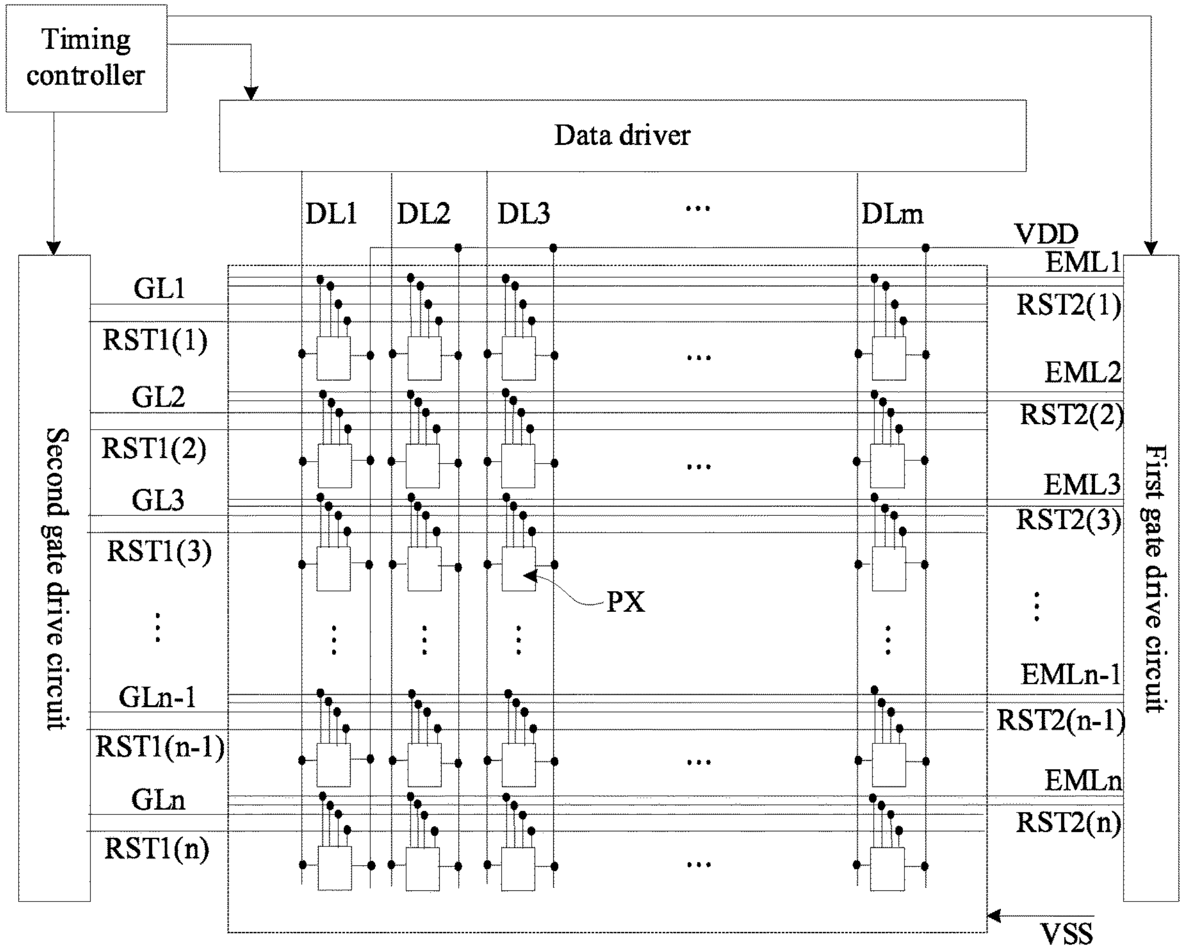
FIG. 16 is a schematic diagram of a display substrate according to at least one embodiment of the present disclosure.

FIG. 16 is a schematic diagram of a display substrate according to at least one embodiment of the present disclosure. In some exemplary embodiments, as shown in FIG. 16, the display substrate may include: a timing controller, a data driver, a first gate drive circuit, a second gate drive circuit, and a plurality of pixel circuits PX. A plurality of pixel circuits PX may be regularly arranged in the display region. The timing controller may supply a grayscale value and a control signal suitable for a specification of the data driver to the data driver, and may supply a clock signal, a start signal, and the like to the first gate drive circuit and the second gate drive circuit. The data driver may generate data voltages to be supplied to the data lines DL1 to DLm using grayscale values and control signals received from the clock controller. The first gate drive circuit may be the gate drive circuit as described in the foregoing embodiment, which may be configured to supply a light emitting control signal to the pixel circuit of the display region through the light emitting control lines EML1 to EMLn, and may be configured to provide a second reset control signal to the pixel circuit of the display region through the second reset control lines RST2(1) to RST2($n$). The second gate drive circuit may include a plurality of cascaded scan drive circuits configured to supply a scan signal to a pixel circuit of the display region through scan lines GL1 to GLn, and may supply a first reset control signal through first reset control lines RST1(1) to RST1($n$). Herein, both n and m are integers. However, this embodiment is not limited thereto. In other examples, the scan signal and the first reset control signal may be provided by different gate drive circuits.

An embodiment of the present disclosure further provides a display apparatus, which includes the display substrate as described above. In some examples, the display substrate may be an OLED display substrate, a QLED display substrate, a Micro-LED display substrate, or a Mini-LED display substrate. The display apparatus may be any product or component with a display function, such as an OLED display apparatus, a watch, a mobile phone, a tablet computer, a television, a display, a laptop computer, a digital photo frame, and a navigator. However, this embodiment is not limited thereto.

The drawings of the present disclosure only involve structures involved in the present disclosure, and other structures may refer to conventional designs. The embodiments of the present disclosure and features in the embodiments may be combined to each other to obtain new embodiments if there is no conflict. Those of ordinary skills in the art should understand that modifications or equivalent replacements of the technical solutions of the present disclosure may be made without departing from the spirit and scope of the technical solutions of the present disclosure, and shall all fall within the scope of the claims of the present disclosure.

The invention claimed is:

1. A display substrate, comprising:

a drive control circuit and a pixel circuit, wherein the drive control circuit comprises an input circuit, a first output circuit, and a second output circuit, wherein:

the input circuit is electrically connected with a signal input terminal, a clock signal terminal, a first node and a second node, and is configured to control potentials of the first node and the second node under control of the signal input terminal and the clock signal terminal;

the first output circuit is electrically connected with the first node, the second node, a first output terminal, a first power supply line, and a second power supply line, and is configured to output a first power supply signal supplied by the first power supply line to the first output terminal under control of the first node, or to output a second power supply signal supplied by the second power supply line to the first output terminal under control of the second node;

the second output circuit is electrically connected with the first node, the second node, a second output terminal, a third power supply line and a fourth power supply line, and is configured to output a fourth power supply signal supplied by the fourth power supply line to the second output terminal under control of the first node, or to output a third power supply signal supplied by the third power supply line to the second output terminal under control of the second node;

the drive control circuit is configured to provide a light emitting control signal to the pixel circuit through the first output terminal and provide a second reset control signal to the pixel circuit through the second output terminal;

the pixel circuit comprises a data writing sub-circuit configured to provide a data signal under control of a scan signal, and the pixel circuit is configured to receive a first reset control signal from a first reset control line; and within a duration of one frame, an overlapping duration between a reset duration of an anode of a light emitting element under control of the second reset control signal and a duration during which the light emitting element is not driven by the light emitting control signal is longer than twice of an effective level duration of the scan signal, wherein the first reset control signal transits to a low level after the second reset control signal transits to a low level.

2. The display substrate according to claim 1, wherein the second output circuit comprises a third output transistor and a fourth output transistor;

a control electrode of the third output transistor is electrically connected to the first node, a first electrode of the third output transistor is electrically connected to the fourth power supply line, and a second electrode of the third output transistor is electrically connected to the second output terminal; and a control electrode of the fourth output transistor is electrically connected to the second node, a first electrode of the fourth output transistor is electrically connected to the third power supply line, and a second electrode of the fourth output transistor is electrically connected to the second output terminal.

3. The display substrate according to claim 2, wherein the second output circuit further comprises: a fourth capacitor; a first electrode plate of the fourth capacitor is electrically connected to the first node, and a second electrode plate of the fourth capacitor is electrically connected to the fourth power supply line.

4. The display substrate according to claim 1, wherein the first output circuit comprises: a first output transistor and a second output transistor;

a control electrode of the first output transistor is electrically connected to the first node, a first electrode of the first output transistor is electrically connected to the first power supply line, and a second electrode of the first output transistor is electrically connected to the first output terminal; and a control electrode of the second output transistor is electrically connected to the second node, a first electrode of the second output transistor is electrically connected to the second power supply line, and a second electrode of the second output transistor is electrically connected to the first output terminal.

5. The display substrate according to claim 1, wherein:

the input circuit comprises: an input sub-circuit, a first control sub-circuit, a second control sub-circuit, and a third control sub-circuit;

the input sub-circuit is electrically connected with the signal input terminal, a first clock terminal, the second power supply line, the second node, and a third node, and is configured to control potentials of the second node and the third node under control of the first clock terminal and the signal input terminal;

the first control sub-circuit is electrically connected with the second node, the third node, the first power supply line, and a second clock terminal, and is configured to control the potential of the second node under control of the third node and the second clock terminal, or to store signals supplied by the first power supply line or the second clock terminal under control of the second node and the third node;

the second control sub-circuit is electrically connected with the third node, the first node and the second clock terminal, and is configured to control the potential of the first node under control of the third node and the second clock terminal; and the third control sub-circuit is electrically connected to the first node, the second node and the first power supply line, and is configured to control the potential of the first node under control of the second node;

the input sub-circuit comprises: a third transistor, a fourth transistor and a fifth transistor;

a control electrode of the third transistor is electrically connected to the second node, a first electrode of the third transistor is electrically connected to the first clock terminal, and a second electrode of the third transistor is electrically connected to the third node;

a control electrode of the fourth transistor is electrically connected with the first clock terminal, a first electrode of the fourth transistor is electrically connected with the signal input terminal, and a second electrode of the fourth transistor is electrically connected with the second node; and a control electrode of the fifth transistor is electrically connected to the first clock terminal, a first electrode of the fifth transistor is electrically connected to the second power supply line, and a second electrode of the fifth transistor is electrically connected to the third node.

6. The display substrate according to claim 1, wherein:

the input circuit comprises: an input sub-circuit, a first control sub-circuit, a second control sub-circuit, and a third control sub-circuit;

the input sub-circuit is electrically connected with the signal input terminal, a first clock terminal, the second power supply line, the second node, and a third node, and is configured to control potentials of the second node and the third node under control of the first clock terminal and the signal input terminal;

the first control sub-circuit is electrically connected with the second node, the third node, the first power supply line, and a second clock terminal, and is configured to control the potential of the second node under control of the third node and the second clock terminal, or to store signals supplied by the first power supply line or the second clock terminal under control of the second node and the third node;

the second control sub-circuit is electrically connected with the third node, the first node and the second clock terminal, and is configured to control the potential of the first node under control of the third node and the second clock terminal; and the third control sub-circuit is electrically connected to the first node, the second node and the first power supply line, and is configured to control the potential of the first node under control of the second node;

the first control sub-circuit comprises: a first transistor, a second transistor and a third capacitor;

a control electrode of the first transistor is electrically connected to the third node, a first electrode of the first transistor is electrically connected to the first power supply line, and a second electrode of the first transistor is electrically connected to a first electrode of the second transistor;

a control electrode of the second transistor is electrically connected with the second clock terminal, and a second electrode of the second transistor is electrically connected with the second node; and a first electrode plate of the third capacitor is electrically connected to the second node, and a second electrode plate of the third capacitor is electrically connected to the second clock terminal.

7. The display substrate according to claim 1, wherein:

the input circuit comprises: an input sub-circuit, a first control sub-circuit, a second control sub-circuit, and a third control sub-circuit;

the input sub-circuit is electrically connected with the signal input terminal, a first clock terminal, the second power supply line, the second node, and a third node, and is configured to control potentials of the second node and the third node under control of the first clock terminal and the signal input terminal;

the first control sub-circuit is electrically connected with the second node, the third node, the first power supply line, and a second clock terminal, and is configured to control the potential of the second node under control of the third node and the second clock terminal, or to store signals supplied by the first power supply line or the second clock terminal under control of the second node and the third node;

the second control sub-circuit is electrically connected with the third node, the first node and the second clock terminal, and is configured to control the potential of the first node under control of the third node and the second clock terminal; and the third control sub-circuit is electrically connected to the first node, the second node and the first power supply line, and is configured to control the potential of the first node under control of the second node;

the first control sub-circuit comprises: a first transistor, a second transistor and a third capacitor;

a control electrode of the first transistor is electrically connected to the third node, a first electrode of the first transistor is electrically connected to the first power supply line, and a second electrode of the first transistor is electrically connected to a second electrode of the second transistor;

a control electrode of the second transistor is electrically connected with the second node, and a first electrode of the second transistor is electrically connected with the second clock terminal; and a first electrode plate of the third capacitor is electrically connected to the second node, and a second electrode plate of the third capacitor is electrically connected to a second electrode of the second transistor.

8. The display substrate according to claim 1, wherein:

the input circuit comprises: an input sub-circuit, a first control sub-circuit, a second control sub-circuit, and a third control sub-circuit;

the input sub-circuit is electrically connected with the signal input terminal, a first clock terminal, the second power supply line, the second node, and a third node, and is configured to control potentials of the second node and the third node under control of the first clock terminal and the signal input terminal;

the first control sub-circuit is electrically connected with the second node, the third node, the first power supply line, and a second clock terminal, and is configured to control the potential of the second node under control of the third node and the second clock terminal, or to store signals supplied by the first power supply line or the second clock terminal under control of the second node and the third node;

the second control sub-circuit is electrically connected with the third node, the first node and the second clock terminal, and is configured to control the potential of the first node under control of the third node and the second clock terminal; and the third control sub-circuit is electrically connected to the first node, the second node and the first power supply line, and is configured to control the potential of the first node under control of the second node;

the second control sub-circuit comprises: a sixth transistor, a seventh transistor and a second capacitor;

a control electrode of the sixth transistor is electrically connected to the third node, a first electrode of the sixth transistor is electrically connected to the second clock terminal, and a second electrode of the sixth transistor is electrically connected to a first electrode of the seventh transistor;

a control electrode of the seventh transistor is electrically connected with the second clock terminal, and a second electrode of the seventh transistor is electrically connected with the first node; and a first electrode plate of the second capacitor is electrically connected to the third node, and a second electrode plate of the second capacitor is electrically connected to the first electrode of the seventh transistor.

9. The display substrate according to claim 1, wherein:

the input circuit comprises: an input sub-circuit, a first control sub-circuit, a second control sub-circuit, and a third control sub-circuit;

the input sub-circuit is electrically connected with the signal input terminal, a first clock terminal, the second power supply line, the second node, and a third node, and is configured to control potentials of the second node and the third node under control of the first clock terminal and the signal input terminal;

the first control sub-circuit is electrically connected with the second node, the third node, the first power supply line, and a second clock terminal, and is configured to control the potential of the second node under control of the third node and the second clock terminal, or to store signals supplied by the first power supply line or the second clock terminal under control of the second node and the third node;

the second control sub-circuit is electrically connected with the third node, the first node and the second clock terminal, and is configured to control the potential of the first node under control of the third node and the second clock terminal; and the third control sub-circuit is electrically connected to the first node, the second node and the first power supply line, and is configured to control the potential of the first node under control of the second node;

the third control sub-circuit comprises: an eighth transistor and a first capacitor;

a control electrode of the eighth transistor is electrically connected to the second node, a first electrode of the eighth transistor is electrically connected to the first power supply line, and a second electrode of the eighth transistor is electrically connected to the first node; and a first electrode plate of the first capacitor is electrically connected to the first node, and a second electrode plate of the first capacitor is electrically connected to the first power supply line.

10. A gate drive circuit, comprising a plurality of cascaded drive control circuits, each of the plurality of cascaded drive control circuits is the drive control circuit according to claim 1; wherein a signal input terminal of a first stage drive control circuit is electrically connected with a start signal line, and a signal input terminal of an (i+1)-th stage drive control circuit is electrically connected with a first output terminal of an i-th stage drive control circuit, wherein, i is an integer greater than 0.

11. A display substrate, comprising: a display region and a non-display region located on a periphery the display region, wherein:

the display region is provided with a plurality of sub-pixels, at least one sub-pixel of the plurality of sub-pixels comprises a pixel circuit and a light emitting element, wherein the pixel circuit is electrically connected with the light emitting element; the non-display region is provided with a gate drive circuit comprising a plurality of cascaded drive control circuits;

the pixel circuit at least comprises a drive sub-circuit, a light emitting control sub-circuit and a second reset sub-circuit; the light emitting control sub-circuit is configured to supply a fifth power supply signal to the drive sub-circuit under control of a light emitting control signal; the drive sub-circuit is configured to drive the light emitting element to emit light by using the fifth power supply signal; the second reset sub-circuit is configured to reset an anode of the light emitting element under control of a second reset control signal;

each drive control circuit is electrically connected to a signal input terminal, a first output terminal and a second output terminal, and is configured to provide the light emitting control signal to the pixel circuit through the first output terminal and provide the second reset control signal to the pixel circuit through the second output terminal;

the pixel circuit further comprises a data writing sub-circuit configured to provide a data signal under control of a scan signal, and the pixel circuit is configured to receive a first reset control signal from a first reset control line; and within a duration of one frame, an overlapping duration between a reset duration of the anode of the light emitting element under control of the second reset control signal and a duration during which the light emitting element is not driven by the light emitting control signal is longer than twice of an effective level duration of the scan signal, wherein the first reset control signal transits to a low level after the second reset control signal transits to a low level.

12. The display substrate of claim 11, wherein the drive control circuit comprises: an input circuit, a first output circuit, and a second output circuit; the input circuit is configured to control potentials of a first node and a second node under control of the signal input terminal and a clock signal terminal;

the first output circuit is configured to provide the light emitting control signal to the pixel circuit through the first output terminal under control of the first node and the second node; and the second output circuit is configured to provide the second reset control signal to the pixel circuit through the second output terminal under control of the first node and the second node.

13. The display substrate of claim 12, wherein the drive control circuit is electrically connected to a clock signal line, a first power supply line, and a second power supply line;

the first power supply line and the clock signal line are arranged in a first direction along a direction in which the input circuit is away from the first output circuit, and the second power supply line is located on a side of the second output circuit away from the first output circuit in the first direction; or, the second power supply line and the clock signal line are arranged in the first direction along a direction in which the input circuit is away from the first output circuit, and the first power supply line is located on a side of the second output circuit away from the first output circuit in the first direction.

14. The display substrate of claim 12, wherein the signal input terminal, the first output terminal and the second output terminal are in a same layer.

15. The display substrate of claim 12, wherein the input circuit comprises: an input sub-circuit, a first control sub-circuit, a second control sub-circuit, and a third control sub-circuit;

the input sub-circuit is electrically connected with the signal input terminal, a first clock terminal, a second power supply line, the second node, and a third node, and is configured to control potentials of the second node and the third node under control of the first clock terminal and the signal input terminal;

the first control sub-circuit is electrically connected with the second node, the third node, a first power supply line and a second clock terminal, and is configured to control the potential of the second node under control of the third node and the second clock terminal;

the second control sub-circuit is electrically connected with the third node, the first node and the second clock terminal, and is configured to control the potential of the first node under control of the third node and the second clock terminal;

the third control sub-circuit is electrically connected to the first node, the second node and the first power supply line, and is configured to control the potential of the first node under control of the second node; and the third control sub-circuit is located between the first output circuit and the second output circuit in a first direction, and the input sub-circuit, the first control sub-circuit and the second control sub-circuit are located on a side of the first output circuit away from the second output circuit in the first direction;

the input sub-circuit at least comprises a third transistor; the first control sub-circuit at least comprises a third capacitor; the third control sub-circuit at least comprises an eighth transistor; the first output circuit at least comprises a second output transistor; the second output circuit at least comprises a fourth output transistor; and a control electrode of the third transistor, a control electrode of the second output transistor, a control electrode of the eighth transistor, a control electrode of the fourth output transistor and a first electrode plate of the third capacitor are in an integrated structure.

16. The display substrate of claim 15, wherein the third control sub-circuit further comprises a first capacitor; the first output circuit further comprises a first output transistor; the second output circuit further comprises a third output transistor and a fourth capacitor; and a control electrode of the first output transistor, a control electrode of the third output transistor, a first electrode plate of the first capacitor and a first electrode plate of the fourth capacitor are in an integrated structure.

17. A display apparatus, comprising the display substrate according to claim 11.

* * * * *